United States Patent
Deurloo et al.

(10) Patent No.: US 10,724,224 B2
(45) Date of Patent: Jul. 28, 2020

(54) STORM DRAIN GRATE AND FILTER APPARATUS AND METHOD

(71) Applicant: FROG CREEK PARTNERS, LLC, Casper, WY (US)

(72) Inventors: Brian Deurloo, Casper, WY (US); Thomas James Stypula, Sheridan, WY (US)

(73) Assignee: FROG CREEK PARTNERS, LLC, Casper, WY (US)

( * ) Notice: Subject to any disclaimer, the term of this patent is extended or adjusted under 35 U.S.C. 154(b) by 23 days.

(21) Appl. No.: 16/256,771

(22) Filed: Jan. 24, 2019

(65) Prior Publication Data

US 2019/0226193 A1   Jul. 25, 2019

Related U.S. Application Data

(63) Continuation-in-part of application No. 15/456,998, filed on Mar. 13, 2017, now Pat. No. 10,334,839.

(60) Provisional application No. 62/621,260, filed on Jan. 24, 2018, provisional application No. 62/621,311, filed on Jan. 24, 2018, provisional application No. 62/621,229, filed on Jan. 24, 2018, provisional application No. 62/656,140, filed on Apr. 11, 2018, provisional application No. 62/656,142, filed on Apr.

(Continued)

(51) Int. Cl.
*E03F 5/04* (2006.01)
*B01D 29/27* (2006.01)
*E03F 5/042* (2006.01)

(52) U.S. Cl.
CPC ............ *E03F 5/0404* (2013.01); *B01D 29/27* (2013.01); *E03F 5/042* (2013.01)

(58) Field of Classification Search
CPC ......... E03F 5/0404; E03F 5/042; E03F 5/046; B01D 29/27
USPC .......................... 210/747.3, 163, 164, 170.03
See application file for complete search history.

(56) References Cited

U.S. PATENT DOCUMENTS

| 1,746,121 A | 2/1930 | Levy |
| 2,192,569 A | 3/1940 | Williams |

(Continued)

FOREIGN PATENT DOCUMENTS

| CN | 2244820 | 1/1997 |
| CN | 2810216 | 8/2006 |

(Continued)

OTHER PUBLICATIONS

International Search Report (PCT/ISA/210) issued in PCT Application No. PCT/US2018/013548 dated Mar. 28, 2018.

(Continued)

*Primary Examiner* — Christopher Upton
(74) *Attorney, Agent, or Firm* — Pate Baird, PLLC

(57) ABSTRACT

A storm water capture and filtration system may secure in a catch basin or other area subject to flows of water from streets, channels, and the like as a result of run off from storms. A filter system may include a capture portion including attachment mechanisms, a funnel, various supports, and a filter hanger designed and calculated to capture all water entering a storm water inlet and directing it toward a bag filter. A gap is provided between a funnel and filter hanger in order to provide accommodation for overflow, while an anti-backflow skirt on the filter bag resists flushing of captured pollution out of the bag in overflow condition.

13 Claims, 29 Drawing Sheets

Related U.S. Application Data 11, 2018, provisional application No. 62/753,280, filed on Oct. 31, 2018, provisional application No. 62/339,122, filed on May 20, 2016, provisional application No. 62/390,510, filed on Mar. 31, 2016.

(56) References Cited

U.S. PATENT DOCUMENTS

| | | | |
|---|---|---|---|
| 3,461,880 A | 8/1969 | Stubblefield | |
| 3,613,215 A | 10/1971 | Uhl | |
| 4,117,064 A | 9/1978 | Mathe | |
| 4,176,054 A | 11/1979 | Kelley | |
| 4,258,730 A | 3/1981 | Tsukamoto | |
| 4,260,523 A | 4/1981 | Tsukamoto | |
| 4,419,232 A | 12/1983 | Arntyr | |
| 5,037,541 A | 8/1991 | Ruey-Jang | |
| 5,133,619 A | 7/1992 | Murfae | |
| 5,284,580 A | 2/1994 | Shyh | |
| 5,980,740 A | 11/1999 | Harms | |
| 6,062,767 A | 5/2000 | Kizhnerman | |
| 6,080,307 A | 6/2000 | Morris | |
| 6,086,758 A * | 7/2000 | Schilling | E03F 5/0404 210/164 |
| 6,099,723 A | 8/2000 | Morris | |
| 6,106,707 A | 8/2000 | Morris | |
| 6,270,663 B1 | 8/2001 | Happel | |
| 6,368,499 B1 | 4/2002 | Sharpless | |
| 6,531,059 B1 | 3/2003 | Morris | |
| 6,872,029 B2 | 3/2005 | Allard | |
| 7,112,274 B1 * | 9/2006 | Sanguinetti | E03F 5/0404 210/163 |
| 7,201,843 B2 * | 4/2007 | Sasaki | E03F 5/0404 210/164 |
| 7,276,156 B2 | 10/2007 | Lockerman | |
| 7,309,420 B1 | 12/2007 | Trangsrud | |
| 7,771,591 B2 | 8/2010 | Lucas | |
| 7,875,178 B2 | 1/2011 | Ashliman | |
| 7,959,799 B2 | 6/2011 | Happel | |
| 8,221,632 B2 | 7/2012 | McInnis | |
| 8,226,824 B2 | 7/2012 | Mondschein | |
| 8,366,923 B1 | 2/2013 | Happel | |
| 8,906,232 B2 | 12/2014 | McInnis | |
| 9,371,636 B2 | 6/2016 | Ali | |
| 10,334,839 B2 * | 7/2019 | Deurloo | E03F 5/0404 |
| 2002/0048490 A1 * | 4/2002 | Allard | E03F 5/0404 210/170.03 |
| 2003/0127380 A1 | 6/2003 | Morris | |
| 2003/0146164 A1 | 8/2003 | Robson | |
| 2004/0040901 A1 * | 3/2004 | Page | E03F 5/0404 210/163 |
| 2004/0094464 A1 | 5/2004 | Sharpless | |
| 2004/0111287 A1 | 6/2004 | Singh | |
| 2004/0226869 A1 | 11/2004 | McClure | |
| 2006/0096910 A1 | 5/2006 | Brownstein | |
| 2006/0231509 A1 | 10/2006 | Marzett | |
| 2006/0272663 A1 | 12/2006 | Dube | |
| 2007/0235049 A1 | 10/2007 | Gedevanishvili | |
| 2008/0029004 A1 | 2/2008 | Bragg | |
| 2008/0035163 A1 | 2/2008 | Cheyene | |
| 2008/0073277 A1 * | 3/2008 | Paoluccio | E03F 5/0404 210/163 |
| 2008/0093280 A1 | 4/2008 | Kang | |
| 2010/0059074 A1 | 3/2010 | Brantley | |
| 2011/0305888 A1 | 12/2011 | Lafebere | |
| 2012/0145612 A1 * | 6/2012 | McInnis | E03F 5/0404 210/163 |
| 2012/0318286 A1 | 12/2012 | Lisauskas | |
| 2013/0020242 A1 | 1/2013 | Vreeland | |
| 2014/0150783 A1 | 6/2014 | Liu | |
| 2014/0216450 A1 | 8/2014 | Liu | |
| 2014/0238915 A1 * | 8/2014 | McInnis | E03F 5/0404 210/170.03 |
| 2014/0360518 A1 | 12/2014 | Besso | |
| 2015/0040931 A1 | 2/2015 | LIsan | |

FOREIGN PATENT DOCUMENTS

| | | |
|---|---|---|
| CN | 203152473 | 8/2013 |
| EP | 1084631 | 3/2001 |
| WO | WO2015067372 | 5/2015 |

OTHER PUBLICATIONS

Written Opinion (PCT/ISA/237) issued in PCT Application No. PCT/US2018/013548 dated Mar. 28, 2018 (six (6) pages).

E. Slaughter et al., "Toxicity of Cigarette Butts, and Their Chemical Components, to Marine and Freshwater Fish," Tobacco Control 2011; 20:i25ei29.Doi:10.1136/tc.2010.040170.

JL Pauly et al., "Cigarettes with Defective Filters Marketed for 40 Years," Tobacco Control 2002; 11:i51-i61 doi:10.1136/tc.11suppl_1.i51.

Kathleen M. Register, "Cigarette Butts as Litter—Toxic as Well as Ugly," (Online) Longwood University, (Issued on Aug. 2000) httc://www.longwood.edu/cleana/ciglitterarticle.htm (Seven (7) Pages).

* cited by examiner

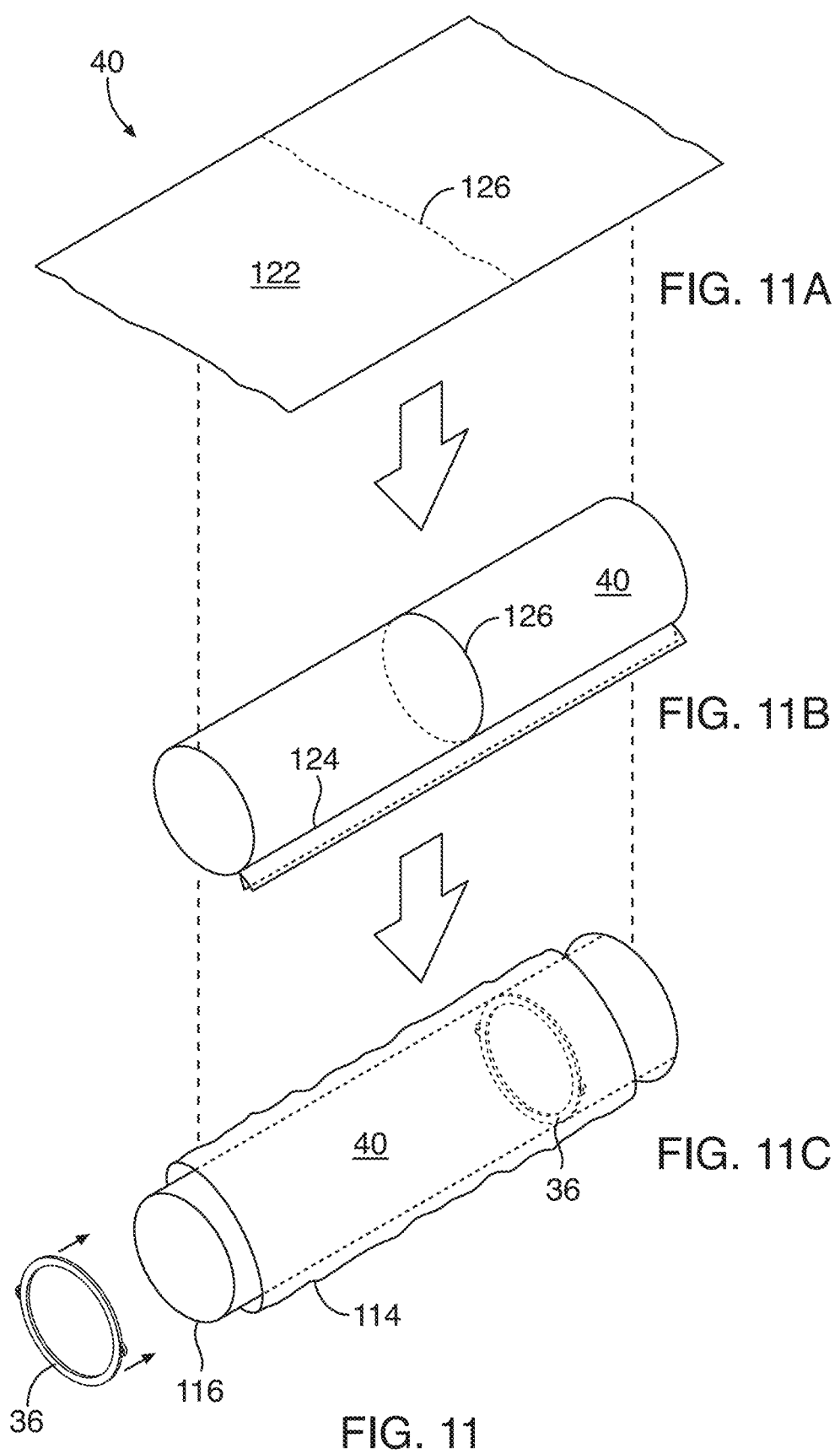

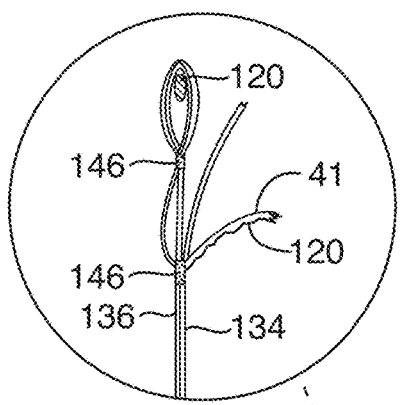
FIG. 14H
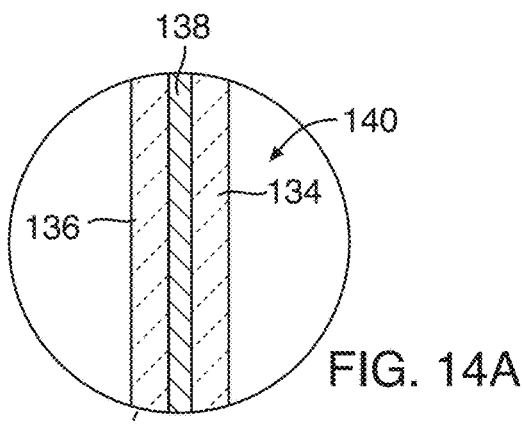
FIG. 14A
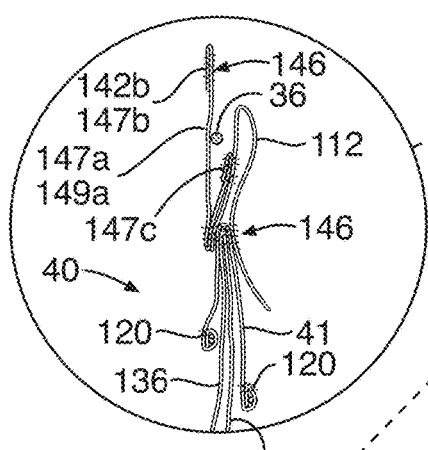
FIG. 14G
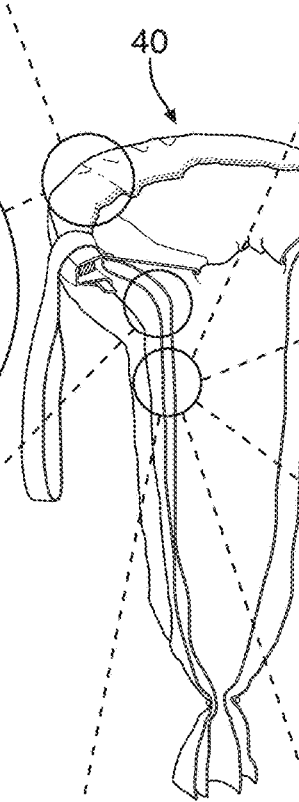
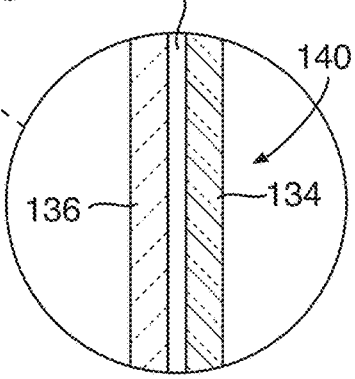
FIG. 14B
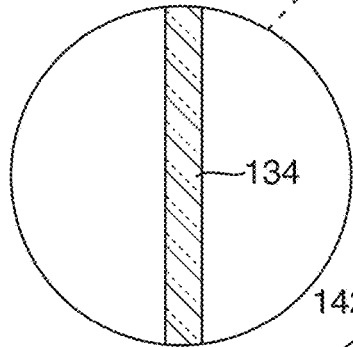
FIG. 14F
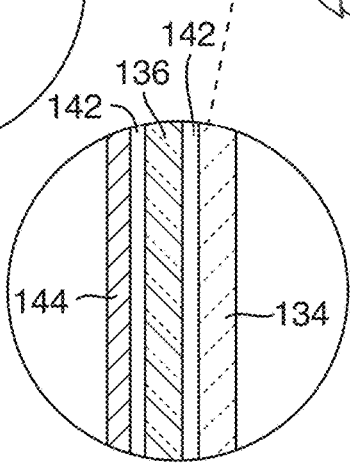
FIG. 14E
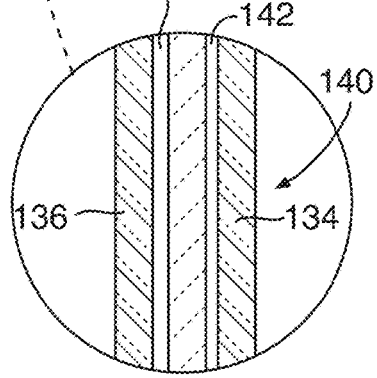
FIG. 14C
FIG. 14
FIG. 14D

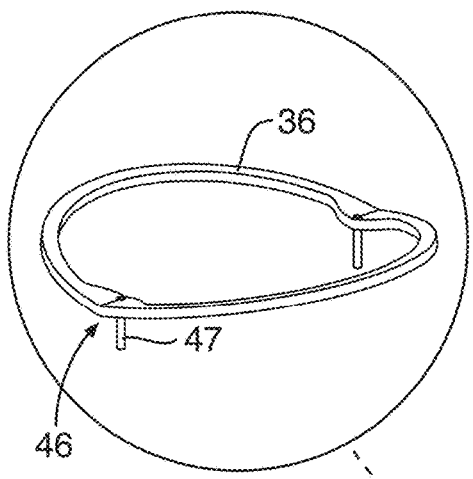
FIG. 15A
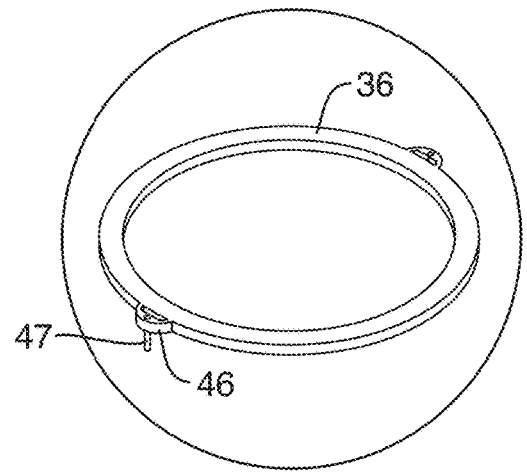
FIG. 15B
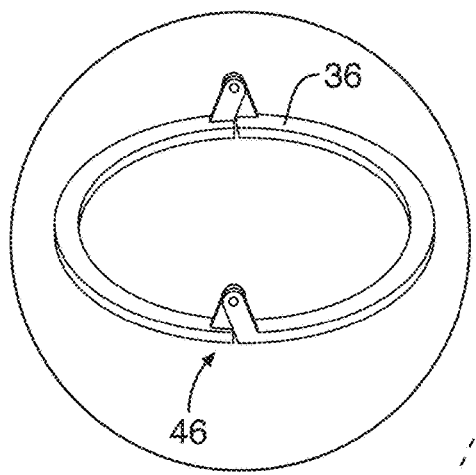
FIG. 15E
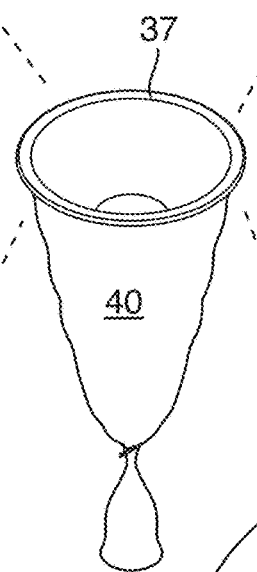
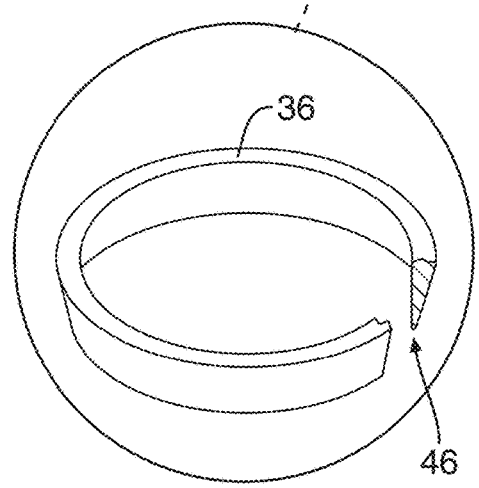
FIG. 15D
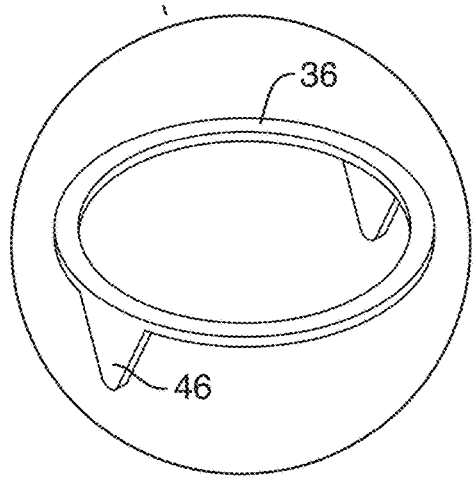
FIG. 15C
FIG. 15

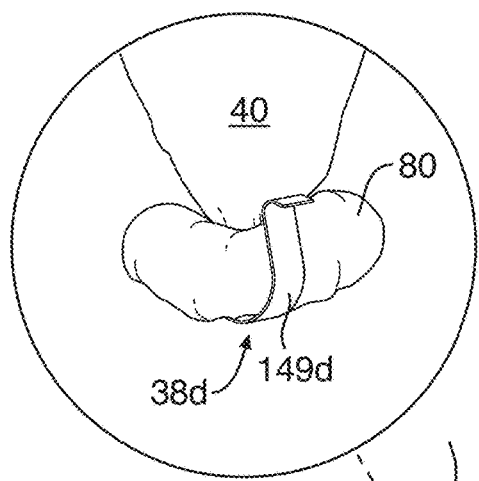
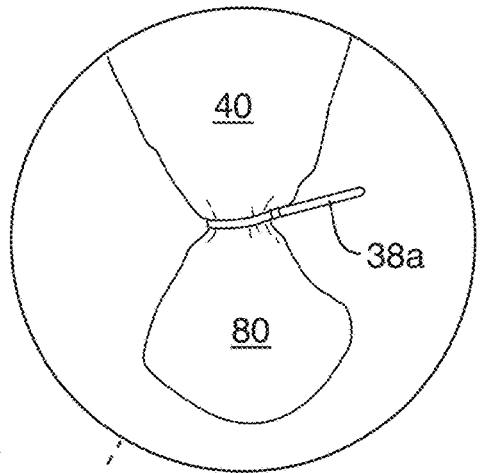
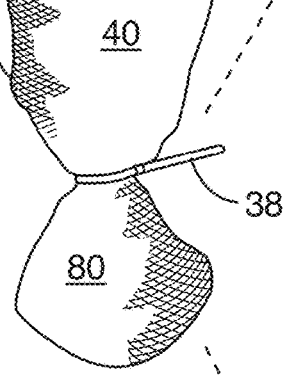
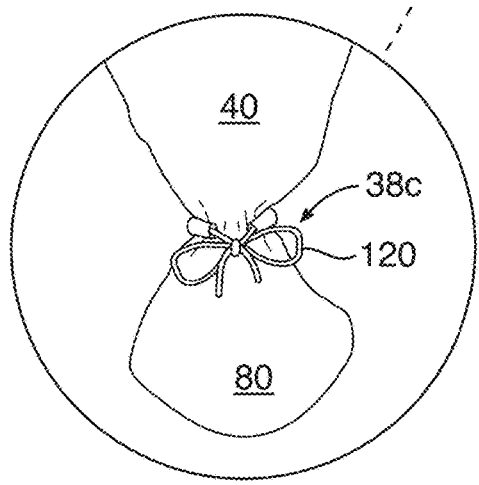
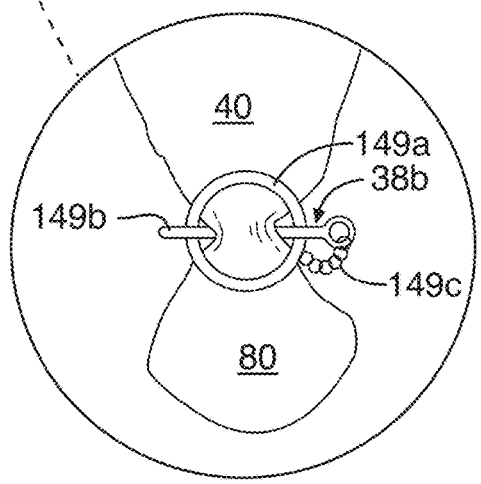
FIG. 16D
FIG. 16A
FIG. 16C
FIG. 16B
FIG. 16

STORM DRAIN GRATE AND FILTER APPARATUS AND METHOD

RELATED APPLICATIONS

This application claims the benefit of U.S. Provisional Patent Application Ser. Nos. 62/621,260, filed on Jan. 24, 2018, entitled REMOVABLE HINGED STORM GRATE AND LIFTING FRAME; 62/621,311, filed on Jan. 24, 2018, entitled STORM WATER FUNNELING AND FILTERING SYSTEM; 62/621,229, filed on Jan. 24, 2018, entitled FILTER BAG FOR STORM WATER FUNNELING AND FILTERING SYSTEM; 62/656,140, filed on Apr. 11, 2018, entitled STORMWATER FUNNELING AND FILTERING SYSTEM; 62/656,142, filed on Apr. 11, 2018, entitled FILTER BAG FOR STORMWATER FUNNELING AND FILTERING SYSTEM; and 62/753,280, filed on Oct. 31, 2018, entitled CHANNEL FILTER SYSTEM WITH REMOVABLE FILTER ELEMENT. This application is a continuation-in-part application of co-pending U.S. patent application Ser. No. 15/456,998, filed on Mar. 13, 2017, entitled REMOVAL CATCH BASIN FILTER INSERT AND LIFTING APPARATUS, which claims the benefit of U.S. Provisional Patent Application Ser. No. 62/339,122, filed on May 20, 2016, entitled REMOVABLE CATCH BASIN FILTER INSERT & LIFTING APPARATUS and U.S. Provisional Patent Application Ser. No. 62/390,510, filed on Mar. 31, 2016, entitled POLLUTION CAPTURE DEVICES. All the foregoing references are hereby incorporated herein by reference.

BACKGROUND

Field of the Invention

This invention relates to storm drains and, more particularly, to novel systems and methods for filtering storm drains.

Background Art

Storm water and other runoff is typically passed through grates into a storm water collection system, and ultimately to a storm sewer network. This differs from the sanitary sewer system, although sanitary sewer systems sometimes do empty into water waves and water bodies including lakes and oceans as well as streams and rivers. Nevertheless, pollution ranges from trash, to organic materials such as lawn clippings, leaves fallen from trees, broken branches, twigs, and onto packaging, broken parts of articles, broken articles from passing vehicles, the crumbs of rubber work from tires, and so forth.

Pollution comes also by virtue of leaching of materials which become dissolved in water, or are simply carried by the water. For example, hydrocarbons such as oils, fuels, and so forth may mix with water even without becoming dissolved therein. Meanwhile, other dissolved solids may be taken in by water. Moreover, other more rare chemicals, such as heavy metals, and the like may be leached, reacted, or otherwise taken up by water, other solvents that may spill into water, and so forth.

Certain intentional waste such as cigarette filters and cigarette butts are a major contribution. Accordingly, typical thoroughfares (highways, roads, streets, alleys, sidewalks, and so forth) may accumulate pollution which may then be carried away by precipitation from rain, snow, or irrigation water, and other sources. Thus, roads are crowned, higher near the center than near the edges. This tends to move water, for safety particularly, toward the edges of the thoroughfare, often bordered by gutters and curbs, and sometimes not bounded at all.

In the case of thoroughfares provided with drains therein, curb and gutter at the edge thereof, and the like, catch basins are areas below inlets or grates intended to collect runoff water and pass it into a catch basin from which it may eventually pass out of an exit line or pipe to join with a main network of ditches, pipes, or the like carrying it away, typically to a body of water such as a river, creek, pond, lake, or ocean. The use of a grate is typically on the main expense of a thoroughfare or a gutter. Meanwhile, from a gutter, a throat may be formed, covered by a hood thereabove in the curb region at the edge of a thoroughfare. Accordingly, the curb box created by the hood provides a horizontal access into a catch basin therebelow.

As certain pollution becomes more problematic in areas of high traffic or large populations, storm sewer systems become a greater threat to environmental quality in waterways, and water bodies. Waterways typically represent moving water such as creeks, streams, rivers, and the like, while water bodies represent more quiescent waters such as exist behind dams, in ponds, lakes, and so forth. Oceans may represent water bodies, although they constitute about three quarters of the surface of the earth.

With unfiltered waters passing into storm sewer systems, at least two problems are presented. One is damage to waters and another is clogging of the storm sewer or drain network. Thus, it would be an advance in the art to provide for pollution capture in one or several of its instantiations right in a catch basin before the water (as carrier) exits to join the remainder of the network. However, this necessarily implies consideration of the entire length of the flow from its origin to its ultimate disposition, with consideration of what to remove from the water, how to remove it, and where to remove it effectively.

BRIEF SUMMARY OF THE INVENTION

In view of the foregoing, in accordance with the invention as embodied and broadly described herein, a method and apparatus are disclosed in one embodiment of the present invention as including an apparatus configured as a storm drain filtering system. The apparatus may include a structure to be positioned between a thoroughfare (sidewalk, street, road, highway, alley, and so forth) and a catch basin (a term used in its conventional sense as an incoming basin for receiving runoff water, particularly storm water) and considered in whole as a storm sewer or storm drain system.

The structure may include framing, anchors, connectors, and the like supporting a funnel. A funnel will typically be responsible to collect the passing into a catch basin by any inlet. Inlets may include a curb inlet, a street inlet, a gutter inlet, and so forth.

In certain embodiments, a hanger or filter hanger is suspended below the funnel and spaced apart therefrom. In this way, a hanger provides a gap between itself and the funnel in order to allow overflow to exit, when the flow through the funnel is greater than can be handled by a filter suspended below the hanger. Thus, the overflow space between the funnel and hanger may be screened, may have mesh, net, or the like surrounding it, but may also simply be open, in recognition of the fact that the persistence with storm typically carries less debris and less pollution, and especially in lower concentration thereof after the initial few minutes (about a quarter hour) from initiation of a lengthy storm.

A filter may suspend below the hanger, and may include a rim that is rendered impassable through the hanger by virtue of a stiff hoop sewn or otherwise retained within a rim portion of the filter. The filter may be configured as a bag formed of a suitable material, starting as a sheet type of material, and be capable of filtering out pollution of some particular mesh size that will fit within or be stopped by a specific mesh size. Accordingly, pollution that is swept along with water into a storm system may pass through one or more thicknesses of a sheet material configured in a bag shape to temporarily capture water and contained pollution, and pass thereafter cleaned or cleaner water.

Typical pollution may include solids, typically constituting sediment and debris. Herein, sediment refers to materials that are heavier than water and will therefore settle readily below or at the bottom of quiescent water, and debris constituting materials that are lighter in density or lower in density than water. This is not an exact distinction. However, debris typically results from organic matter, plant matter (grass, tree clippings, broken tree limbs, fallen leaves, and so forth) as well as trash, wrappers, and so forth.

One readily recognizes that car parts breaking off of an automobile and dropping into the street to be swept into a gutter are a debris constituent and cannot readily be considered sediment. However, such should be removed by a grate over a storm sewer entry point and thereby would not become part of the consideration in a filter system in accordance with the invention.

Typically, a filter bag in accordance with the invention will include a net or a neck. This net or neck is a structure comprising a porous medium, which may even be the same material through which at least one layer of the filter bag is formed. The purpose of this net is to suspend down inside an opening or rim of a filter bag and proceed downward therefrom from the height and diameter of the rim of the filter bag, to a lower and smaller diameter.

Accordingly, when an overflow condition exists such that water enters through the net and into the filter bag at a rate greater than the filter bag can pass, then the net or neck will be positioned to contain the churning water that goes down near the center of the bag, and therefore turns upward along a wall or the filter media contained therein.

The net or neck, therefore, can be responsible to keep in certain sizes, such as a nominal five millimeter particle of debris still within the interior of the filter bag and the churning water therein.

Meanwhile, water that has passed downward through the center opening of the neck, and then churns upward will carry floating or entrained debris. Debris will not always be floating, but will typically be entrained, whether floating on the top surface of water or distributed therethrough and "water logged" to nearly the density of the surrounding water.

In certain embodiments, the rim contains a hoop disposed therein which is rigid, and structure is strong enough to maintain a shape of the rim and incapable of passing through the hanger. In this way, the flexible bag of the wall may respond to the presence of water or captured pollution, and be capable of horizontal movement below the hanger, and permeable to water. Nevertheless, the flexible wall may be impermeable to certain constituents of pollution such as fines, sediments, and debris.

Meanwhile, the weight of the content of the filter bag and the hydraulic head or dynamic head defined and well understood in the art of fluid flow and representing the kinetic energy or the pressure equivalent or the height equivalent in a column of liquid represented by the dynamic force per unit area presented by a moving flow.

In certain embodiments, the flexible wall of the bag will include one or more layers. Those layers may actually include a lattice or a network of strands defining spaces therebetween. Each lattice will have a vertical dimension and a horizontal dimension. The horizontal dimension runs circumferentially around the bag and the vertical direction runs along the height or length of the bag. The lattice is typically capable of changing its own dimensions within the vertical and horizontal directions by virtue of the fact that it may be in fact a net. A net has the ability to stretch in one direction at the expense of contracting in an orthogonal (right angle) direction therein.

A mat layer may be included to include a non-woven material that may be inside, outside, or between a mesh or lattice type of layer. In fact, layers may be created and stacked up in any suitable way configured to best protect the filter, give it an economical longevity of use before throwing away, recycling, cleaning, or otherwise recycling or re-purposing.

Typically this material is formed of a non-woven fabric or a non-woven network of material with interstices or mesh constituting gaps therebetween capable of passing small objects or liquids, while holding out any objects that are solid and larger than the mesh sizes. Mesh size is used here in its conventional sense. Mesh sizes are well understood in all arts from baking and chemistry to manufacturing, from sorting gravel, rock, and soil to cosmetic or medical preparations.

Hydrocarbons or other liquids and vapors may be mixed with runoff water. Also toxins may be dissolved. Hydrocarbons may be toxic, but toxins generally are considered to be vitamins that are inherently poisonous, such as heavy metals, certain chemicals, and the like. In quantity, hydrocarbons are often toxic, but hydrocarbons deserve being called out separately from what is normally thought of as a toxin.

A scavenger may be included such as a magnet positioned within the filter media, or somewhere within the filter path in order to attract constituents that may be subject to magnetic attraction. Magnets may be used for other purposes, but are particularly useful for removing metallic pollution, such as iron filings, iron pieces, magnetized materials and the like.

Similarly, chemical compositions or chemical adsorbents and absorbents may be worked into, placed between, or constituted as a, or a portion of the scavengers in the filter. In certain embodiments, a product called MYCELX™ has been found to be very useful in removing volatile organic compounds, organic liquids, and a variety of pernicious toxins. Such material may be used in layers or as simply a scavenging device within the flow positioned to receive and obstruct the normal, comparatively smaller and brief flows that enter a filter, while permitting a "persistent, comparatively long, gulley washer" runoff from a large storm to simply pass thereover, as its concentrations will be ineffective to remove.

In certain embodiments, a filter may be characterized by a service area selected to operate as a first cross sectional area to pass water from inside a wall of a bag filter therethrough, and ambient conditions, and at a rate of flow preselected therefore, directly into a catch basin. The filter may also be configured to permit overflow characterized by a second cross sectional area selected to pass substantially all flow of the water greater than the rate of flow preselected for passage through the filter on a continuing basis.

In this regard, the preselected flow rate may be selected to capture all the solids of a particular, preselected size from water passing through, other than water passing during an excess storm condition as mentioned hereinabove. An excess storm condition is constituted by a persistent flow of water exceeding the preselected flow rate for which the filter bag is designed, and is capable of passing all the water through a filter medium.

A filter bag may have a length from a mouth defined by a rim to a lower or downstream end thereof at which a closure on the bag may gather the bag together, and pinch it off to close it. The closure may be securable to close the bag, and removable to open the lower or downstream end of the filter bag in order to empty it, clean it, service it otherwise, or the like. The interior of the bag may sufficiently capture water, even though temporarily, causing that water to churn when an excess storm or excess flow condition exists into the bag.

Typically, the water flows radially (outward) from a filter bag thereby moving from a position of less radius toward a position of greater radius. The water then moves therefrom into the catch basin. However, in passing outward through the filter, it moves from a position of correspondingly smaller cross-sectional area (perpendicular to the direction of flow) to a position of correspondingly greater cross-sectional area.

The apparatus may be required to operate in a number of conditions including one in which the bag is constructed approximate the rim from a geotechnical fabric resistant to abrasion. Only a downstream portion of the bag connects to a downstream portion of the rim and changes to a fabric, net, lattice, or the like. It is readily permeable by water and fines (ultra-small particles such as fine sediment up to the size of sand and the like). Accordingly, fabrics or filter media, which may be woven fabrics, non-woven fabrics, geotechnical fabrics, mats, felts, paper, bead beds, or the like may filter or draw out solids, chemicals, and the like of the pollution.

The rim may be provided with a hoop tasked with stiffening the rim of the filter bag open and preventing it from passing through the hanger. Accordingly, a hoop also may provide registration vertically, circumferentially, or in other directions in order to synchronize or register the rim of the bag with a seat shaped to hold it in the hanger. Thus, the hanger will receive the rim with its enclosed hoop at some registered position. This registered position may be found automatically or sought automatically by the rim being piloted into the seat of the hanger.

Typically, a funnel may include a diverter. A funnel may operate just as funnels always have. In certain embodiments, the funnel may have to be adapted so as to collect substantially all water passing through a grate into a grate or other entrance into a catch basin. Thus, the funnel may need a diverter to carry water from some portion of a grate or entry way over to be captured by the funnel. The funnel meanwhile carries a significant load (force, pressure, head), and is responsible to contain both normal (comparatively low flow) and excessive (long and large storms' runoff) conditions.

Accordingly, a diverter may benefit from louvers cascading a portion of water down from one louver to another along the diverter and toward the funnel. Diverters may be comparatively long in certain installations, or comparatively short as in conventional curb inlets having cast iron hoods parallel to and coplanar with the top of a curb.

The length of a filter bag may be adjustable by application of some type of closure such as a zip tie, a wire tie, a clamp, a rolling up, or other fastening mechanisms. The bag may be emptied by opening the closure. The bag may also be adjusted in length by selecting the position of the closure in order to optimize its operability within the confines of a particular catch basin, which catch basin can vary substantially in size from one location to another.

In certain embodiments, a funnel may be a flexible membrane or flexible polymeric sheet extending under a grate above a catch basin. In general, an outward flow of water is passed through the wall of a filter bag all of the flow passing into the bag. Quiescent head may also contribute thereto. In that regard, the bag will typically pass water substantially immediately and directly through the filter medium of the filter bag, and out into the catch basin.

In certain embodiments of an apparatus and method in accordance with the invention, the method may include separating pollution from runoff by providing an apparatus as a storm drain filtering system. This apparatus may include structures positional between a thoroughfare and a catch basin associated therewith. An interdiction system comprising a funnel may be operably connected to suspend from that structure and redirect water toward a filter.

A transition system may include a hanger suspended below the funnel and spaced apart therefrom. This provides an overflow space (which may or may not be screened in by a mesh or net) between the funnel and the hanger for flood conditions or excessive flow conditions. A filter bag may extend from a rim thereof at an upstream end thereof to a closure defining a downstream end thereof. The rim may be stiffened by a hoop in order to seat within the hanger, while the downstream end of the closure may be capable of moving with flows as necessary.

Thus, the filter media form the walls of the filter bag. They may also be distributed in certain ways to take out specific pollutants at places like the precipice of the rim, either inside or outside thereof, in order to remove certain materials. This is a good location for items such as magnets, chemical removal media (adsorbent and absorbent bead beds), and the like. Ultimately, it will be preferred to position the apparatus in a catch basin downstream from an inlet and upstream from an outlet thereof. In this way, individual filtration may occur by catch basin rather than by combining them all in a storm sewer to be filtered or treated at some collection point downstream.

At an individual catch basin, a filter may collect in a bag pollutants including solids, dissolved solids, dissolved liquids, and mixed liquids. Ultimately, the contents of the bag need to be disposed of by either cleaning out the contents of the bag, disposing of the bag, or some combination thereof. In fact, one may either clean and re-use or empty and retire the bag. One may instead remove and refurbish the bag, re-purpose, or destroy it, or the like. For example, part of the bag may be metal mesh. On the other hand, the bag may include, or be contained within, a metal mesh. The metal mesh may provide for additional support, in order to render the filter media capable of resisting puncture, tearing, and rupture due to dynamic head or dynamic pressure there against.

Bags may be made of wood products, such as paper, organic chip beds of natural materials, and the like. Filters may include natural or synthetic fibers, matted fibers, woven fibers, or the like as necessary. In fact, certain geotechnical fabrics have been created that are comparatively robust, resistant to mold, mildew, and microbial action, while being substantially lightweight and strong. These may be used as filter media, or simply as support materials for preparing a rim of a filter bag.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

FIG. 11 (include portions identified as FIGS. 11A through 11C) is a process illustration of one method for fabricating a filter bag in accordance with the invention;

FIG. 14 (including image insets labeled as FIGS. 14A through 14H) is a series of side elevation, cross-sectional views of various alternative layup embodiments for fabricating the bulk of a filter bag in accordance with the invention;

FIG. 15 (including image insets labeled as FIGS. 15A through 15E) is a series of upper perspective views of various embodiments of hoops for supporting and registering a filter bag in a filter hanger in accordance with the invention;

FIG. 16 (including image insets labeled as FIGS. 16A through 16D) is a series of detailed perspective views of various alternative embodiments of closures for securing a filter bag in accordance with the invention;

DETAILED DESCRIPTION OF THE PREFERRED EMBODIMENTS

Figure 1:
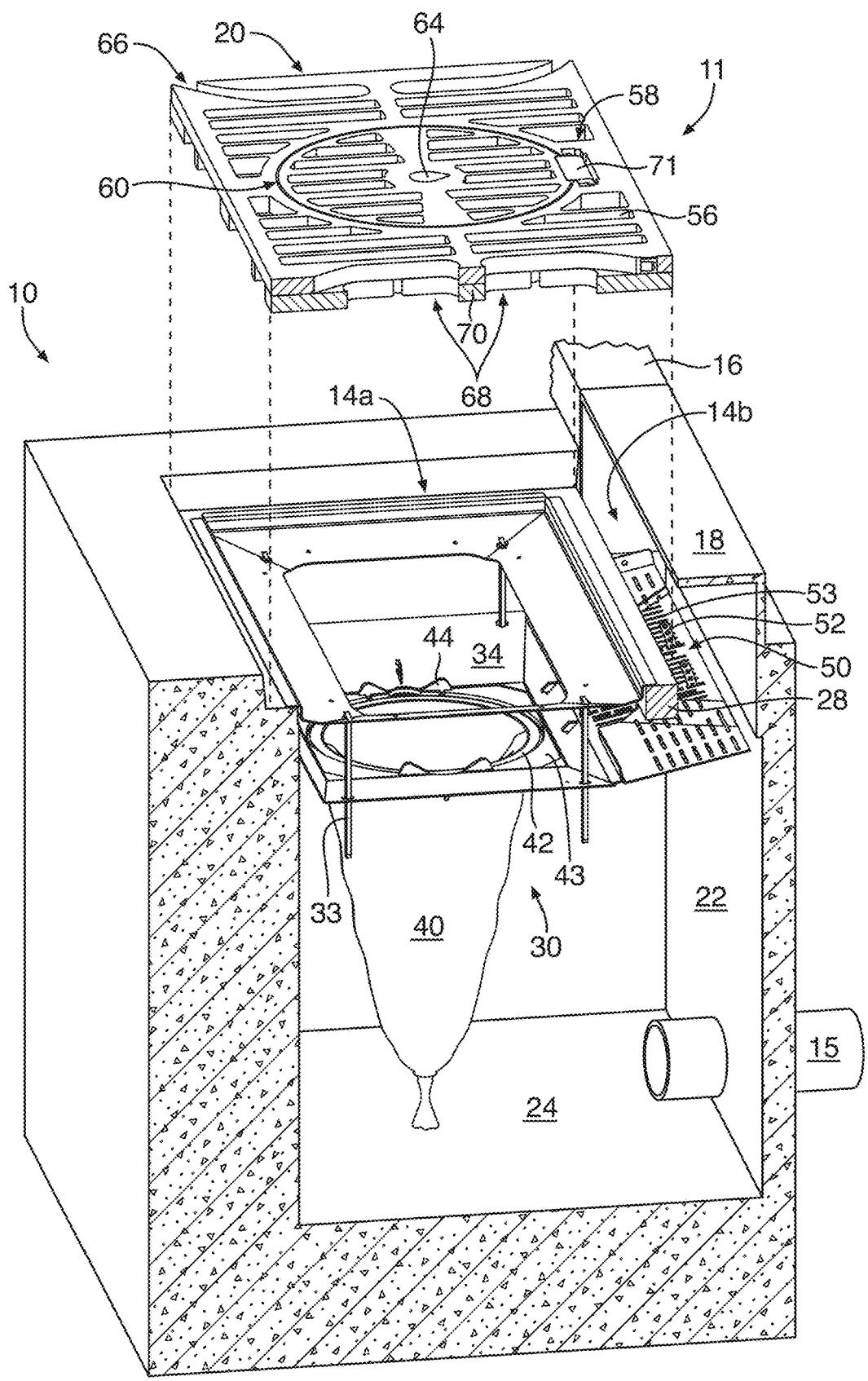
FIG. 1 is a cut away, upper perspective view of one embodiment of a storm drain filter system in accordance with the invention.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of systems and methods in accordance with the invention. The illustrated embodiments will be best understood by reference to the drawings, wherein like parts are designated by like numerals throughout. One should note that each use of a reference numeral with a trailing letter is simply an instance of a category of items identified by the reference numeral itself.

Figure 2:
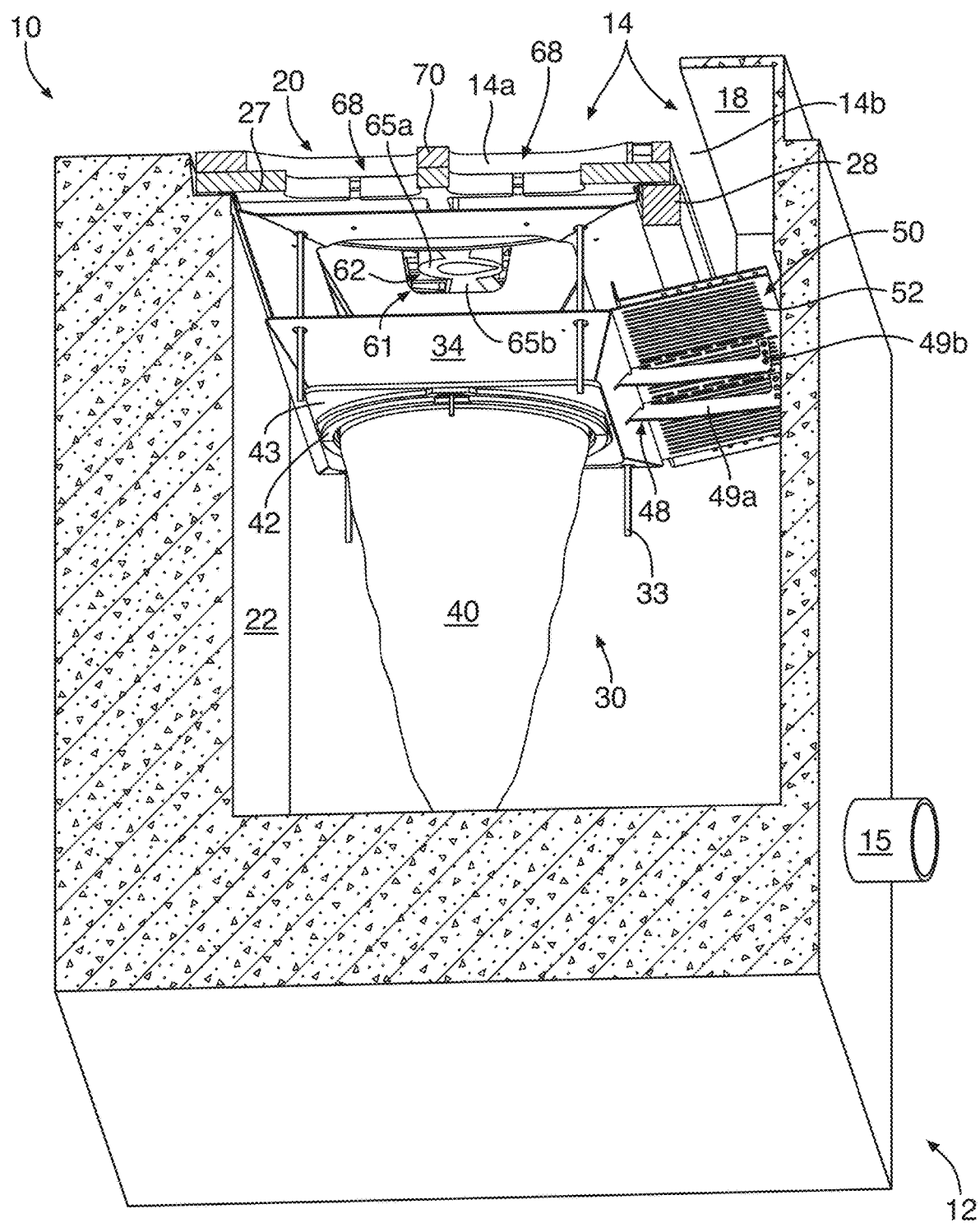
FIG. 2 is a cut away, lower, perspective view thereof.
Figure 3:
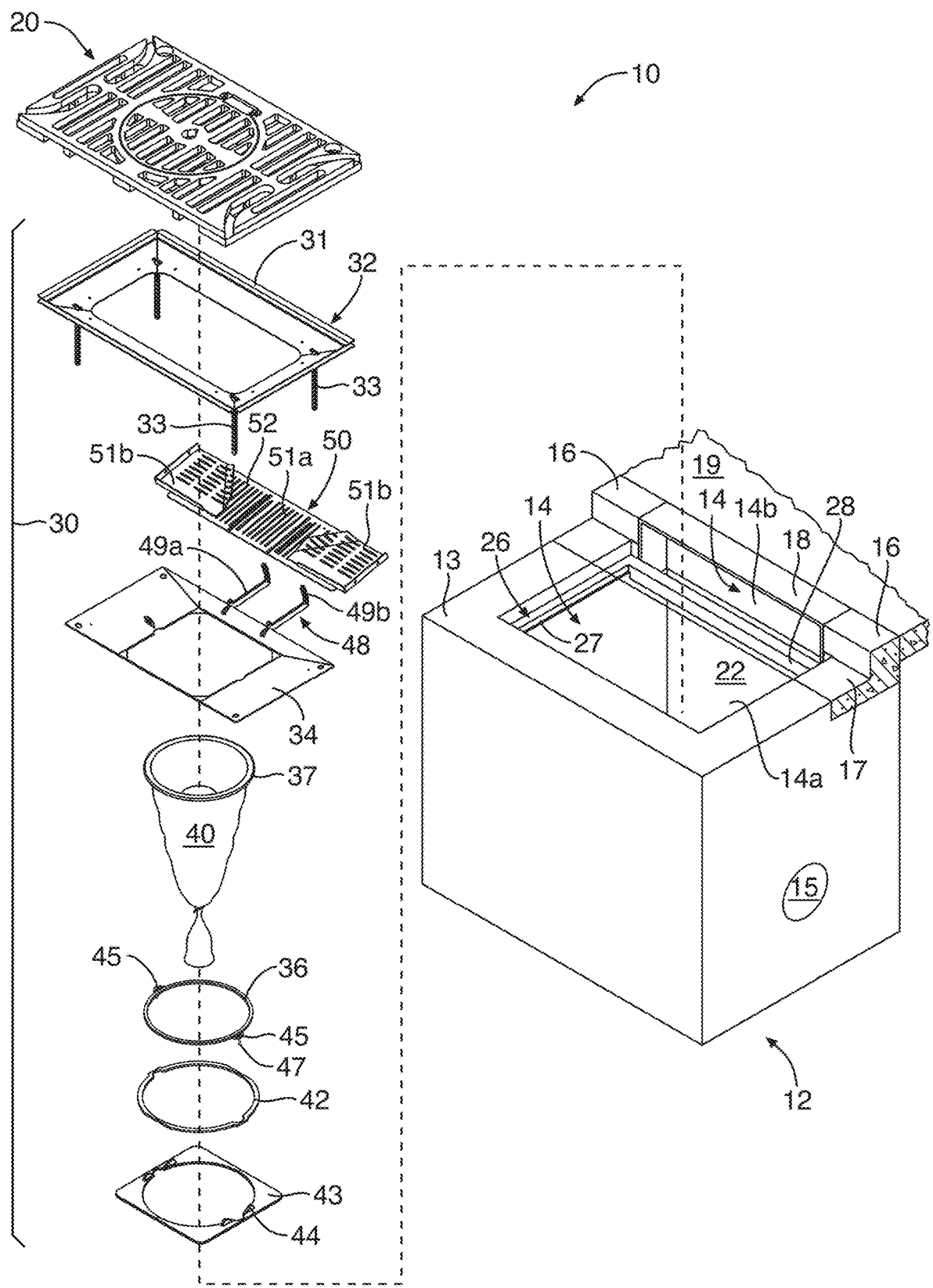
FIG. 3 is an upper, perspective, exploded view thereof.

Referring to FIGS. 1 through 3, while referring generally to FIGS. 1 through 35, a system 10 may be thought of as a storm water collection and filtration system 10. As a practical matter, the system 10 in addition to common infrastructure for storm water collection includes a unique capture system 11 seated within a catch basin 12. A catch basin 12 will typically reside beneath a street 13. From the street 13 and its surroundings, a catch basin 12 may connect by inlets 14, such as a street inlet 14a, a curb inlet 14b, and so forth.

Of course, a catch basin 12 is provided with an outlet 15 that will connect to the main collection system of a municipality. Meanwhile, a curb 16, and gutter 17 will be engineered to collect water from runoff directed thereto from the crown of a roadway, a tilt or slight angle of surrounding surfaces, and the like.

Typically, an inlet 14b in a curb 16 will have a cover 18 or hood 18, typically made of cast iron, and passing substantially parallel and coincident with the top of a curb 16. Thus, when water passes through the gutter 17, bounded by the curb 16 on one side, and gravity urging the water toward the curb 16, that water will eventually pass through a curb inlet 14b by way of underneath the hood 18. Thus, the hood 18 will typically abut a sidewalk 19 immediately opposite the curb inlet 14b and adjacent the curb 16. City infrastructure will typically include a grate 20 over a street inlet 14a, sufficiently heavy to remain in place, sufficiently strong to support heavy equipment including trucks and automobiles passing thereover, and otherwise sufficiently robust to survive without moving while in position over the catch basin 12.

After passing through a grate 20 for a street inlet 14a, or directly under a hood 18 for a curb inlet 14a, the waste water or storm water will pass through the catch basin 12 surrounded by walls 22, or formed with walls 22, and land on the floor 24 or in whatever water may have accumulated on the floor 24, without having drained out the outlet 15. As a practical matter, outlets 15 are typically right at the level of the floor 24 in order to regularly drain the entire contents collected by a catch basin 12 into the outlet 15.

A grate 20 may be set in or on a frame 26. The frame 26 may simply be the concrete formed for the purpose of holding the grate 20. In certain embodiments, the frame 26 may actually be formed of angle iron pieces embedded in concrete, or may even include a cast iron frame 26 fitted to a grate 20. Typically, the frame 26 may have a certain amount of draft (angle in progressing from upper most to lower most position), and the grate 20 will typically require draft as a matter of manufacturing processes. For example, castings are very difficult to manufacture, and accordingly expensive, if there is no draft angle to aid in removal of the cast object 20 from a casting mold. In some instances, a grate 20 may be fabricated such as by welding spacers or cross members under or between an array of parallel bars having a width horizontally considerably less than their depth vertically and calculated to support the weight of traffic thereon along the length of the array of bars.

In either event, whether the grate 20 is cast or fabricated, the frame 26 will typically completely surround all sides and edges of the grate 20. Typically, the grate 20 will be set into the frame 26 sufficiently low so as to be below the street 13. Thus, ideally, the grate 20 is flush at its top surface with the street 13 in which it resides.

The frame 26 may be nothing more than the ledge 27 or shelf 27 at the street inlet 14a of the catch basin 12. However, in most construction, support near the curb 16 for the grate 20 will typically require a beam 28 spanning under the hood 18 the entire length thereof along the curb 16. Thus, support for the grate 20, and one side of the frame 26 will typically be the beam 28. The beam 28 may be fabricated with the frame 26, may be cast with the hood 18 as a part thereof, or may be assembled with the hood 18 as a frame 26 is prepared to receive the grate 20.

In the illustrated embodiment, a filter system 30 may include a frame 31 forming part of a funnel 32. The funnel 32 may be thought of as an interface funnel responsible to capture all storm water passing through the grate 20. To that end, the frame 31 may be manufactured in a variety of ways, including stamped sheet metal, fabricated metal, molded or cast polymer (plastic, rubber, geo-technical fabric, or the like).

However, in order to secure the frame 31 or frame portion 31 of the funnel 32 under the grate 20, the frame 31 needs to be stepped, pinched, fastened, or in some way secured to stabilize the position and shape of the funnel 32 there. To that end, the frame 31 may be stepped to fit the ledge 27, and typically on top of any frame structure 26 supporting the grate 20 thereabove.

Other securement mechanisms may be provided including various types of suspension, anchors from a manhole cover thereabove, the grate 20 itself, the wall 22, or even by extending supports from the floor 24. However, the inside of a catch basin 12 is typically quite humid having some residual amount of water that doesn't drain to the last drop through the outlet 15. Accordingly, the funnel 32 supported by its frame 31 may be secured in any suitable manner to position the funnel 32 adequately to receive all the water drained through the grate 20.

In order to support and position the filter hanger 34 (or simply called a hanger 34) below the funnel 32, supports 33 may suspend the hanger 34 a selected (and adjustable) distance below the funnel 32. As a practical matter, various connection schemes may be used for the supports 33. Chains, bars, tenons with pins (a tenon beam, an extension, typically secured by a pin through a hole passing through the tenon laterally, where the tenons length extends longitudinally).

For example, apertures 35 in the hanger 34 may permit passage of supports 33 therethrough to be secured by pins through the supports 33. In the illustrated embodiment, the supports 33 are tenons (bars having lateral penetrations distributed along the length thereof) held by a stop such as a pin aperture of support 33.

Chains may operate similarly and may also be secured by hooks, pins, or the like. Other support mechanisms 33 will immediately suggest themselves to suspend the hanger 34 below the funnel 32. Apertures 35, support rods 33 (tenons 33), and the like are easily adapted to use by virtue of their simplicity to manufacture. Accordingly, the apertures 35 and the supports 33 do not require welding, fabricating, and the like for hooks, fasteners, and so forth to the funnel 32 nor the hanger 34 in order to suspend the hanger 34 from the funnel 32.

Referring to FIG. 3, while continuing to refer to FIGS. 1 through 35 generally, a hoop 36 may be rectangular, circular, or polygonal (multiple sided) ranging from triangular to octagonal or more. Nevertheless, the hoop 36 is best serviceable as has been discovered with man holes. A circle cannot pass through another circle where the former has an outside diameter larger than the inside diameter of the latter. In this illustrated embodiment, the hoop 36 is shown in an exploded view. The actual position of the hoop 36 is within the rim 37. The rim 37 is typically formed by a seam, fold, or the like wrapping the hoop 36 therein, in order to secure the hoop to support the bag 40 therebelow.

As a practical matter, the rim 37 may be formed in any of several manners. For example, typically, the rim 37 operates as a restraint 37 or an oversized rim 37 unable to pass through the filter hanger 34. That is, the rim 37 defines or becomes the open end 37 opposite a closure 38. A certain gap between the rim 37, or more particularly between the hanger 34 and the funnel 32 provides an overflow 39 or gap 39 there between.

The filter bag 40, of which the rim 37 forms the upper part enclosing therein the hoop 36, is the ultimate destination for the entire stream of water passing through the grate 20 or through the inlets 14a, 14b. It basically works in this fashion. The hoop 36 stiffens the rim 37 into which it has been sewn or folded, attached by tabs, attached by strips. Strips are attached by a portion of the filter bag 40 wrapped therearound or cut into triangles or another shape and sewn back against the bag 40, itself, an edge binding like a blanket, or the like.

Thus, the rim 37 held in the seat 42 on the floor 43 of the hanger 34 prohibits the rim 37 with its contained hoop 36 from passing through. All water, under conventional or modest flows, meaning not during a full blown storm, will pass through the street inlet 14a, inlet 14b, by way of the grate 20 or the curb inlet 14b to be gathered by the funnel 32.

The funnel 32, if the quantity of water is modest (normal, everyday), meaning typical runoff, not from severe storms, but from small sprinklings, waste water from irrigation of lawns, or the like, passes all water received from the gutter 17 along the curb 16. Thereafter, water passes into the filter system 30 by dropping pass the frame 31 into the funnel 32 and past an overflow gap 39 to land in the hanger 34. The overflow gap 38 exists for the situations where the capacity of water to flow through the filter bag 40 at the same rate as it is entering, has been exceeded.

For example, during small squalls or storms that drop minimum precipitation, or with the usual runoff of irrigation, overflows, and the like from properties upstream along the street 13, the rate of flow without any significant pressure through the filter bag 40 will keep up with the incoming flow.

In the event that the filter bag 40 becomes excessively full, then a backflow net 41, or a net 41 in the mouth or opening of the filter bag 40 becomes engaged. At whatsoever point the flow into the filter bag 40 exceeds the ability of the filter bag 40 to pass that amount of flow through itself and out into the catch basin 12, the water will be "backed up." Thus, the filter bag 40 becomes filled.

A backflow net 41 formed in the mouth of the filter bag 40 or secured about the rim 37 thereof, will be swept into engagement against debris being churned up by the incoming flow. That is, the net 41 acts as a funnel 41 inasmuch as it has an orifice 41a smaller than the rim 37. This orifice 41a may be constricted by a drawstring or other mechanism. In fact, it may simply be fabricated with an orifice 41a that is surrounded by whatever fabric or other material the filter 40 is sewn from. It may typically be sized for light particles of debris greater than 5 millimeters in their smallest dimension.

Since the water is directed down through the funneling effect of the net 41, and specifically through the orifice 41a, the flow path of the churning water will be down through and below the orifice 41a, and back up against the filter bag 40 toward the backflow net 41. Accordingly, the net 41 prevents anything over the specified size of the net 41 (maximum mesh opening size) from escaping. Rather, it is captured by the net 41, and remains there in the churning flow inside the filter 40, but does not escape, due to the net 41 passing water back up through the net 41 out of the bag 40 and over the rim 37 to exit by way of the overflow 39.

As a practical matter, sediments may be churned to a certain extent. However, they tend to compact near the closure 38 on the filter 40, and often do not participate vigorously in such churning. In fact the bag may include a pillow of material to capture fines near the closure 38.

The floor 43 of the hanger 34 may be a separate piece joined by fabrication or may be integrally formed or homogenously formed as a part of the overall hanger 34. For clarity, the floor 43 is illustrated with the seat 42 separated therefrom. As a practical matter, in some embodiments, the seat 42 that receives and supports the rim 37 with its included or enclosed hoop 36 may actually be a separate component.

Nevertheless, it may be made in various ways. For example, the seat 42 may simply be an indented ring 42 inside the floor 43, and formed homogenously and integrally therewith as a metal stamping. Likewise, a seat 42 sized to fit the rim 37 of the bag 40 containing the hoop 36 without letting them pass, need only provide securement and alignment or registration thereof.

In one currently contemplated embodiment, the hanger 34 includes the floor 43 and the seat 42 as one integral whole. These may be formed by metal stamping of sheet metal as a material, or may be assembled together as separate components. For example, the majority of the hanger 34 may be formed of a geo-technical fabric, some other flexible material, a polymeric device 34 such as a blow-molded plastic structure 34 of one or more layers, or the like.

Accordingly, the seat 42 may need to provide additional stability, strength, hardness, or the like. Similarly, the floor 43 may need to be inserted or homogeneously formed (of one single material, simultaneously) in order to provide additional rigidity than the space available. Thus, the seat 42 and floor 43 may be assembled or formed integrally. The hanger 34 may be formed with its floor 43 and seat 42 as integral portions thereof.

One will note the pilot 44. The pilot 44 may be formed to receive an ear 45 protruding from the hoop 26. Openings may be formed in the rim 37 in order to accommodate extension of the ear 45. Similarly, the seat 42 may be shaped to conform to and receive the ear 45, thereby registering (aligning and orienting) the rim 37, and necessarily the hoop 36, at a specific position with respect to the seat 42.

In order to be able to place the bag 40 from a distance, such as by dropping down several inches or a foot or more into the catch basin 12, the pilot 44 may be formed as a male or female part 44. That is, various embodiments of a registration pilots 44 and ears or other protrusions 45 may be formed with either being the opening and the other being the inserted portion 45.

In the illustrated embodiment, pins 47 extend below or from the ears 45 in order to penetrate a corresponding opening in the seat 42. These may help to stabilize the hoop 36, and the rim 37 of the bag 40 when more vigorous action by incoming water may tend jostle the bag 40 and its rim 37 free therefrom. Various types of pins 47 and other types of connectors 47 may be used to maintain the registration of the rim 37 and hoop 36 with respect to the seat 42 of the hanger 34.

Secured to extend from the hanger 34 are adjusters 48. Each adjuster 48 includes a lateral portion 49a or an arm 49a, proceeding upward in an arc to form a vertical finger 49b. The arm 49a is responsible to support the weight of a diverter 50. The vertical fingers 49b, which actually arc upward and along a radius from the lateral arm 49a of each, provide adjustment.

For example, each of the fingers 49b is perforated to receive a pin. This pin may be moved along the finger 49b in order to raise or lower the outermost edge of the diverter 50. Typically, the diverter 50 will secure and feed into the hanger 34. However, the adjustability of the diverter 50 along the fingers 49b provides a certain horizontal change of distance in order to span between the hanger 34 and a back wall 22 of the catch basin 12.

In the illustrated embodiment, the diverter 50 is relied upon to redirect water that enters the catch basin 12 by way of the curb inlet 14b. One will note that the diverter 50 has both a deck 51a or a deck portion 51a, and wing portions 51b or wings 51b. The rectangular dimensions of catch basins 12 are really not infinite in variety. Nevertheless, various sizes of catch basins 12 may need the wings 51b to be extended from the deck 51a in order to enlarge the capture area of the diverter 50.

Both the deck 51a and the wings 51b include louvers 52. The louvers 52 are cascaded or shingled. That is, each of the louvers 52 is fabricated such that it differs in slope from its deck 51a or wings 51b, corresponding thereto. Thus, the apertures 53 or slots 53 under each of the louvers 52, will typically not be able to receive water directly thereabove. In a situation where water is pouring down over the louvers 52 at a greater rate than can be accommodated, it may back up and flow back through the apertures 53. As a practical matter, this condition typically only occurs during an overflow condition in which water is already being driven back out over the hanger 34 and possibly the diverter 50, itself.

The grate 20 in the illustrated embodiment has a top plate 55 in which can be seen various bars 56. Below the top plate 55 is a lower plate 57 through which apertures 58 or openings 58 will typically pass. The pattern of the top plate 55 need not be identical to that of the bottom plate 57. Therefore, the bars 56 and the top plate 55 need not align in every instance with the exact shape of the bottom plate 57. However, as a practical matter, the apertures 58 will typically be the same, or simply clear space in the corresponding region of the bottom plate 57.

Nevertheless, by shingling (overlapping, or at least cascading without horizontal apertures 53) the louvers 52, water cascades down the louvers 52, depositing any particles larger than the effective gap of the apertures 53. In retrospect, looking back at FIGS. 1 through 3, one will note that the grates 20, which will be discussed hereafter in more detail may each be formed to have a top plate 55 and a bottom plate 57. It is not necessary to do so, but great thickness and stiffness will require a certain section modulus.

Section modulus is a term of engineering art referring to the properties of a cross sectional area perpendicular to a given load in beam bending. One of ordinary skill in the art, and even one of the public skilled in the art (the one being hypothetical, and the other being an actual person) can repair to any reference on structural mechanics and structural properties and materials define the definition of section modulus.

Suffice it to say that section modulus is a property of any cross section in beam bending. It amounts to an integration over the entire cross sectional area based on the distance from a neutral axis. That is, any item in beam bending having a load, for example on an upper side thereof, with the longitudinal direction running horizontal thereto, will have compression at the outermost surface (outermost fiber) on the top of the beam. It will be in tension at the bottommost fiber (outermost surface) at the bottom of the beam.

Necessarily, if the stress in a longitudinal direction in a cross sectional plane traversing laterally (horizontally and vertically) through a beam that extends horizontally in a longitudinal direction, is well understood. Passing from on the top outermost fiber and tension in the bottom outermost fiber, it is required that at some point, called the neutral axis (a horizontal plane extending in the longitudinal and lateral direction and perpendicular to a vertical plane), will have zero stress.

Nevertheless, the section modulus which includes the property of area and the property of distance from the neutral axis will define the stiffness and therefore the load that can be carried by any beam. The section modulus is proportional to a base length that traverses laterally across the longitudinal direction orthogonal to the longitudinal direction and the vertical direction. Meanwhile, a depth distance is a distance from the neutral axis to an outermost fiber. Thus, the depth in the example is a vertical direction.

Depth is measured from the neutral axis to an outermost fiber, whether uppermost or lowermost in the example. Thus, the grate 20 may include a top plate 55 and a bottom plate 57. Alternatively, it may be fabricated or cast in a single thickness. However, certain advantages may be obtained by forming it in two plates 55, 57. For example, the pattern, shape, and so forth may differ between the upper layer 55 or top plate 55, and the bottom plate 57.

Also in the illustrated embodiment, the grate 20 may include an access 60. This access 60 may be considered a lid 60 or a smaller grate 60 as part of the overall grate 20. The reality is that the access 60 exists to provide an easily serviced opening 61 through which the filter 40 can be checked or lifted out. The access 60 exposes the filter bag 40 and provides access to its hoop 36 from above.

In order to provide this availability by authorized persons only to the opening 61, the access 60 needs to be secured.

Thus, it may be secured by a lock 62 to be described in detail hereinbelow. The lock 62 may secure the access 60 or lid 60 against protrusions 63 (see also FIGS. 17 through 19). A keyway 64 may be provided in a shape uncommon to access. The keyway 64 or keyhole 64 may provide access 60 to open and close the lock 62, thus discouraging the public (vandals, thrill seekers, unofficial persons, and so forth) from opening the access 60.

Typically, grates 20 are heavy on the order of hundreds of pounds. Accordingly, they can only be moved with proper equipment or with multiple persons. By contrast, the access 60 is comparatively lighter representing only a small fraction of the overall area and mass (and therefore weight) of the grate 20. The keyway 64 is oriented in the hub 65*a* which may be connected integrally to the bars 65*b* or dogs 65*b* of the lock 62. The operation of the hub 65*a* and the dogs 65*b* or bars 65*b* in alternative embodiments may include from rotating or translating, or translation and rotary motion. Rotation is motion about an axis or center of rotation. Translation and rotation of an object are both possible simultaneously, but not in this illustrated instance. Translation is linear motion in a straight line.

One will also notice that the apertures 58 include a particular style that may be thought of as an interceptor 66. The interceptors 66 act as redirectors 66 for flows across the grate 20. Upon reaching the beams 56, which may be louvered and therefore like turbine blades turning anything that drops below their upper surface in a down direction, or may be simply flat.

In contrast, the interceptors 66 are cut deeply, preferably entirely through the top plate 55 in order to encourage flow thereinto and redirection downward and toward the center of the grate 20. Interestingly, the positioning of the interceptors 66 render the apertures 58 or openings 58 associated therewith to become access ports 68. By spacing the access ports 68 sufficiently close together, a lift point 70 remains therebetween.

More will be explained hereinbelow regarding various features of the grate 20. However, suffice it to say that the access 60 may be raised on a hinge 71 to secure in an upright position or rather to make its horizontal top surface stand in a substantially vertical position on its hinge 71 in order to provide access to a filter bag 40 to be serviced therebelow. Thus, a bag 40 may be secured by its hoop 36 or otherwise withdrawn from its position in the hanger 34, and more particularly from its position in the seat 42 of the hanger 34 to be lifted out through the access 60 to be dumped, discarded, cleaned, rehabilitated, refurbished, or the like. In fact in some embodiments, the entire bag 40 and its contents may be repurposed as a "sandbag" or geotechnical "sandbag" for stabilizing various earthen structures.

Figure 4:
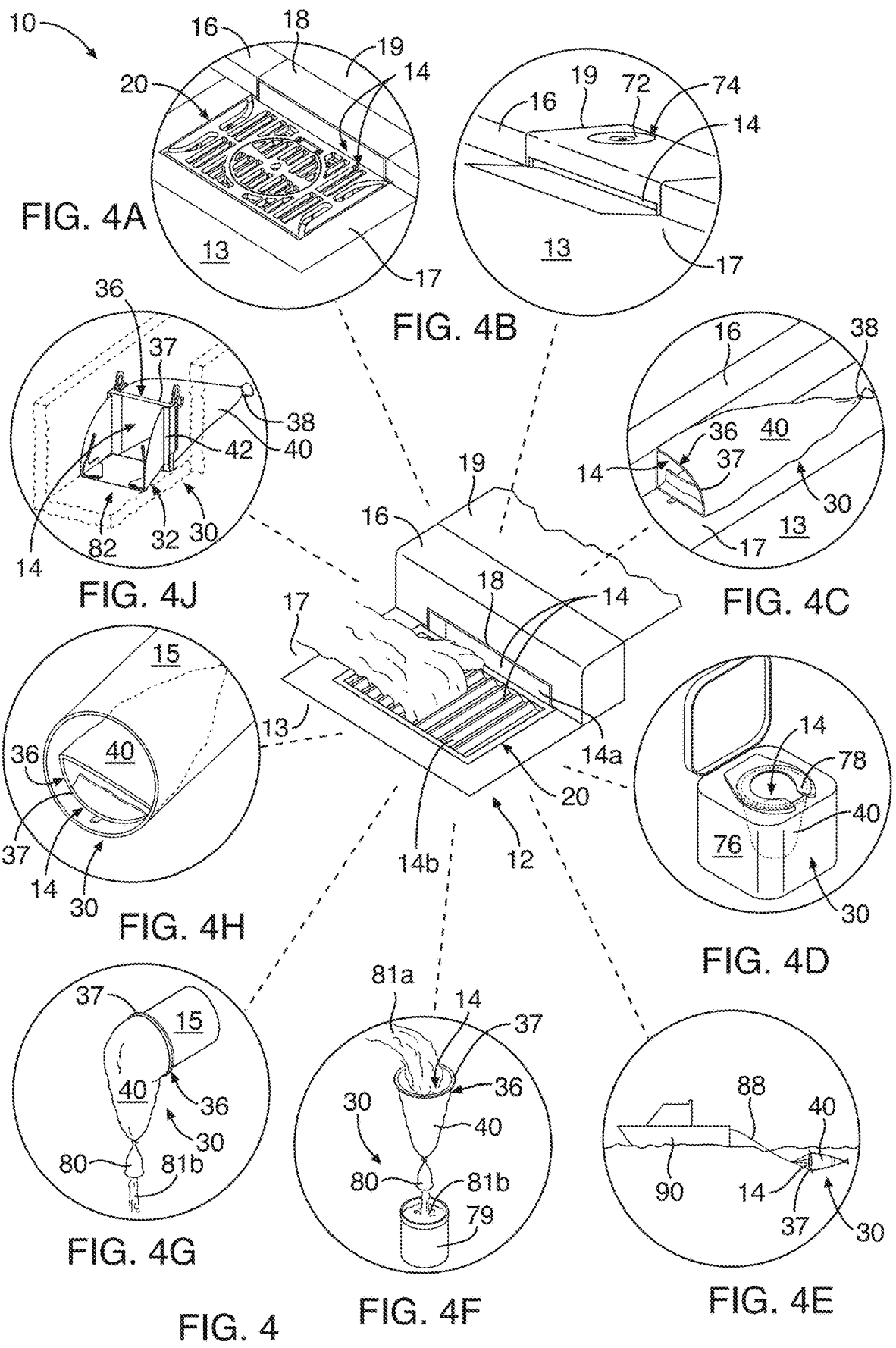
FIG. 4 (including image insets identified as FIGS. 4A through 4H, 4J, and 4J) is a series of perspective views of several alternative embodiments of interdiction systems (runoff or storm water collection, capture, or both as a means to gain control of the water) in accordance with the invention.

Referring to FIG. 4, while continuing to refer generally to FIGS. 1 through 35, in certain embodiments, an inlet 14 may receive water directly from a gutter 17 on a street 13. For example, in panel 4A of FIG. 4, an embodiment is illustrated of having a grate 20 receiving water from a street 13 and typically along a gutter 17. In an alternative embodiment, the curb 16 may instead lead to a sidewalk 19 in which a manhole cover 72 serves as a penetration into a catch basin 12 therebelow, as in panel 4B of FIG. 4. Throughout this disclosure, several of the figures have individual inset images that show alternative embodiments of various details. These may be labeled with trailing letters following the figure number. Thus, reference may be made to the overall figure by its figure number. One may also refer to the inset panels by the same figure number followed by the trailing letter in order to distinguish them and identify the details represented thereby.

Referring to FIG. 4, various types of flow and capture of runoff water or storm drain water are illustrated. In this series of alternative embodiments, different methods of engaging and controlling the flow are illustrated.

Referring to FIG. 4A, the hood 18 fits into the curb 16, thereby draining water that may accumulate on the grate 20 and exceed the capacity of the grate 20 to receive it. In this embodiment, a grate 20 and a hood 18 may both be placed along the curb 16 and gutter 17 of a street 13 to receive water.

Referring to FIG. 4B, here the curb 16 passes along a sidewalk 19 into which a manhole cover 72 fits to cover a manhole 74. Necessarily, the gutter 17 bounded by the curb 16 at the edge of a crowned road 13 (where crowning means that the center of the road is higher than, and slopes downward toward, the gutter 17). In this instance, the inlet 14 is longer horizontally compared to the opening 14*b* below the hood 18. Similarly, the manhole 74 provides access to a catch basin 12 (not shown) therebelow.

Referring to FIG. 4C, an open gutter 17 having no grate 20 nor other inlet 14 may be serviced by filter system 30 comprising little more than the filter bag 40, itself, held open by a rim 37 stiffened by a hoop 36 therewithin. In some embodiments, the hoop 36 may be highly flexible. In fact, the hoop 36 may be replaced by a buoyant material tending to lift the rim 37 away from the gutter 17 in the presence of water.

In such an embodiment, the rim 37 of the bag 40 may float on water, thereby forming an inlet 14 in the bag 40, directly from the gutter 17, and only in response to the presence of water. Thus, a car may drive over such a rim 37 with minimal or no damage. Meanwhile, the remainder of the rim 37 against the curb 16 and the gutter 17, as illustrated may be anchored thereto by any suitable means.

For example, one may anchor the rim 37 by nails, screws, lag bolts, or compression bolts (a lug is formed in pieces, which are penetrated by a center bolt, thereby pushing radially outward the segments (pieces of the lugas spacers). A compression bolt may be placed into a drilled hole such as in the curb 16, the gutter 17, or both.

Referring to FIG. 4D, a portable toilet 76 may be provided with an inlet 14 and serviced by a filter system 30, such as a filter bag 40 under a seat 78. This particular embodiment has a different set of obstacles to overcome. However, liquids may be suitably separated from solids in order to dry solids out for composting. Composting toilets exist, and such an arrangement would provide for remote composting of collected solids while liquids may be evaporated away by ventilation to the atmosphere.

Referring to FIG. 4E, in certain embodiments, a filter system 30 may be drawn behind a watercraft in open water. Thus, an inlet 14 becomes the opening in the rim 37 of a filter bag 40 in accordance with the invention. Again, fins may be attached to rotate the bag 40, such as a hydrodynamic plane or vane, and buoyancy device such as floats, expanded polyethylene or other expanded polymer (plastic foam or elastomeric foam) may be secured to a portion of the filter bag 40, or the like in order to maintain a particular orientation, or to rotate the bag 40 as desired.

Referring to FIG. 4F, an open flow of water may drain directly down into a filter bag 40. In this embodiment, the rim 37 may be supported by any suitable means over a container 79 positioned to receive whatever treated water 80*b* may result from the incoming stream 80*a*. Multiple embodiments of such a system may provide water 80*b* suitable for drinking from a container 79 in certain embodiments. In other embodiments, sufficient additional treatment would be required before the filter system 30 would provide potable water 80*b*.

Referring to FIG. 4G, a drain 15 or outlet 15 from a catch basin 12 or some other source may be provided with a filter bag 40 directly receiving water from the outlet 15. In this embodiment, the rim 37 may be positioned over the outlet 15, but may just as well be hinged or spring loaded to simply abut the outlet 15. In this way, excessive flows might apply their hydrodynamic head.

Head is defined by the kinetic energy of water, and related proportionally to the density, the square of velocity, and other factors thereby directly translating into pressure. A distance represented as head, is an equivalent height of that material density required to cause the same pressure, where pressure is force per unit area).

Thus, at too much dynamic head, or even static head (actual static pressure of quiescent fluid), the rim 37 might partially separate away from the outlet 15. Swinging outward therefrom will permit excessive flows to bypass the bag 40. Typically, cleaned water 80*b* output therefrom may simply drip down the outer surface of the bag 40, and ultimately drip down the tail 80. The tail 80 is simply that portion of the bag 40 downstream from the closure securing, selectively the filter bag 40 closed.

Referring to FIG. 4H, an outlet 15 may be passing from a first area to a second area, and a responsible party may wish to provide a filter bag 40 at the inlet 14 of that drain 15 or pipe 15. Thus, this may be thought of a conduit 15 such as a pipe 15, drain 15, or the like. The water will be flowing toward the rim 37, of the bag 40.

In the illustrated embodiment, the hoop 36 may be shaped as the half-moon shape illustrated, or may simply fill only the portion of the bag 40 contacting the drain 15. In such an embodiment, an upper reach of the hoop 36, or more accurately of the rim 37 may contain buoyant material in order to lift the rim 37 away from the portion of the rim 37 in contact with the drain 15. In this way, excessive flows may simply overrun and flow over the bag 40, while smaller flows within the capacity of the bag 40 may either pass through the fixed opening or a floating opening formed by the rim 37 augmented by buoyant material within the rim area 37 of the bag 40.

Referring to FIG. 4J, in one embodiment, a funnel 32 acting as a capture system 11 may be placed in a channel 82. The channel 82 is shown as defined by some structure in broken lines, which represents a ditch, channel, subsurface gutter (below the surface, but open to the surface), or the like. In this embodiment, the bag 40 and specifically the rim 37 may be stiffened by a hoop 36 therein the side that is formed conformal to the funnel 32. More will be discussed hereinafter. However, this illustrates an inlet 14 that may effectively take in the entire content of a channel 82. This will occur unless and until that channel 82 becomes obstructed due to overflow that may then pass over the top of the filter system 30 within the channel 82.

Figure 5:
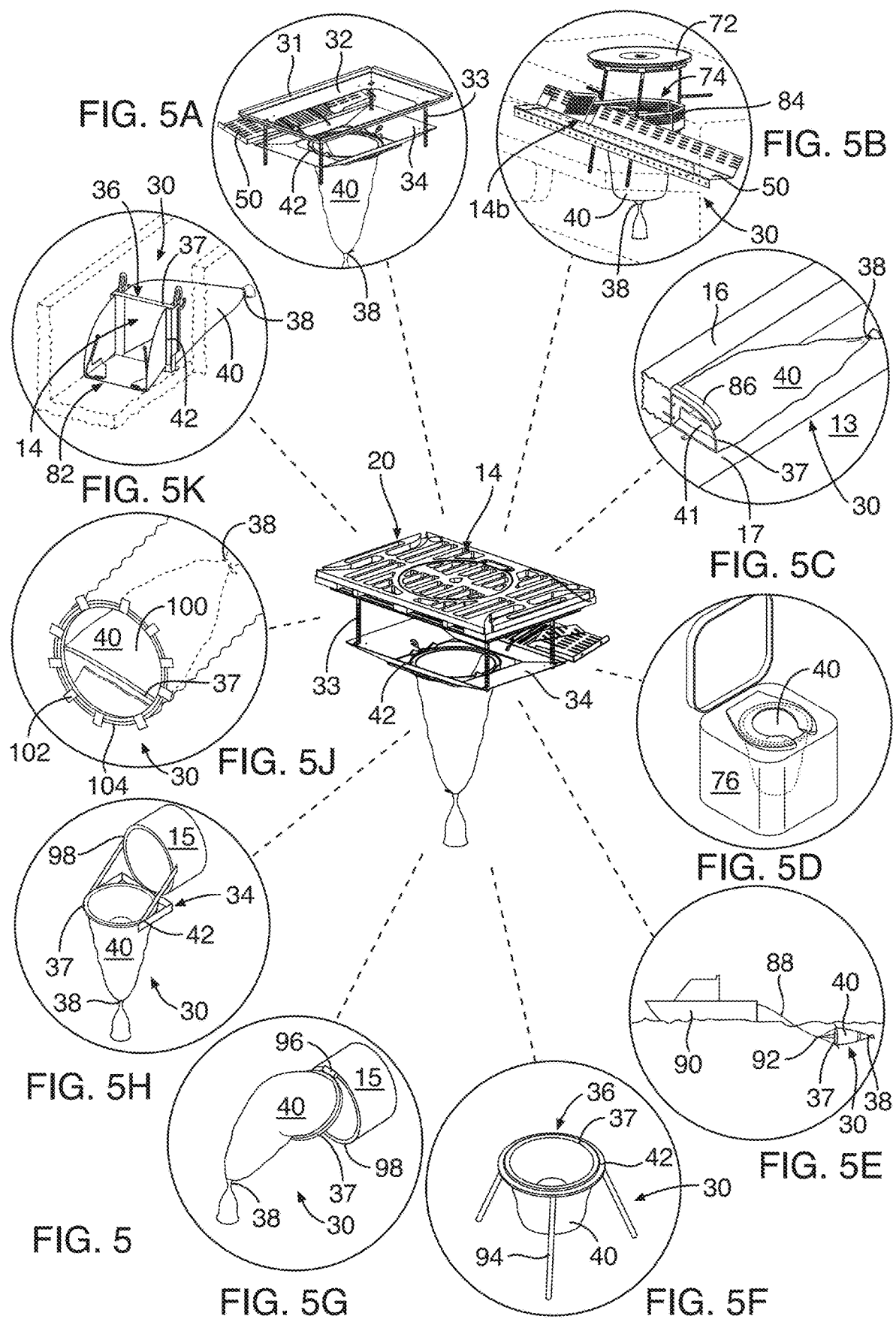
FIG. 5 (including image insets identified as FIGS. 5A through 5H, 5J, and 5K) is a series of perspective views of alternative embodiments of filter directing systems (transition systems) to move water from interdiction at an intake of a drain or other capture structure into a controlled diversion, consolidation, or similar situation for passage toward and eventually into a filter in accordance with the invention.

Referring to FIG. 5, while continuing to refer generally to FIGS. 1 through 35, various embodiments of framing and support exist for a filter system 30 in accordance with the invention are illustrated. These embodiments illustrate different ways of supporting, framing, and otherwise orienting and positioning stably a filter system 30, and particularly a filter bag 40.

Various alternative embodiments are shown for the filter system 30. These form the flow interface between the capture illustrated in FIG. 4, and access to the filter 40. For example, various mechanisms exist for transitioning or interfacing between the capture through the inlets 14, and actual passage through the filter bag 40.

Referring to FIG. 5A, one will see a frame 31 as part of the outermost extremity of the funnel 32. This funnel 32 supports a hanger 34 supporting the filter bag 40. In this illustrated embodiment, the funnel 32 gathers or collects all water falling through a grate 20, or even a curb inlet 14*b*, collected by a diverter 50. Thus, transitioning from the overall area covered by a grate 20 into the funnel 32, and thereafter into the hanger 34 for eventual disposition through the filter 40 involves continual movement inward toward a center thereof, and down through the filter 40.

Referring to FIG. 5B, a sidewalk 19 type of installation having a manhole 74 covered with a manhole cover 72 may service an inlet 14*b* at a curb 16. Again, this is another way of collecting, orienting, and otherwise directing a flow from an inlet 14*b* toward a filter bag 40. In fact, in this embodiment, a backsplash 84 may urge water to not over shoot the bounds of the filter bag 40, and may be louvered just as the diverter 50. The diverter 50 may extend particularly far along and behind a curb 16 (shown only in broken lines).

Referring to FIG. 5C, this method of transition or flow interface may provide relatively little interference or intervention by anything other than the rim 37 of the bag 40. In this instance, a buoyant float 86*a* be secured to any or all of an upper part of the bag 40, the rim portion 37, or the like. Such systems may operate with a stiff rim 37 supported by an inside hoop 36, but may also serve adequately by collapsing against the curb 16 and gutter 17 when no water is flowing. Thus, manufactured almost entirely of fabric or other flexible and durable materials, such as elastomeric and polymeric materials, the hoop 36 or buoyant float 86 may tolerate being run over by the weight of a car tire.

Referring to FIG. 5D, hereagain, transition into a filter bag 40 is virtually no transition at all. Solids are deposited directly in the filter bag 40, dispensing with any need for the complex, previously described, structural connections to install it in the toilet 76 or portable toilet 76.

Referring to FIG. 5E, once again, transitions are minimal. Instead, the bag 40 may be drawn on a tether 88 behind a watercraft 90. Meanwhile, rotation of the bag 40 may be intentional. By any means, the tether 88 may be connected to the bag 40 by a swivel 92. Thus, in order to prevent tangled lines or twisted tethers 88, the swivel 92 may permit rotation of the bag 40 with respect to the tether 88 or watercraft 90. Similarly, a swivel 92 may be used to support a filter bag 40 within a catch basin 12 as well.

Referring to FIG. 5F, a filter system 30 may simply include a tripod 94 or other stand 94 providing the seat 42 under a rim 37 of a filter bag 40. This may be suitable in catch basins 12 where an inlet 14 may simply be another pipe. For example, in many manhole installations, one pipe enters and another leaves. Accordingly, such a system may be fed from the incoming line simply dropping the incoming water into the filter bag 40. In other situations, such a support may be suitable when attachment overhead or to an adjacent wall is not available.

Referring to FIG. 5G, a system 30 in accordance with this embodiment may provide a rim 37 connected by a hinge 96 to a drain 15. In the illustrated embodiment, the hinge 96 may be spring leaded to close itself, or other spring members may be added to urge the rim 37 of the filter bag 40 firmly around or against the outlet 15 as a drain pipe 15. Accordingly, coilsprings, elastic blocks or bands, leafsprings, or similar components known in mechanic arts may be installed. These (one or more) may be added in order to urge the rim 37 of the filter bag 40 to close off against the outlet 15 drain pipe 15.

When the dynamic head is excessive, the rim 37 will simply move against any spring load provided to the rim 37 by the hinge 96 or other springs otherwise connected thereto or therebetween (between the rim 37 and the pipe 15). The rim 37 opens against the spring force in order to provide overflow. A point source may be provided with a filter bag 40 in this configuration in order to avoid sending pollution entrained in the waterflow onward into a storm drain system or network of a municipality or an industrial entity.

Referring to FIG. 5H, in yet another alternative embodiment, an actual framed seat 42 may secure to a drain pipe 15 with a combination of connections made by suitable fastening mechanisms and supporting a vertical filter bag 40 therebelow. Accordingly, when flows are modest, all flow will drop under the force of gravity from the pipe and filter bag 40.

Meanwhile, when flows are more than the filter bag 40 can pass, then the flows may simply overshoot to flow on past the filter bag 40. This will typically only occur as a result of comparatively large "gully washer" types of flows associated with large storms, lengthy storms, or post-initial-runoff flows in a storm.

Referring to FIG. 5J, a drain pipe 15 may be provided a filter at its entrance to capture debris or pollution prior to the runoff water passing therethrough. In accordance therewith, fasteners 102 may install for securing a rim 37 on the bag 40 at the entrance 100 of the pipe 15. In this way, comparatively smaller flows will pass into the bag 40, while overwhelming flows will bypass the remainder of the drain pipe 15.

The drain pipe 15 is illustrated as a corrugated pipe 15. In other words, a common, buried, culvert is typically corrugated in order to stiffen and strengthen the outermost walls. In this embodiment, the fasteners 102 may be clips, clamps, yokes (open throat with some type of fastener, such as a clamp or clip) or the like. Meanwhile, buoyant materials may assist in opening the rim 37 at the uppermost part thereof, while the region in contact with the pipe 15 therebelow may remain in place. In some embodiments, the top most portion of the rim 37 may simply fit straight across, and not admit of movement. However, this is a design choice whether to set a level for the rim 37 to cross the entrance 100 of the drain pipe 15.

Referring to FIG. 5K, a channel is represented defined by walls and a floor shown in broken lines and representing any type of boundary or walls for a channel 82. In the illustrated embodiment, the framing and support illustrated show support on the bottom and the sides of the channel 82, by a funnel 32 defining an inlet 14, and directing flows from the channel 82 almost directly into a filter bag 40. More will be discussed hereinbelow regarding details of various embodiments of such a framing and support system.

Figure 6:
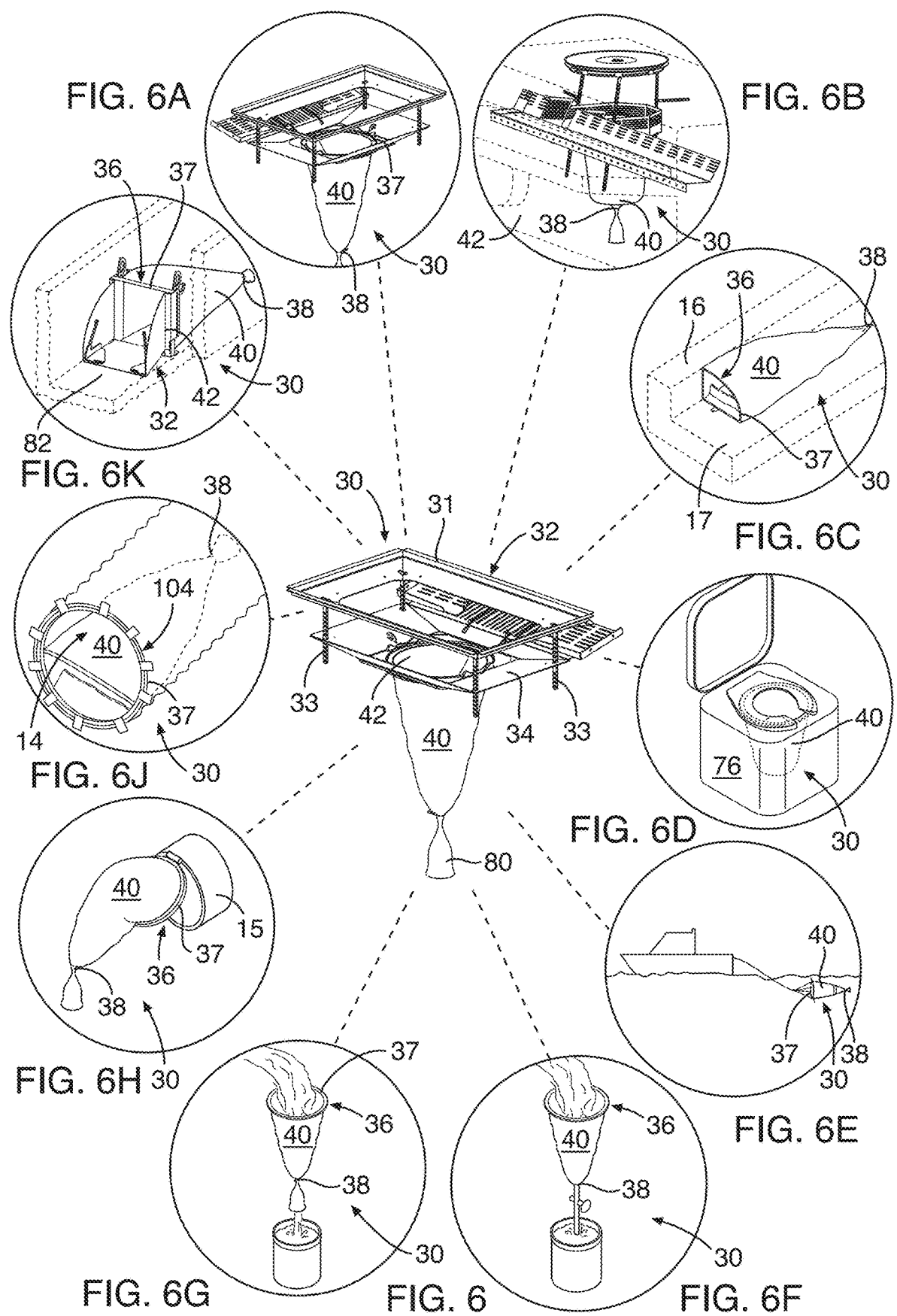
FIG. 6 (including image insets identified as FIGS. 6A through 6H, 6J, and 6K) is a series of perspective views of various alternative embodiments of filter structure and support, including attachment schemes for support, structure, and connections thereof, in accordance with the invention.
Figure 7:
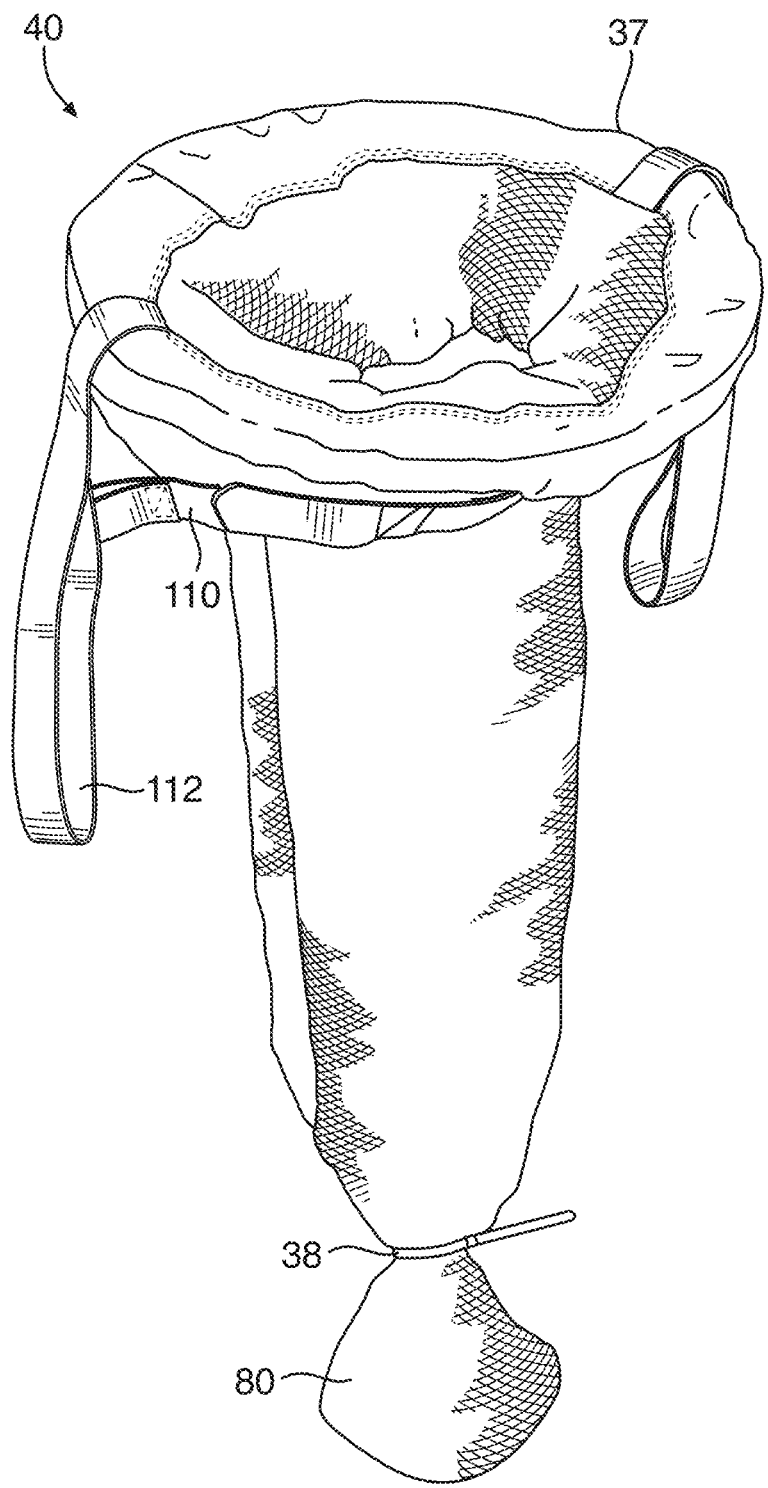
FIG. 7 is an upper, perspective view of one embodiment of a filter bag in accordance with the invention.

Referring to FIG. 6, a variety of embodiments may be instantiated in order to transition from capture to entry into a filter bag 40. Although somewhat redundant, the images of FIG. 6, including FIGS. 6A through 6K, just as FIGS. 4A through 4J in FIG. 4, and FIGS. 5A through 5K in FIG. 5, illustrate details reflecting the flow interface or transition from capture of FIG. 4, into the bag 40 or filter 40. Framing and support, which need to be secured and anchored to some suitable support. That may mean the ground, a catch basin 12, a wall 22 thereof a floor 24 thereof, or the like, including a curb 16, gutter 17, street 13, or other location suitable for anchoring and support.

Transition is another issue. For example, transition involves handling both a small amount of water and a large amount of water as it goes from capture to a filter bag 40, or to a bypass when necessary and appropriate.

Referring to FIG. 6A, the funnel 32 and hanger 34 are illustrated as discussed hereinabove. These transition to assure that all water collected moves toward the rim 37 and ultimately the bag 40. Even the diverter 50 is formed with cascading louvers 52 covering the apertures 53 in order to urge all materials toward the filter bag 40. Typically, articles larger than five millimeters are not permitted to pass. The appropriate effective minimum or hydraulic diameter of an aperture 53 between louvers 52 is about ⅛ inch or ½ centimeter. This corresponds to a typical, soggy, flattened cigarette filter or cigarette butt. If water is backed up from the bag 40 to pass outward through the apertures 53, then any chemical treatments, chemical removal, or other treatments that may be effected by a suitable construction of the filter bag 40 may be bypassed. However, one hundred percent capture of the foregoing minimum size of solid objects or larger objects may still be effected by such a transition mechanism as illustrated.

Referring to FIG. 6B, a similar system, and identical to one in FIG. 5, is illustrated with its various diverters 50 and backsplash 54. These assure that all water, or at least all solids in that water having over under five millimeters in minimum dimension will be captured and shunted toward a filter 40 or filter bag 40. Again, transitioning may permit some of the water to bypass the filter bag 40 by passing above the lower reaches (solid portion or wall) of the diverter 50, and up through the louvered portion thereof.

Ultimately, water could possibly be thrust over the diverter 50, but this would be unusual, inasmuch as this usually required a direction change right at the gutter 17. And curb 16. However, such systems may be comparatively longer than the hoods 18 typical of combination (street 13 and curb 16 entry) types of catch basins 12.

Referring to FIG. 6C, the familiar gutter-based bag 40 needs little or no transition. The rim 37 of the bag filter 40 is immediately presented as the entrance 14 or inlet 14. The hoop 36 inside the rim 37 may be flexible, may be rigid, or may otherwise be adapted to survive possible running over by vehicles. If shielded from vehicles, or in a location where vehicles are not likely to go, or not otherwise permitted, then the rim 37 may be rigid. Otherwise, as discussed hereinabove, it may float or may be sufficiently flexible to pop up, but crush down when being run over by a tire of a vehicle.

Referring to FIG. 6D, transition is not a separate issue with a portable toilet 76. The concept of capture is solved by intent and direction. The structure 76 already captures all the required transition.

Referring to FIG. 6E, likewise, in this embodiment the surrounding water is being "dredged" by the filter bag 40 directly. No transitioning is needed. However, transitions may be provided.

Referring to FIGS. 6F and 6G, various mechanisms for poured flows may result in a bag 40 supported at the rim 37 by any mechanism discussed, or any other suitable, with the bag 40 hanging down vertically toward its closure 38. In the illustrated embodiment, the bag 40 may actually be contained within a sealed shell or an impervious shell, fitted with a spigot 106 the spigot 106 may be valved or otherwise controlled in order to pass fluid from inside the bag 40, to outside the bag 40, but still within the impervious container 108. In this way, water may be purified in a cover layer such as a hard shell, flexible shield, or the like to be passed into a suitable container 79 for immediate use.

Referring to FIG. 6G, the container 79 in this case simply receives water that has dripped down, adhering by surface tension to an outer surface of a filter bag 40. It thereby filters through the bag 40, and then drips down to a container 79.

Referring to FIG. 6H, transition here is direct, and requires no more than the mechanical connection schemes described with respect to FIG. 5 (and particularly FIG. 5H).

Referring to FIG. 6J, similarly, the filter bag 40 and particularly its rim 37 may be secured by a suitable mechanism, such as the mechanical securement of framing and support described with respect to FIG. 5. Sitting directly at the entrance 100 of the pipe 15 or the drain 15, the filter bag 40 is contacted directly by a flow with no transition, capture relying on the positioning of the drain pipe 15.

Referring to FIG. 6K, again the familiar channel-type of funnel 32 in the channel 82 does provide transition both on the bottom and on the sides of the channel 82 defined by suitable walls 22 and floor 24 shown in broken lines. This is more transition than is typically provided in many of the other alternative embodiments illustrated in FIG. 6. The floor 24 forms a ramp effective to gradually urge water flow up over the rim 37 and its supporting frame in the channel 82.

Referring to FIGS. 7 through 10, while continuing to refer generally to FIGS. 1 through 36, in one embodiment of a filter 40 in accordance with the invention, a bag 40 may be made of multiple layers. In particular, the multiple layers may accommodate different functions required of the bag 40.

For example, the rim area 37 may be formed of a comparatively impervious material. In reality, it would be worthwhile to have all aspects of the bag 40 being of the same suitably filter-capable material. However, structural mechanics may require an inner layer or an outer layer to support forces inside.

For example, a felt-like non-woven material will typically need to be backed by something like a steel grate, screen, metal mesh, iron mail, strong synthetic fiber net, or the like, meanwhile, in order to prevent punctures, it is sometimes advisable that gross debris such as sticks, leaves, and the like may need to be kept away from such a non-woven fabric layer in order to protect from puncture. The stackup of layers in a filter bag 40 in accordance with the invention will be discussed hereinbelow in order to understand various options, their functions, benefits, burdens, risks, and so forth.

The rim 37 may include securement by a securement 110. The securement 110, as a practical matter is a mechanism whereby the bag 40 is folded back over itself about a hoop 36. Thus, the securement 110 may be fabricated in any suitable manner.

For example, a securement 110 may include straps of a hook-and-loop fastener in order to confine the securement 110 at a diameter less than that of the hoop 36 inside the rim 37 of the bag 40. In other embodiments, the bag 40 may be made so long that is simply folded over the hoop 36, making the closure 38 to close the entire bag, which is the entire build-up of the bag 40 layered over itself, and all draped over the hoop 36. Also, for example drawstrings, cords, elastic bands, seams to the main portion of the bag or back to the rim 37 itself, loops, snaps, wraps, or the like may provide a securement 110. Various methods of sewing may put a hem 110 as all or part of the securement 110 thereby sewing a portion of the bag 40 to itself. In some embodiments, a more durable abrasion-resistant material that need not even be permeable might be draped over the hoop 36 to form the rim 27, with all of the filtration materials secured therebetween by sewing around the circumference of the bag 40 at that location.

One benefit of the tail 80 below the closure 38 is that bags 40 may be made in a standard length, and later closed with a closure 38. This may optimize the capacity inside the bag 40 or adjust the lengths thereof to fit various catch basins 12.

Lift straps 112 may be positioned nearly anywhere to secure to the rim 37, and particularly to act to lift the hoop 36 therein. In fact, in one embodiment, the loops 112 may be made to pass from one extreme or diametral extreme to an opposite diametral extreme. Additional length of the material may be added thereto in order to provide slack capacity of such a strap 112 to pass over an lie down outside and below the rim 37 and not interfere with filtration. When in use, such a strap 112 may lift the bag 40 from its seat 42 in the hanger 34. In alternative embodiments, a strap 112 may be made in cruciform orientation such that it connects to the rim 37. It may do so at various locations at about every ninety degrees about the circumference thereof. This may militate against lifting or support at a single point at which all four strap segments would converge.

In yet another alternative embodiment, a strap 112 may pass all the way over the rim 37, and down into the bag 40, securing at some point below the closure 38. In this way, a bag 40 may be lifted, from the inside out in order to support its weight or size after being in service for enough time to fill up and expand. In such an embodiment, one or more straps 112 may be secured to the rim 37, while one or more straps 112 may is connect to the bag 40 near or below the closure 38. This may support the entire remainder of the bag 40 beginning at the closure 38.

Figure 8:
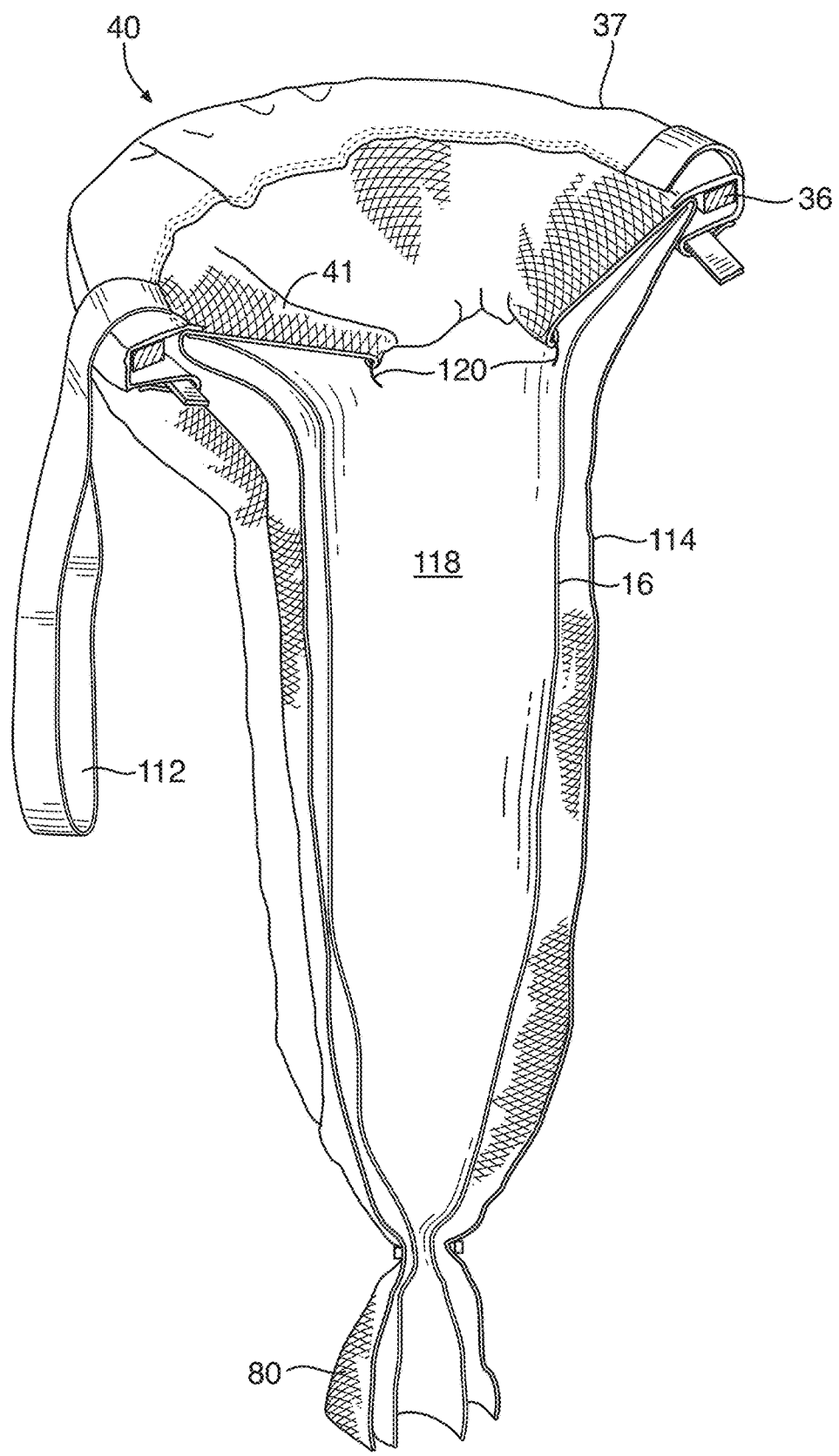
FIG. 8 is a partially cut away, upper perspective, sectioned view thereof.
Figure 9:
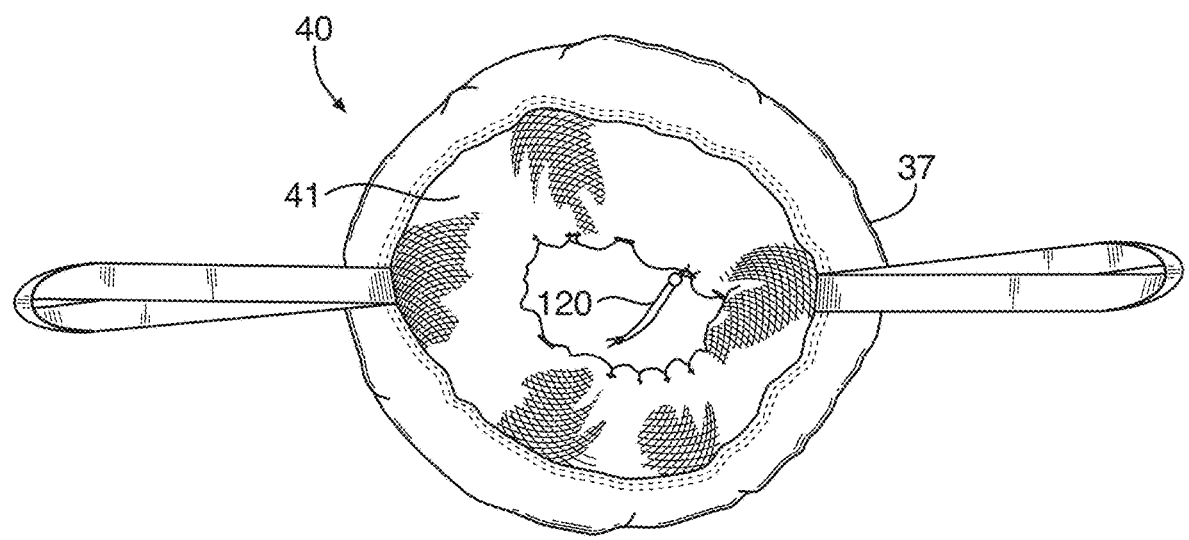
FIG. 9 is a top plan view of the filter bag of FIG. 7.
Figure 10:
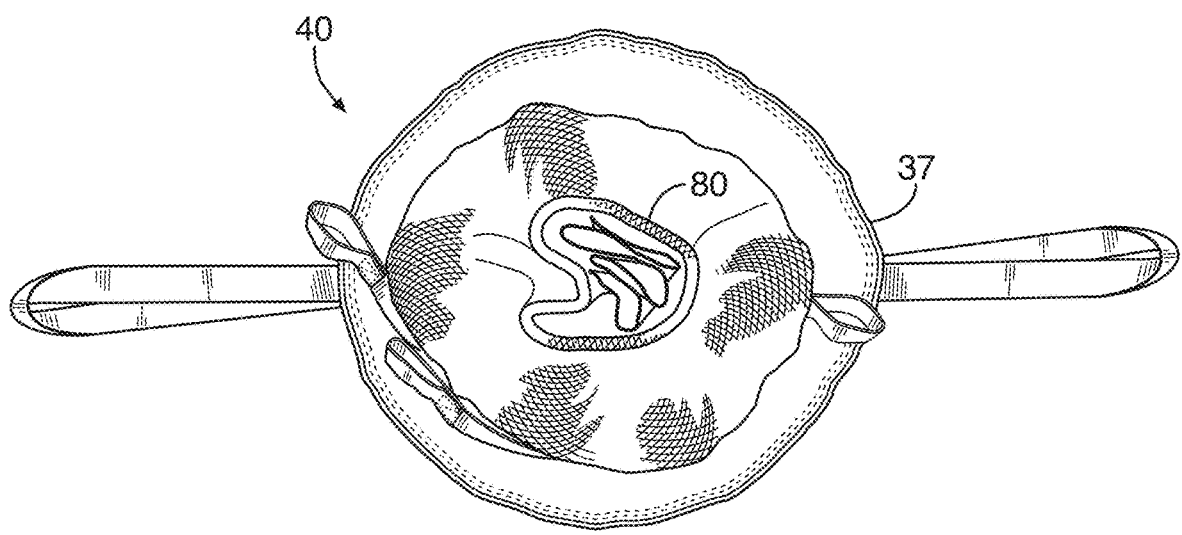
FIG. 10 is a bottom plan view thereof.

Referring to FIG. 8, multiple layers 114, 116 may be laid up in various alternative configurations. In the illustrated embodiment, an outer layer 114 is formed of a woven or net-like material, while an inner layer 116 is a non-woven material, such as a felt or a thick specialized material for filtering fines solid particles of very small effective diameter. Effective diameter is hydraulic diameter. Fines are typically smaller than coarse sand, often smaller than fine masonry sand. Meanwhile, the anti-backflow net 41 or simply the net 41 may be formed of the same or a different material used to form the outer layer 114.

In certain embodiments, the net 41 may simply be an extension of the outer layer 114 passing around the rim 37 and thereby into the interior 118 or interior cavity 118 of the bag 40. The net 41 may be restrained as to its lower, inner diameter by a drawstring 120. The drawstring 120 may simply be a loop defining an inner diameter of the net 41 in service. On the other hand, the drawstring 120 may actually be accessible in order to use as a lift mechanism or a lift point gathering together the net 41, and closing the net 41 as a cover 41 over the bag 40 during and following removal from its position in the hanger 34.

Referring to FIG. 11, in which FIGS. 11A, 11B, 11C make up FIG. 11, a process of assembling a bag 40 is illustrated. For example, a sheet of material 122 may be rolled into a bag 40, typically of constant diameter moving from the flat condition of FIG. 11A to the right circular cylinder of FIG. 11B.

As illustrated, seamed together, by a seam 124 along the length thereof, the bag 40 may then be inverted to place the seam 124 inside. In some embodiments, the bag 40 may simply be folded back over a hoop 36 along its midline 126. That is, a bag 40 may be formed with multiple layers by simply folding the bag 40 of FIG. 11B back over itself, while a hoop 36 is positioned at the midline 126. Thus, the addition of a closure 38 opposite the midline 126 would form a bag 40 with the opening at the midline 126.

Referring to FIG. 11C, the hoop 36 may be moved inside between the two portions of the convoluted bag 40, illustrating the hoop 36 outside of the bag 40, and also shown in broken lines its location inside the bag 40 in order to establish or form the rim 37. Alternatively, multiple bags 40 may be formed, such as the outer layer 114 of a woven or net fabric, while the inner layer 116 is formed of a non-woven or other such layer 116. Thus, in either configuration, the hoop 36 is positioned to define a rim 37 of the bag 40, by either sewing in or otherwise fastening the hoop 36 at one end of the bag 40, while the closure 38 is attached to close and establish the opposite, closed, end of the bag 40.

Figure 12A:
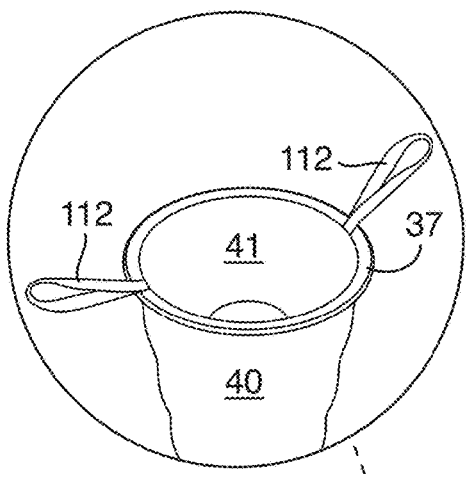
FIG. 12 (including image in set labeled FIGS. 12A through 12D) is an upper perspective view of a filter hanger in accordance with the invention including various suspension concepts for installing and removing filter bags in accordance with the invention.
Figure 12B:
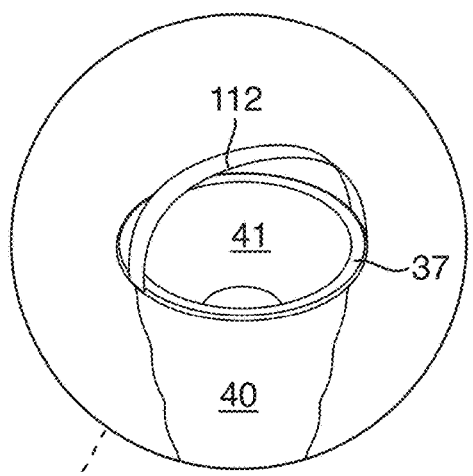
Figure 12:
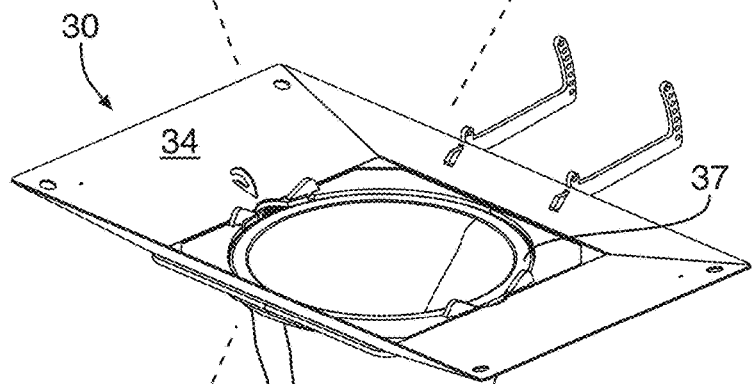

Referring to FIG. 12, including FIGS. 12A through 12D, a variety of connection schemes. For example, even with a filter system 30 that includes a hanger 34, various types of handling mechanisms or other straps 112 may be attached.

Referring to FIG. 12A, straps 112 may secure to a rim 37, or may proceed down through the inside, past the anti-backflow net 41 inside the bag 40 and running along the inside of the bag 40 itself. Thus, the straps 112 may initiate at the rim 37, but may pass all the way down the length of the bag 40. In this way, force may be applied along the entire length of the bag 40, thus providing additional support. Meanwhile, all the same factors may be done in different arrangements.

Referring to FIG. 12B, for example, the single strap 112 may secure to the rim 37 at diametrically opposite positions. The strap 112 may also pass down through the net 41 along the inside of the bag 40 in order to be able to pull not only at the rim 37, but all the way along the length of the bag 40. This may be important in order to consolidate materials, break up solid agglomerations, and the like.

For example, one problem with using a mesh material for an outer layer 114 is that net has the physical property of changing in two dimensions. For example, a basketball net is a good example of flexible mesh. When a basketball strikes a net, friction of the net against the ball puts vertical force on the net. This vertical force stretches the net vertically, which causes it to decrease in diameter. The diamond shape of the openings in the net exemplify exactly this stretching of the diamonds vertically while they contract horizontally.

This contraction therefore puts pressure around the ball, increasing friction of the ball against the net, and slowing the ball in its travel through the net. When the ball has slowed sufficiently that the net has time to expand, to accommodate the diameter of the ball, the diameter of the net begins to return, having less dynamic force applied by the ball in a vertical direction. It therefore can relax, expand in a horizontal direction (circumferentially and radially) thereby opening up to allow the ball to drop.

Similarly, net materials when filled, will draw down vertically and shrink in diameter. However, over time, the addition of more material in the bottom of the bag 40 may also have the effect of expanding the bag 40 back out in diameter. As a practical matter, typically, the amount of water and fluidity of the solids in the bag 40 will determine what the trade will be, and to what extent the bag 40 will expand in diameter versus stretch in length in service.

Figure 12C:
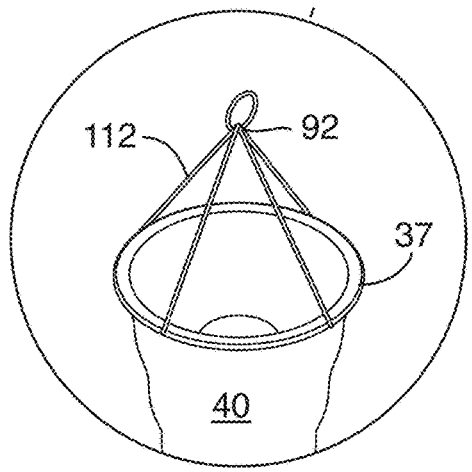

Referring to FIG. 12C, a cruciform strap system 112 may include four straps 112 connected at several positions to the rim 37. As discussed hereinabove, the straps 112 may pass around the rim 37, or may pass around the rim 37 and down the inner wall of the bag 40 passing between the net 41 and the bag 40 along the inside of the bag 40. In this way, the strap 112 may pass all the way to the bottom of the bag 40 and serve to provide distributed loading of the bag 40 along its entire working length. This may be important in certain constructions in order to be able to lift the weight of contents of the bag 40 by the rim 37 and its enclosed hoop 36.

Figure 12D:
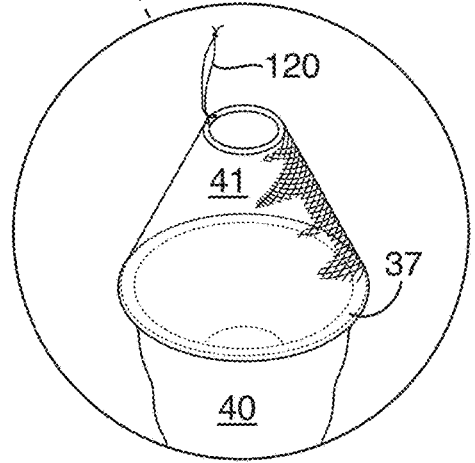

Referring to FIG. 12D, the net 41 may be drawn up from its regular position down inside the bag 40 to act as a hood 41 or cover 41. In such an embodiment, the drawstring 120 in the net 41 may actually serve as a strap 112. In this embodiment, the net 41 is connected all the way around the entire circumference of the rim 37, or at least virtually so, thereby distributing a load about that circumference. Thus, a drawstring 120 if sufficiently sized and robust in construction may simply draw the full maximum diameter of the net 41 together to a small opening which can then support the entire load of bag 40 and its contents.

Figure 13A:
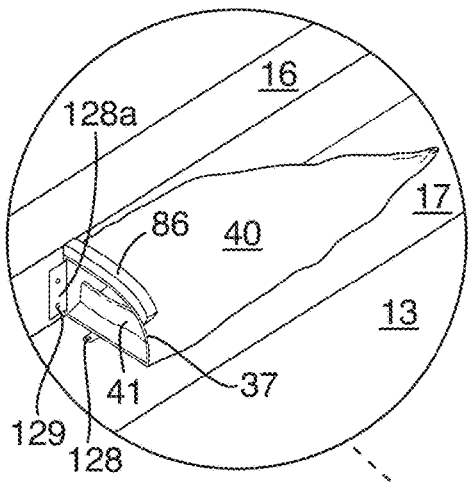
FIG. 13 (including image insets labeled as FIGS. 13A through 13E) is a series of upper perspective views of various embodiments of locating, installing, and anchoring filter bags in accordance with the invention in unlikely places not meeting the requirements of street drains and curb drains.
Figure 13B:
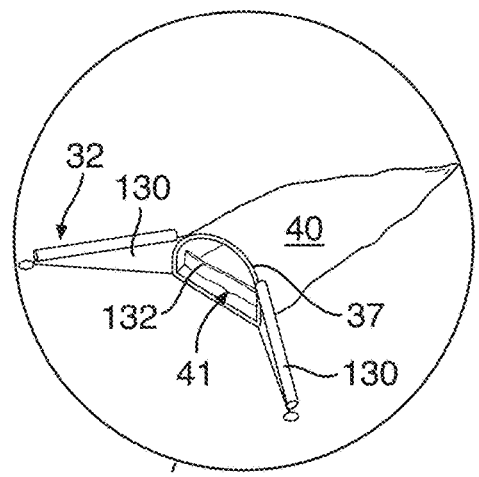
Figure 13E:
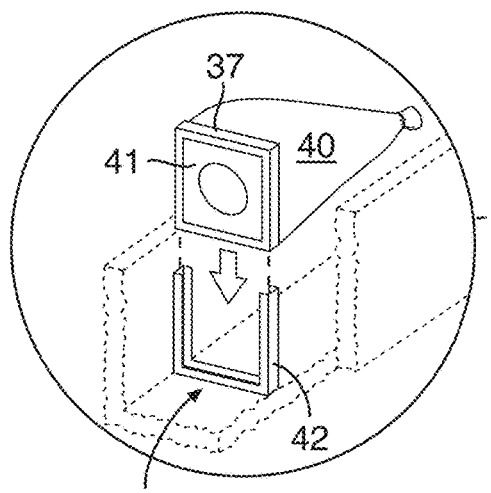
Figure 13:
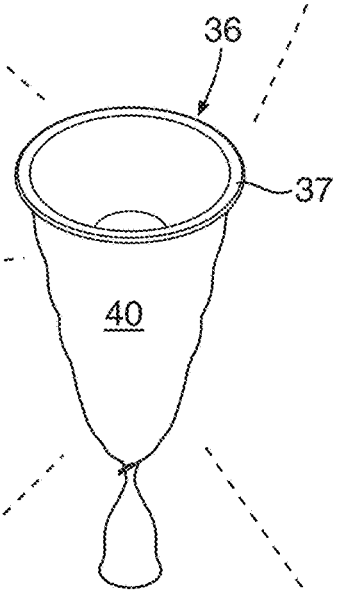

Referring to FIG. 13, additional mechanisms for connecting a filter 40 into a filtration system 30 may involve different types of collection or channeling of flows. Accordingly, the filter bag 40 may take on various positions and orientations, as well as relying on various mechanisms for connecting to a source of a flow. For example, in the illustrated embodiments, the filter bag 40 may be operating virtually alone or with some other minimal structures to direct or funnel water toward the opening constituted by the rim 37 of the filter bag 40.

Referring to FIG. 13A, the filter bag 40 is disposed within a curb 16 and gutter 17 on a street 13 in accordance with descriptions hereinabove. In this instance, the anti-backflow net 41 may be configured to prevent entrained solid materials of some minimum size from escaping. Meanwhile, a float 86 may be disposed on top of the rim 37 in order to raise the rim 37 to receive water passing along the gutter 17.

Again, in this configuration, one will note that an anchor 128a with fasteners 129 is arranged to engage the curb 16. Similarly, another anchor 128b is secured by a similar fastener 129 to the gutter 17. Other fastening mechanisms, from lag bolts or lag screws to compression bolts, concrete nails, glue, or the like may be used to anchor the lower edge of the rim 37. It may anchor to the curb 16, gutter 17, or both, while the remainder of the rim 37 is free to collapse under the weight of a vehicle tire or to expand in response to the float 86 rising above water flowing along the gutter 17.

Referring to FIG. 13B, open areas, such as parking lots, streets 13, or the like may have water running thereacross without constraints other than possibly some topographical variation in altitude or the like. Thus, a funnel 32 may be created by providing booms 130 extending as long arms angled away from the rim 37 of the filter bag 40. In some embodiments, a weir 132 may be placed in the opening of the bag 40. Such a function may also be served by the same anti-backflow net 41. That is, a weir 132 need not pass both over and above water flowing into the filter bag 40. On the other hand, a single design of a filter bag 40 having the anti-backflow net 41 completely circumscribing the rim 37 may act as a weir 132, while still providing backflow protection thereabove in an overflow condition.

Figure 13D:
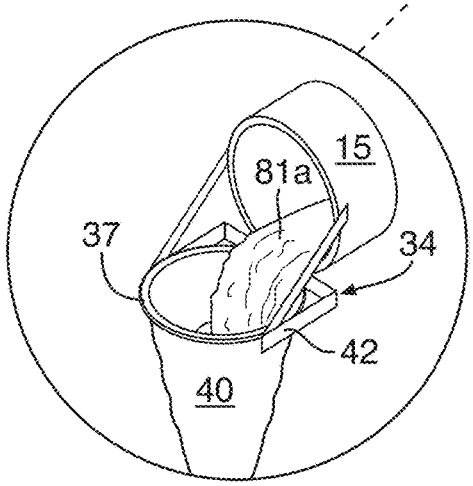
Figure 13C:
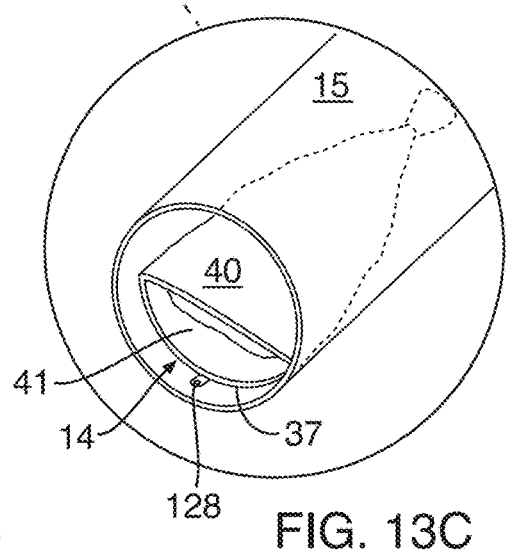

Referring to FIG. 13C, the now, somewhat familiar rim 37 of a bag filter 40 inside a drain pipe 15 may be connected by any suitable manner, such as by an anchor 128, such as one or more of the anchors 128a, 128b. Anchors 128 may be connected in, on, around, inside, or outside of an opening 14 or inlet 14 of such a drain pipe 15 or drain 15.

Again, overflow may be accommodated by simply sizing the filter bag 40, and by forming the rim 37 with a hoop 36 therein the side that adheres closely or exactly to an inner diameter of the drain pipe 15, while being free to move flexibly hooped, or having a hoop 36 that flattens out to form an irregular shape for the rim 37 of the bag 40.

Referring to FIG. 13D, a drain 15 may connect by a frame 34 or hanger 34 providing a seat 42 to receive the rim 37 and its enclosed hoop 36. Again, as a connection scheme, this illustrated embodiment provides a detail of one option. Such connection scheme is not absolute. In this embodiment, overflow protection is provided simply by the orientation between the hanging bag 40 and the horizontal drain pipe 15.

For example, at comparatively smaller flows, the content of the pipe 15 will drain down directly into the filter bag 40. At comparatively higher flows, exceeding the capacity of the bag 40, or the flow rate of the water through the fabric thereof, the water flows will overflow the filter bag 40 and overshoot, horizontally across the rim 37 and proceed on in to the surrounding catch basin 12.

Referring to FIG. 13E, a simple frame 42 may be installed as a seat 42 directly in a channel 82 by any fastening method and hardware. The bag 40 may be provided with a rectangular hoop 36 fitted and shaped to the seat 42. The result is a compact, simple, and nearly self-contained filtration system 10.

Referring to FIG. 14, including inset images identified as FIGS. 14A through 14F, a filter 40, and in certain embodiments a filter bag 40 may be formed to have an inner layer 134 and an outer layer 136. The fundamental function of a filter is to remove from a flow particles greater than a certain size, often referred to as a mesh size from the flow. Thus, the layers 134, 136 are responsible to remove particles of a particular hydraulic diameter or effective diameter.

A hydraulic diameter is four times the area of a shape divided by the perimeter, sometimes called the wetted perimeter of that shape. This is a useful number when dealing with fluids or solids and fluids and therefore is used here as the effective diameter.

For example, in dealing with fluid flows and the movement of solids within fluids, shapes that are odd or irregular may still be assigned a hydraulic diameter or effective diameter that will produce the correct result in equations developed for regular shapes. Thus, by the formulary the hydraulic diameter of a circle is the diameter of the circle. The hydraulic diameter of a square is the length of one side of the square.

Thus, here, we may speak of an effective (hydraulic) diameter of an opening in a sieve or screen used for capturing a particle passing through a filter 40. Meanwhile, the mesh size of any filter medium is the effective diameter of a particle of regular or irregular shape that may pass through the mesh size.

Referring to FIG. 14A, the inner layer 134 and the outer layer 136 may be formed of the same material. For example, fines (particular fine material such as sediments and correspondingly small particulates such as organic debris, dust, dirt, powders, comminuted surface materials and paints, and so forth) may be characterized by a smallest effective diameter. The mesh size of a non-woven or other filter medium may be defined thereby in order to capture such particulate solids in the inner layer 134. In the illustrated embodiment, the inner layer 134 and the outer layer 136 may actually be formed of the same material bonded together, or simply bound in a non-woven fabric material about an intermediate layer 138 therebetween. The intermediate layer 138 may be a reinforcing layer 138 in order to provide more structural stability or resilience for a non-woven filter medium that may not provide sufficient tensile strength to resist rupture, penetration, puncture, tearing, or the like.

Referring to FIG. 14, while continuing to refer generally to FIGS. 1 through 35, various inset images (FIGS. 14A through 14H) illustrate optional structural configurations (stackups 140) for the filter bag 40. FIG. 14 includes, incorporates, or is constituted by the embodiments of inset images identified as 14A, 14B, 14C, 14D, 14E, 14F, and 14G.

Referring to FIG. 14A, in this embodiment, one may configure the filter bag 40 as comprising multiple layers integrated into a single layer. For example, an inner layer 134 may be constituted as a mat 134. By a mat 134 is meant a material that is non-woven to operate as a filter to remove fines (fine sediment, as opposed to larger debris). In this case, the outer layer 136 is really integral with an internal reinforcement layer 138. In the illustrated embodiment, the three layers 134, 136, 138 may be bonded together or even manufactured as one. The reinforcement layer 138 may be thought of as an embedded mesh for strength.

For example, the filter media used, (here using the Latin plural), may be a stackup 140 constituting a wall 140 of a single layer, multiple materials, bonded materials, freely separable materials, or the like. In this particular illustrated embodiment, the multiple layers 134, 136, 138 are bonded together in order that the comparatively weaker non-woven types of materials 134, 136 may be supported mechanically against mechanical structural failure (tearing, breaking, rupture, penetration). In general, any filter system 30 will need some type of a filter 40, whether a filter bag 40 or some other shape of filter 40. Be that as it may, mechanical strength in the face of hydraulic, dynamic, pressure head must be supported. Likewise, perforation, penetration, tearing, and abrasion by debris within the flow of water into a filter stack 140 or stackup 140 must necessarily be resisted or prevented.

A filter is responsible to take out all solid materials greater than a certain size, mechanically support its own weight, the weight of any contents therein, and the hydrodynamic, dynamic, pressure head pushing against it, and may also be tasked to take out another size of particles smaller than some initially screened particles.

For example, a storm grate 20 keeps debris of a certain size mesh from draining into the filter system 30 and into the catch basin 12 therebelow. Meanwhile, a screen or net mesh of a certain size may form an outer layer 134 of a filter stack up 140 in order to prevent a certain size of particle from penetrating an inner layer 134.

In the illustrated embodiment, the flow passes first through the inner layer 136, which may then be supported or backed by either a reinforcing layer 138 need not or by a comparatively larger mesh, outer layer 136. Alternatively, an intermediate layer 138 may have a small interstitial size (mesh size) to collect fines. While an inner layer 134 first exposed to the flow may have a mesh size considerably larger designed to primarily prevent fouling of the intermediate fines layer 138. Thus, an outer layer 136 may be a backing or support for an inner layer 134 or be like the inner layer 134, leaving structural support to the intermediate layer 138.

In some embodiments, the last filtration may be done by the outer layer 136, with the inner layer 134 serving as a shield. Thus, the different inner layers 134, intermediate layers 138, and outer layers 136 may be stacked up according to needs imposed by the pressure, force, the types of debris and other pollutants expected, need for straining prior to approaching a fines-capturing feature, and so forth, as described. Nevertheless, one interpretation of this particular illustration is as an integrated series 140 or stack up 140 of multiple layers 134, 136, 138 bonded together or held in immediate contact with one another for providing reinforcement, and filtration of sediments and other fines.

Referring to FIG. 14B, an outer layer 136 may provide a backing, while an inner layer 134 provides filtration to the total extent expected from the stackup 140. In this embodiment, a gap 142 is permitted, and may vary or collapse in the operation of the filter media constituting the stackup 140. In fact, one may refer to the stackup 140 as filter media, since media is a plural Latin term for medium, suggesting that the layers 134, 136, 138 be each a single, consistent, homogenous medium 134, 136, 138, together constituting the filter media that will be used in the filter 40.

Referring to FIG. 14B, the inner layer 134 and the outer layer 136 may not necessarily both be filter media. Typically, they will not be filter media having the same effective mesh size. For example, the outer layer 136 may be the larger mesh, such as a netting forming the structural support for the filter bag 40, while the inner layer 134 is an inner felt or non-woven layer 134. Thus, all filtration is conducted by the smallest mesh size corresponding to the inner layer 134. Meanwhile, the inner layer 134 and outer layer 136 in this embodiment have a gap 142 therebetween rather than the intermediate layer 138. Of each of the layers 134, 136 is at liberty to move with respect to the other. This provides for better filtration, and better throughput with less clogging. In fact, in certain embodiments, the gap 142 may actually be used to collect materials.

Referring to FIG. 14C, the inner layer 134 may be the structural layer having the largest mean effective mesh size. Meanwhile, the outer layer 136 may be a medium 136 for filtering out fines. In this type of a configuration, the inner layer 134 will act to prevent larger debris entering the filter 40 from abrading, puncturing, tearing, or otherwise degrading the finer mesh outer layer 136.

Meanwhile, the gap 142 in this embodiment will tend to collect materials that have passed through the larger mesh size of the inner layer 134, but cannot pass through the smaller effective mesh size of the outer layer 136. Accordingly, the gap 142 and the ability of the inner layer 136 to move independently with respect to one another can allow such materials to drop and thereby provide additional capacity, flow rate, and operation by the finer-mesh outer layer 136.

Referring to FIG. 14D, an embodiment including an inner layer 134 having a comparatively larger effective mesh size is juxtaposed to an outer layer 136 of the same material or similar. In this illustration, all the layers 134, 136, 138 are at liberty to move with respect to one another, by virtue of gaps 142 therebetween. Accordingly, debris can fall down the gaps 142 to clear additional space for reuse in the finer mesh of the intermediate layer 138.

In this embodiment, the inner layer 134 provides abrasion resistance and keeps larger objects, such as leaves, twigs, bark, paper, wrappers, packaging, trash, litter, and other objects that might foul or simply cover the finer-mesh, intermediate layer 138. Meanwhile, the outer layer 136 provides similar filtration, since it has an effective mesh size corresponding to the inner layer 134. However, in this situation, the outer layer 136 provides structural integrity to support the finer-mesh, intermediate layer 138 from bursting or otherwise failing in view of dynamic pressure head existing inside the filter bag 40.

Referring to FIG. 14E, in yet another alternative embodiment, an intermediate layer 138 may be formed of a protective or larger-effective-diameter, larger mesh size, material. In this embodiment, the inner layer 134 constitutes the finest, while the outer layer 136 supports.

The inner layer 134 may be for removing fines, but may alternatively be formed of a comparatively larger mesh size for filtering out larger debris. Meanwhile, the layer 136 may remove fines. Ultimately, the backing layer 144 operates as a structural support layer. In other words, no intermediate filter layer 138 is used. Gaps 142 separate the layers 134 and 136, both of which are backed up by a backing layer 144. This may be a perforated metal wall, iron mail, a screen support, or the like. In fact, the backing layer 144 need not provide any filtering function, but merely needs to have an interstitial gap between adjacent strands of the structural material of such a screen or mesh 144, sufficient to support dynamic pressure stress against the inner layer 134 and outer layer 136.

Referring to FIG. 14F, in certain embodiments, a single layer 134 may be formed of any suitable material, and may be formed of a non-woven material, a cellulous-based or forest product, and typically need to include fibers of various types. If non-woven, fibers calculated to provide sufficient strength may be included in the layer 134. Other fibers capable of conforming to the appropriate and pre-selected minimum mesh size may need to be included. Thus, the individual layer 134 is responsible for filtration as well as for the structural strength to support both dynamic pressure and loads of the weight of the content inside the filter bag 40.

Referring to FIG. 14G, a particular method and stackup 140 are illustrated for sewing a bag 40. For example, in the illustrated embodiment, stitching 146 or other bonding mechanisms may be used to connect layered materials. Various layers of material may be secured to form the filter bag 40. In the illustrated embodiment, the stitching 146 may connect to various materials in different configurations.

For example, beginning at the upper outside, an anchor fabric 147a may be terminated and sewn to some type of an anchor fastener 147b. These may be eventually folded over a hoop 36 to be secured therewithin. Meanwhile, another anchor fastener 147c configured to connect to the original anchor fastener 147b may be disposed on a lifting strap 112 secured to the filter media layers 134, 136.

Meanwhile, the anti-backflow net 41 is secured to the layers 134, 136, but also contains a drawstring 120, which may elastic or inelastic. The drawstring 120 as described hereinabove forms a smaller diameter for the net 41 providing the anti-backflow functionality. In some embodiments, it has been contemplated that the inner layer 134 may be of fibrous mesh, such as burlap. The outer layer 136 may be a synthetic fiber formed in a net a sparse mesh having strands interlinked.

Alternatively, as discussed immediately hereinabove, various other combinations of layers 134, 136 may be sewn together. The wrap 147d may include a drawstring 120 in order to fit snuggly against the outer layer 136. In certain embodiments, the hoop 36 may actually be sewn inside the layer 147a, which extends substantially around the circumference of the rim 37. Stitching may be replaced by bonding. Similarly, the anchor fabric 147a may be the same as but will typically be different from the inner layer 134 and outer layer 136 as described hereinabove.

Meanwhile, the fasteners 147b and 147c may be snaps, hooks-and-loop connections, or the like. The lifting strap 112 may as described hereinabove or of any suitable alternative shape. Typically, the outer layer 136 can be as described hereinabove, but may be a structural layer in order to back a weaker material incapable of supporting the dynamic pressure loads. The various drawstrings 120 may be elastic or inelastic, according to the need for stability versus simply urging a specific minimum diameter defined thereby.

Referring to FIG. 14H, one alternative embodiment for fabricating a filter bag 40 and its associated rim 37 may include an elastic drawstring 120, embodied either as an elastic cord seamed into an inner diameter thereof, or embodied as an under layer 120 to draw the backflow net 41 across the upstream, opening end of the bag 40. In the illustrated embodiment, the rim 37 may be formed as the upper loop formed by the seam 146 or stitching 146. The lower stitching 146 may secure an inner layer 134 and outer layer 136 to each other, and to the rim 37 thereabove. In fact, the lower stitching 146 may capture together an inner layer 134, an outer layer 136, the anti-backflow net 41, as well as the remaining fabric containing the upper drawstring 120. In certain embodiments, the hoop 36 may be captured by fasteners as described elsewhere herein, or may be passed either of the loops formed by the materials and stitching 146, (both high and low).

In the illustrated embodiment, the inner layer 134 may proceed upward through the lower seam 146 or stitching 146 to extend freely thereabove. Meanwhile, the outer layer 136 may pass up through the seam 146 to loop around the upper drawstring 120 thereafter folding down to the upper seam 146, and terminated at the lower seam 146. This simplified construction may be attached to seat against the seat 42 of the hanger 34, thus orienting and registering the rim 37 with its enclosed hoop 36 therein.

Referring to FIG. 15, the hoop 36 may be formed in any one of several configurations. One immediately available would be a ring having a rectangular cross section through the ring itself and having no protrusions 46, 47. However, in order to provide registration in a circumferential direction of the rim 37 and its incorporated or enclosed hoop 36, the hoop 36 may have alterations in its shape or may be a more complex shape.

Referring to FIG. 15A, the illustrated embodiment provides a hoop 36 that is bent. The angle of bend is calculated to provide an overall top plan perimeter of the hoop 36 that is exactly circular. Thus, the hoop 36 will fit through both the access opening 61 enclosed by the access 60 or lid 60 in the grate 20. Meanwhile, the angled nature provides registration against a mating seat 42 in the hanger 34.

Referring to FIG. 15B, the hoop 36 has a rectangular cross section, meaning a flat top, flat bottom, and right circular cylinder for sides. In this embodiment, a protrusion 46 or key 46 provides for registration at only a particular location in which the seat 42 of the hanger 34 is made to fit either the keys 46 or the keys 46 covered by the rim 37.

Referring to FIG. 15C, the rim 37 may have a rectangular cross section, and a circular shape. Thus, a top plan view would show a circular hoop 36 bounded by an inner diameter and an outer diameter. Meanwhile, protrusions 46 or keys 46 act as pilots 46 to fit into apertures formed to receive them in the seat 42 of the hanger 34. In this embodiment, the tapered or triangular shape of the keys 46 provide for fitting more easily and readily into a circumferentially longer opening or aperture sized to receive of the key 46 at the hoop 36.

Eventually, the pilots 46 will move circumferentially in order to match the position of the apertures in the seat 42 manufactured to receive them. In similar fashion, the thickness of each of the keys 46 may also be tapered in order to be narrower near the lower end or point while being thicker at the upper end or base.

Referring to FIG. 15D, the hoop 36 is shown with a partially cut away segment in order to illustrate the cross-section of the hoop 36. In this embodiment, the tapered shape may itself pilot the hoop 36 into a matching, tapered seat 42 formed in the hanger 34. For example, the hoop 36 need not fit flat on a flat seat 42. In such an embodiment, seating may be totally adequate and vertical supportive forces made totally out of a sheet metal seat, having a flat bottom.

In such an event, however, the seat 42 will preferable be rimmed with a vertical portion thereof stepping down to the seat surface 42 in order to orient the rim 37 and hoop 36 in both an axially (vertical) direction and a radial (horizontal) direction. A hoop 36 in accordance with FIG. 15D orients both vertically and horizontally or positions both horizontally and vertically the rim of the bag filter 40 wrapped therearound to encase that hoop 36.

Referring to FIG. 15E, a hoop 36 may be formed into approximately mirror-imaged halves. The hoop 36 may open in a pivoting or clam shell manner by pivoting about the registration key 46 that may also operate as a hinge or pivot. For example, the illustrated embodiment is shown upside down, in order to illustrate the key 46, however, upon pivoting the separate halves of the hoop 36 about the connecting point of the keys 46, the hoop 36 may open to release its surrounding of any particular support mechanism.

In an alternative embodiment, the hoop 36 may extend to form a half shell extending below each half of the hoop 36, thereby extending either a cover around the outside of the bag 40, or a stiffening mesh of the inside of the bag 40.

Of course, a bag 40 may connect to the hoop 36 illustrated by any of the means discussed hereinabove or elsewhere in this disclosure.

Referring to FIG. 16, various embodiments included in inset images as FIGS. 16A through 16D provide various alternative closures 38. The closure 38A may simply be a ratcheting band type of fastener. These may commonly be referred to as zip ties. Thus, the tail 80 simply constitutes any amount of the bag 40 that is unused. This may be a comparatively large or comparatively small amount if the closures 38 are used to affirmatively define and enforce the length of the bag 40, then the tail 80 may be substantial.

Referring to FIG. 16B, a closure 38a may include a ring 149a for receiving a loop of the material from which the bag 40 is constructed. After drawing a portion of the bag 40, having been already gathered together, and passing through the ring 149a, may receive a pin 149b through the loop of bag 40 fabric to provide a sufficient kink or change of direction and pressure that will effectively close the bag 40. A tether 149c may connect the ring 149a to the pin 149b to prevent misplacement or loss.

Referring to FIG. 16C, a simple drawstring 120 may be used as the closure 38c. The drawstring 120 may actually be threaded through loops, threaded through perforations in the material of the bag 40, may be contained with a sleeve therein, or may simply be wrapped around the bag 40 and knotted. A drawstring 120 will typically serve best if permanently secured in some type of a sleeve, belt loop, grommet, or the like.

Referring to FIG. 16D, in the tail 80 of the bag 40 may simply be rolled up and clipped together by a clip 149d sized to securely hold the tail 80 rolled up to an appropriate distance thereby closing the bag 40. Such a closure 38d is reliable and robust, and may take on many forms, including a spring type of clip 149d, a clamp, a rigid frame type of clamp with a threaded compressive foot increasing pressure to some value to maintain the tail 80 securely closed. The tail 80 may be wrapped up on a spool or rod before applying the clip 149d. This provides a comparatively harder surface than the comparatively compliant material of the bag 40.

Figure 17:
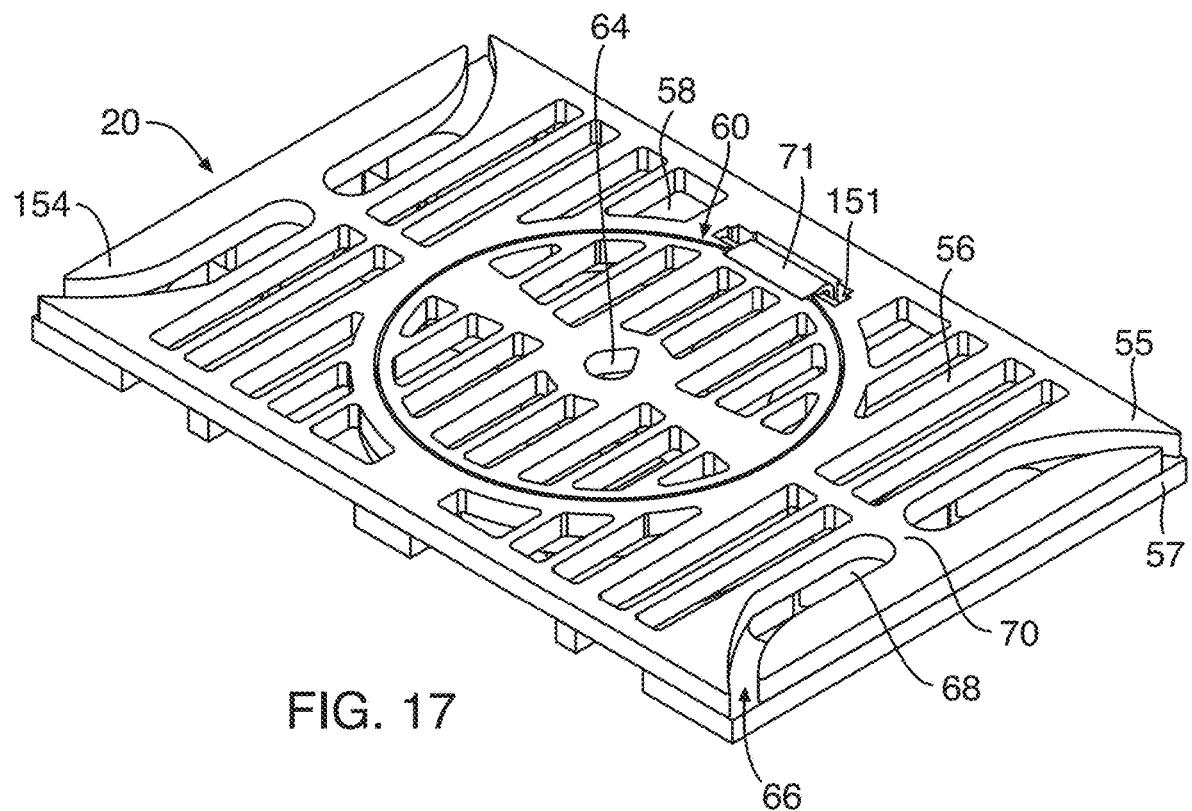
FIG. 17 is an upper perspective view of a storm grate (a grate) in accordance with one embodiment of such in accordance with the invention.
Figure 18:
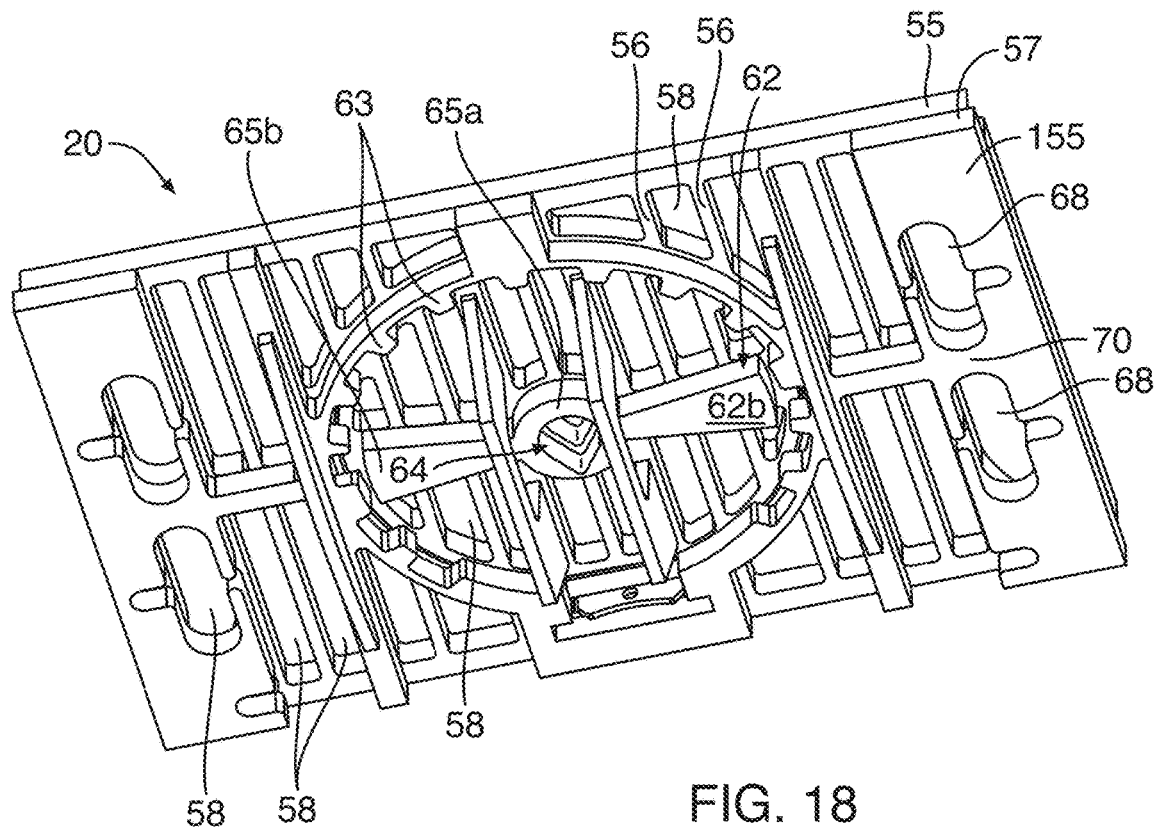
FIG. 18 is a lower perspective view thereof.
Figure 19A:
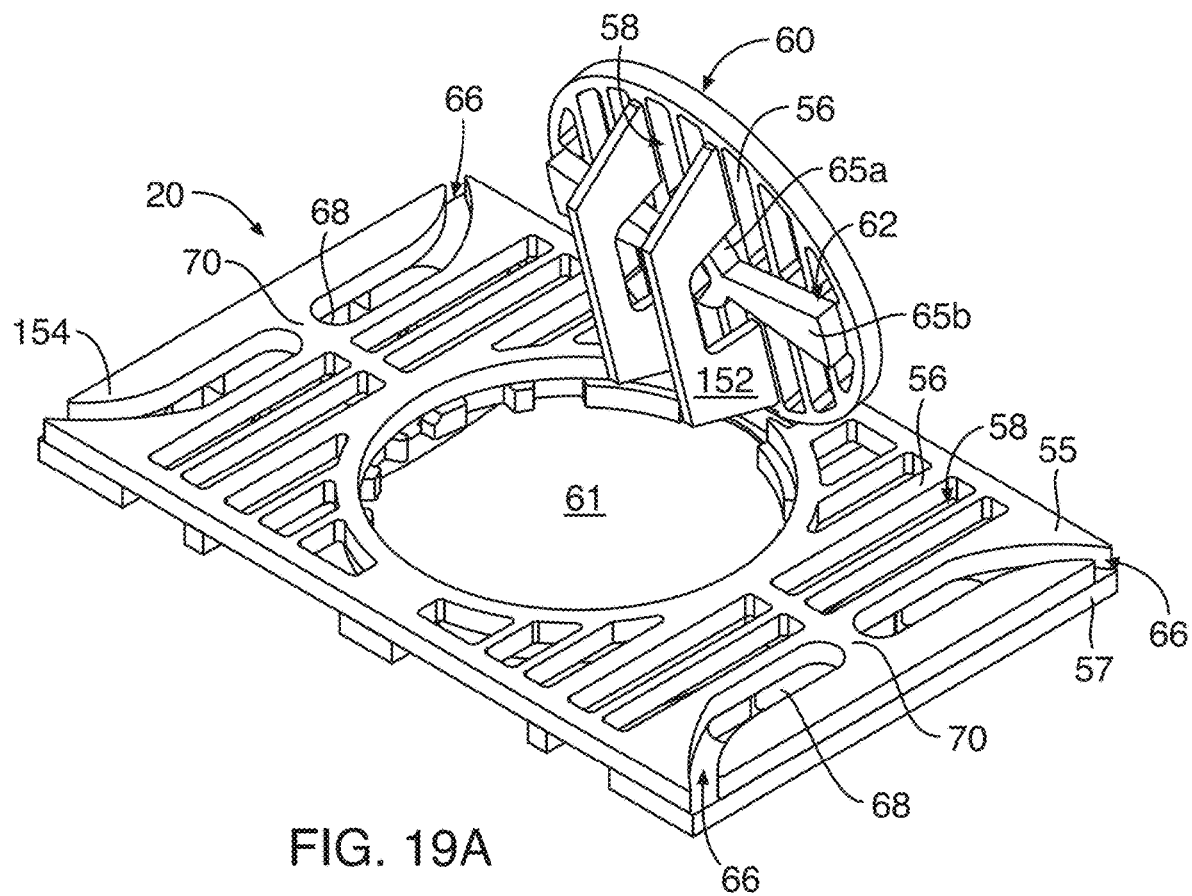
FIG. 19A is an upper perspective view thereof with an access port or lid as a hinged and removable grate independently openable and optionally removable from the principal grate thereunder.

Referring to FIGS. 17 through 19, while continuing to refer generally to FIGS. 1 through 35, a grate 20 may include a patterned shape of perforations 58 or openings 58 for receiving storm water or other runoff. In the illustrated embodiment, these openings 58 may of any suitable shape, defined by intermediate bars 56 or beams 56 capable of carrying a load, capable of restraining from entry certain large debris, and certainly for supporting vehicles passing thereover. In the illustrated embodiment, the grate 20 may actually be formed of an upper layer 55 and a lower layer 57.

This is not necessarily required, but such an embodiment allows for certain intentional differences between the pattern of bars 56 in the upper layer 55, and the lower layer 57. Thus, for example, a lock 62 may be provided for closing securely the access 60 or lid 60. The access 60 may be a small grate 60 in its own right provided with its own bars 56 and intermediate openings 58.

Significantly, a central opening 64 may operate as a keyway 64 or a keyhole 64 to receive a specially shaped key capable of opening the lock 62 positioned under the lid 60.

Referring to FIG. 18, while continuing to refer to FIGS. 17 through 19B, and generally to FIGS. 1 through 35, the lock 62 may be formed to have a hub 65a or hub portion 65a, and bars 65b or dog 65b. In one embodiment, the hub 65a and the bars 65b constitute one solid mass turned by a key entering the keyway 64, and fitted to engage the hub 65a and rotate therewith the bars 65b or dogs 65b. Meanwhile, protrusions 63 extending from the grate 20 may engage the lock 62 or the bars 65a of the lock 62 to prevent lifting of the comparatively lighter access 60 away from the comparatively heavier grate 20 to which it pertains.

In alternative embodiments, the bars 65b or dogs 65b may be separate from the hub 65a, and the hub 65a may actually operate as a cam or otherwise be linked to push the bars 65b outward under the protrusions 63, to lock, or inward away from the protrusions 63 in order to open or unlock.

In the illustrated embodiment, interceptors 66 redirect flow to urge it downward. In certain embodiments, the bars 56 may actually be louvers 56 or veins 56. In such embodiments, common in the art, the bars 56 become fins or hydrodynamically smooth veins 56 that immediately direct a flow of water downward upon entry into one of the apertures 58 or openings 58. This is to prevent overshoot by water passing across an aperture 58 from continuing to block water from entering a subsequent or adjacent aperture 58.

This may be understood as a shaped vane 56 or blade 56 that curves from an approximately horizontal topmost surface under the bar 56 to a substantially vertical or severely angled portion aiming water downward. Otherwise, water may drop into an aperture 58, and continue not horizontally, and not strictly vertically, but a combination forming a trajectory that therefore interferes with water dropping into the apertures 58 later on. Thus, it is often advisable to provide veins 56 as the bars 56. These may sometimes be referred to as louvers 56.

The interceptors 66 may be associated with apertures 68 specialized to flank a lift point 70 near one or each end of the grate 20. The access port 68 are actually a subset of the apertures 58, but are shaped, sized, and positioned to permit a hook or other suitable tool to reach down through one of the ports 68, around the lift point 70, and up through the adjacent access port 68. In this way, a grate 20 may be quickly removed.

However, in the illustrated embodiment, including the access 60, the lock 62 may be actuated to unlock the access 60 or 60b, which may then be opened and tilted up on its hinge 71. The hinge 71 may actually be configured in a unique way. In certain embodiments, the hinge 71 may be formed by a pin (rod) under an L-shaped outer member that, when the access 60 is unlocked, permits the access 60 or access grate 60 to be lifted off directly in vertical translation (linear movement). By providing sufficient space, the outermost member of the hinge 71 may wrap around a pin secured to the grate 20 and set the access grate 60 in an upright orientation. In fact, providing a sufficiently large gap 151 around the hinge 71, the access grate 60 may be lifted to a vertical orientation, and dropped slightly into the gap 151 which thereby forms a stand containing the access grate 60 in an upright, stabilized position.

For example, added to a basic grate 20 may be sponsor identifiers 157a, logos 157b of sponsors, manufacturers, or advertisers, advertising 157C of businesses, causes, slogans, or reminders, medallions, 157d showing certifications, registrations, inventory numbers, or asset ID of a city, or a manufacturer's "boiler plate"157e.

In certain embodiments, the protrusion 63 may be replaced by a shelf 63. In fact, in the illustrated embodiment, certain of the protrusions 63 are circumferentially longer than others, thus providing something of a shelf 63 on which the access grate 60 may rest.

In certain embodiments, in order to alter access or protect the lock 62 or even to sufficiently stiffen and strengthen the section modulus of the access grate 60, additional reinforcements 152, here shown as yokes connecting to the bars 56 of the access grate 60 and open to step over or bypass any interference with the lock 62.

Figure 19B:
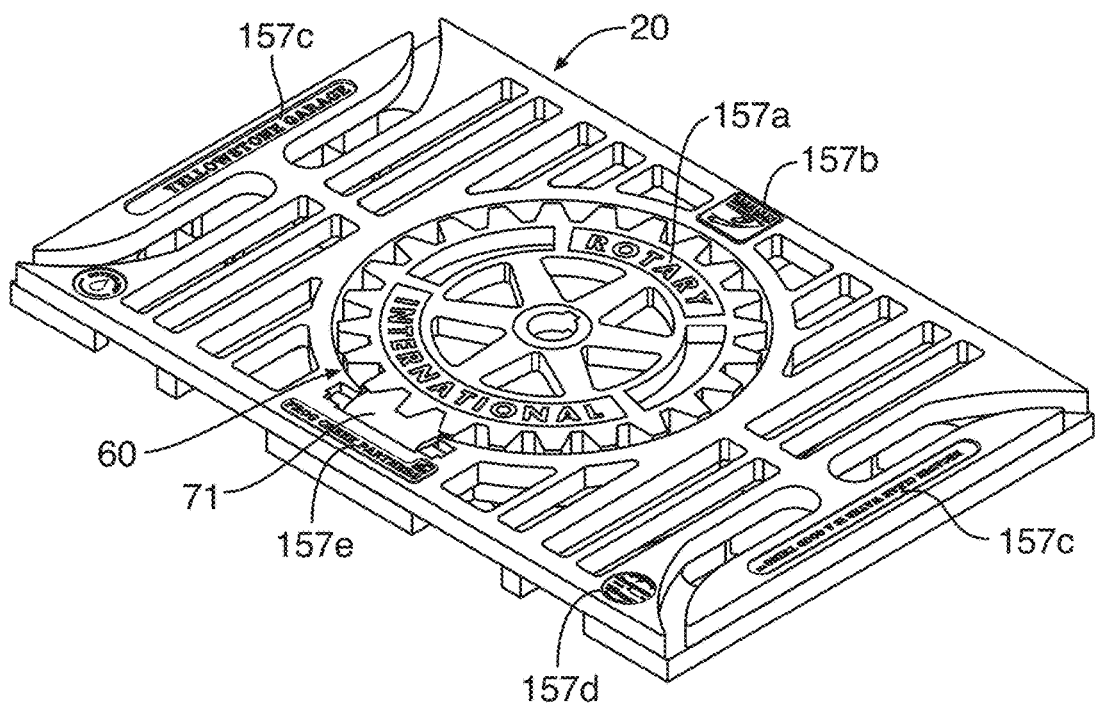
FIG. 19B is an upper perspective view of an alternative embodiment thereof.
Figure 20:
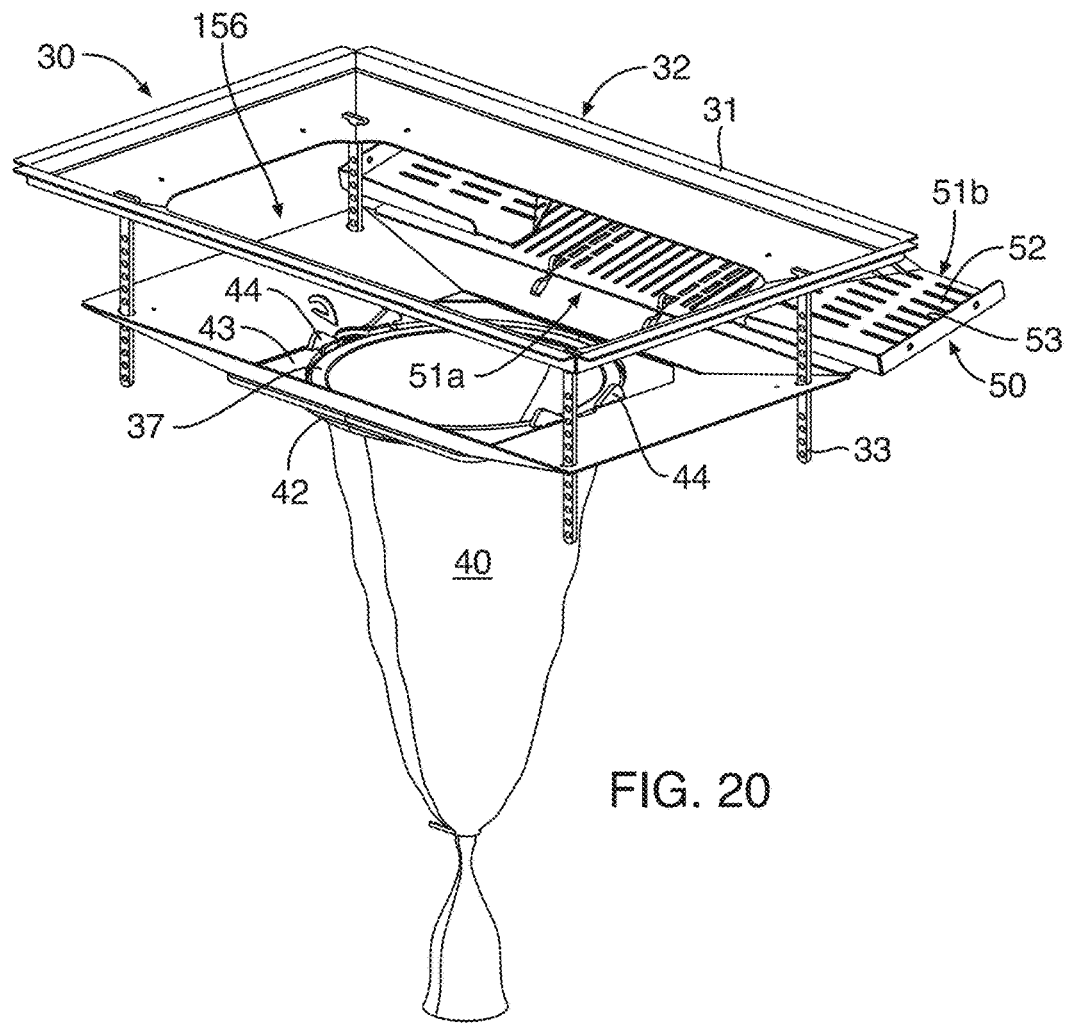
FIG. 20 is an upper perspective view of a direction system or collection system, including a funnel, a hanger, and a filter, for collecting storm water from the inlets of storm drains of various configurations and directing it toward a filter bag in accordance with the invention, this both a funnel system and a filter hanger as well as a filter, configured as a filter bag.

Referring to FIG. 19B, in certain alternative embodiments, the access grate 60 or the lid-like access 60 may actually contain a logo, image, inscriptions, or the like. Accordingly, the shape of its bars 56 and apertures 58 may be modified in order to provide a particular shape, words, symbols, trademarks, logos, or the like. Similarly, along with the access ports 68, other apertures may be formed through the grate 20 to receive fasteners.

For example, just as the interceptors 66 provide additional relief (depression, reduction in height, defilade space beneath an upper surface of the grate 20), other recesses may be formed in the grate 20 to receive logos, labels, warnings, sponsorship identification, messages, or the like.

These may be indented to be protected by the upper surface 154 of the grate 20, by being suppressed slightly therebelow.

To do this, a recess need be formed such as the interceptors 66, which recess may not be open on any of its perimeter. Thus, dropping a medallion 157 or the like into such a recess, and fastening it there may be done by a fastener penetrating through from the underside 155 or under surface 155 of the grate 20. This may permit securement thereto and protection thereby, with respect to the top surface 154 of the grate 20.

Referring to FIGS. 20 through 23, while continuing to refer generally to FIGS. 1 through 35, details of both the funnel 32 and the hanger 34 are illustrated, as well as the filter bag 40 or filter 40. In the illustrated embodiment, one will see the details of the embodiment of a frame 31 surrounding a funnel 32. As a practical matter, the frame 31 need not be attached to the funnel 32.

For example, in certain embodiments, the funnel 32 may be formed of a flexible material. That flexible material may be captured by a pinch between the grate 20 and the surrounding frame 26 or ledge 27 of the catch basin 12. Also, for example, a material forming the funnel 32 may simply be deployed having an aperture 156 sized to pass incoming water down to the hanger 34 and ultimately through the hoop 36 and rim 37. So long as the edges of that material may be secured against slipping out, it may be held in place by fasteners, pins, grips, corrugations, shaped "ways" and mating grooves matched to pinch the funnel 32 therebetween, or the like.

A frame 31 for the funnel 32 need not be required. In other embodiments, the frame 31 may simply be constituted by rods or bars rolling up excess material of the funnel 32 membrane, and then being captured, locked, or otherwise fastened, in any suitable manner near the frame 26 under the grate 20 of the catch basin 12.

The funnel 32 may have an opening 156 sized in any appropriate dimension and shape. In one embodiment, the opening 156 may be shaped to correspond to, but exceed, the size of the hoop 36. For example, for easy access, one may lift a grate 20 or an access grate 60 having a clearance diameter of open space sufficient to pass the rim 37 and hoop 36 with the suspended bag 40 therebelow completely up from the seat 42 of the hanger 34 and up through the opening 156 of the funnel 32. Thereby, access for removal, emptying, washing, turning inside out, pressure washing, back flushing, or otherwise cleaning, destroying, recycling, or reusing the bag 40 with or without its contents 40 may be implemented.

One may see that the seat 42 may be stepped. In alternative embodiments, it may simply be sloped in order to receive a hoop 36, such as the hoop 36 of FIG. 15D. Nevertheless, a stepped shape having a horizontal surface and a vertical surface to capture, align, and otherwise register radially and axially (vertically) the hoop 36 and rim 37 of the filter system 30 therein.

Figure 21:
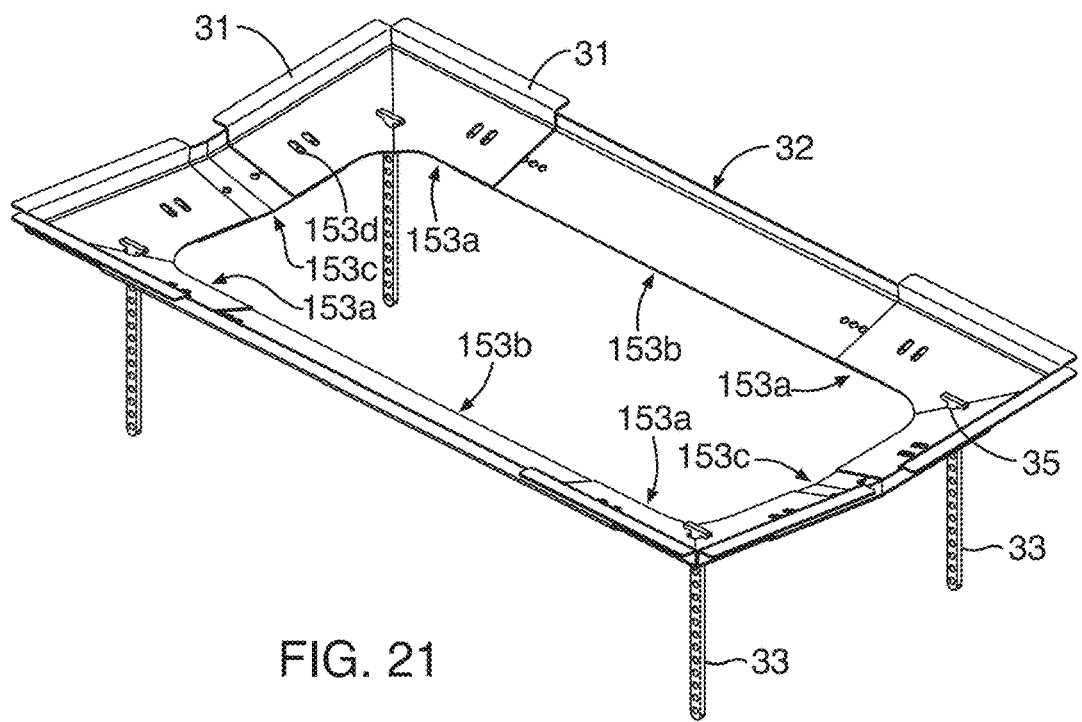
FIG. 21 is an upper perspective view of an alternative embodiment of funnel as an assembly in accordance with the invention, this being adjustable on all sides and including supports for a filter hanger to be suspended therebelow.
Figure 22:
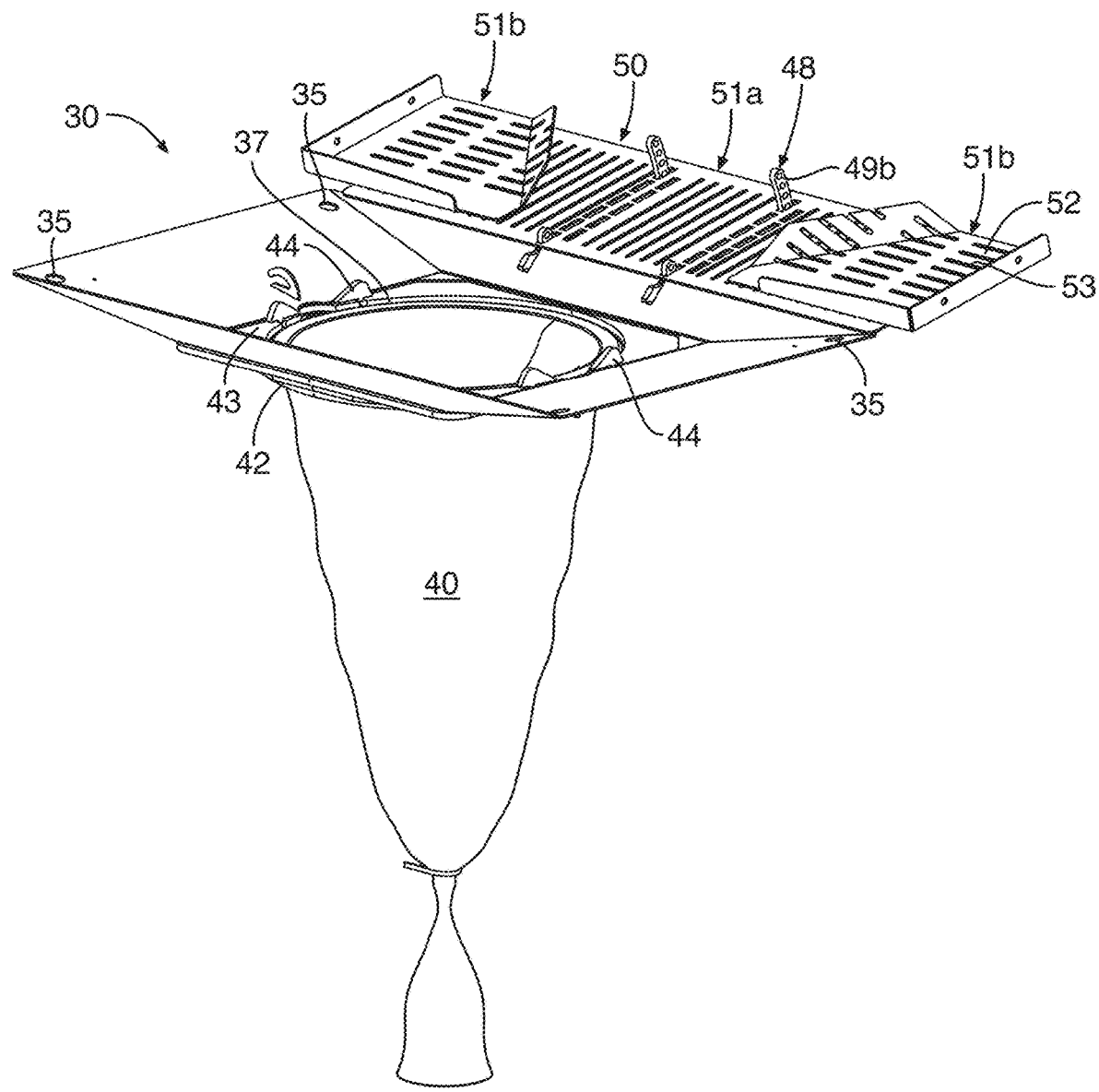
FIG. 22 is an upper perspective view of a filter hanger, with its diverter for capturing water from a curb inlet and a street grate inlet, simultaneously, and directing such flow into a filter bag in accordance with the invention, including a deck and wings for the diverter rendered adjustable thereby, and provided with shingled (cascading) louvers and slots alternating to direct all pollution objects and materials toward the filter hanger and ultimately the hanger.
Figure 23:
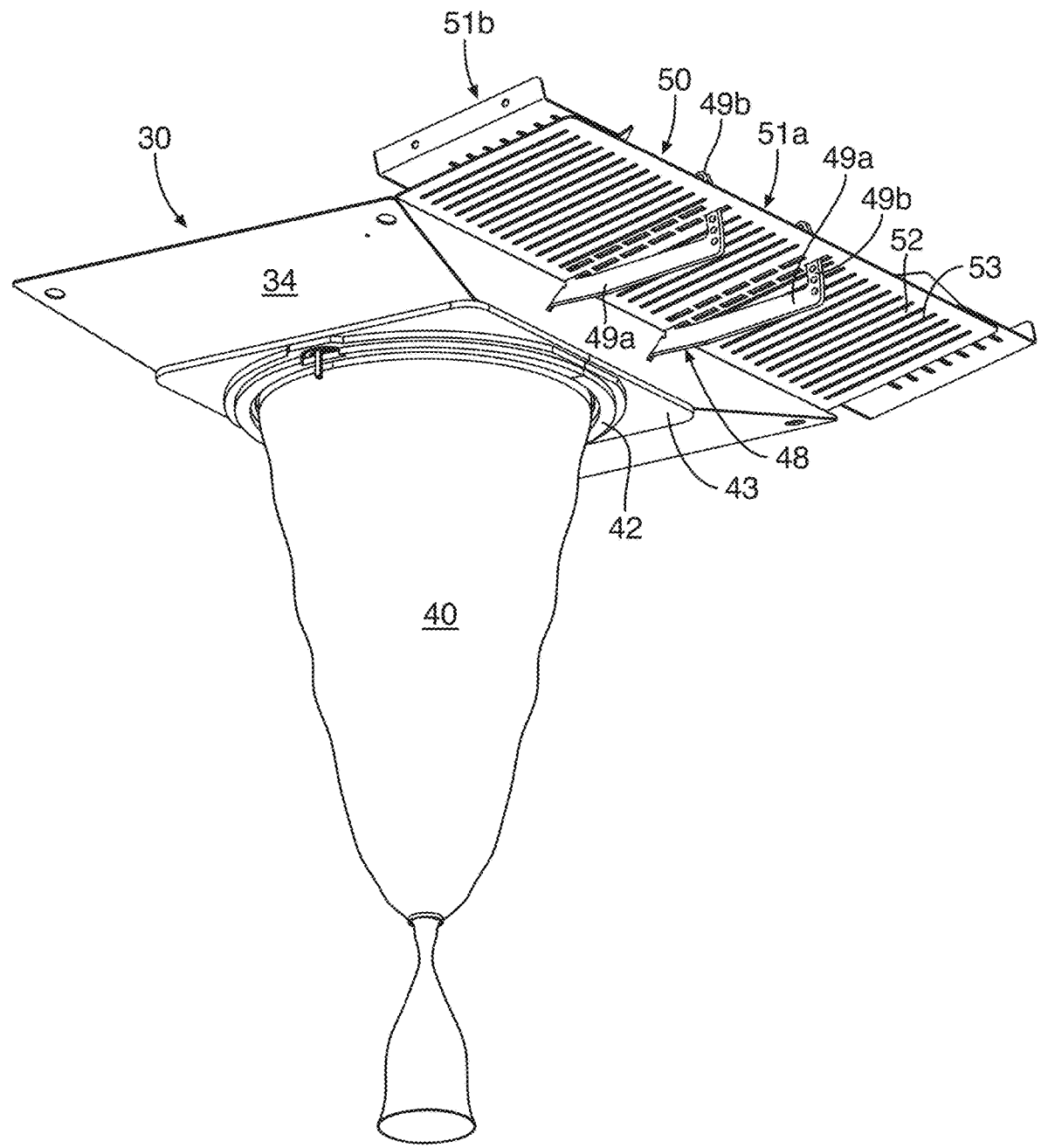
FIG. 23 is a lower perspective view thereof.
Figure 24:
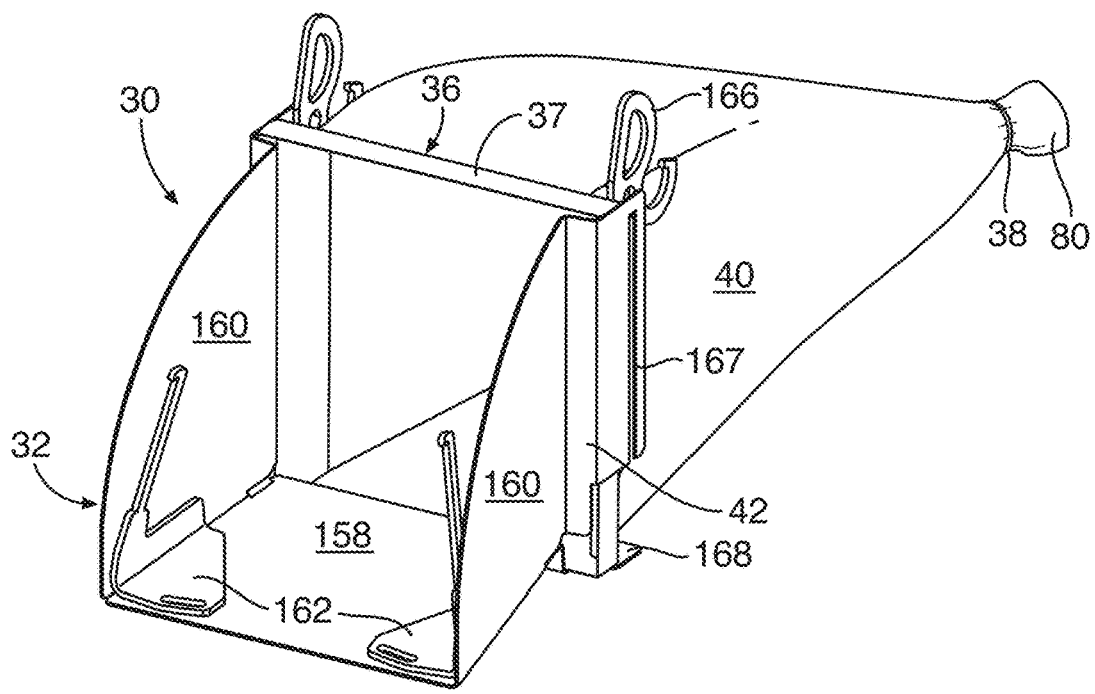
FIG. 24 is an upper, frontal, perspective view of an alternative embodiment for a channel filter system in accordance with the invention, this embodiment directed to capturing storm water or other pollution from storm water from open channels.
Figure 25:
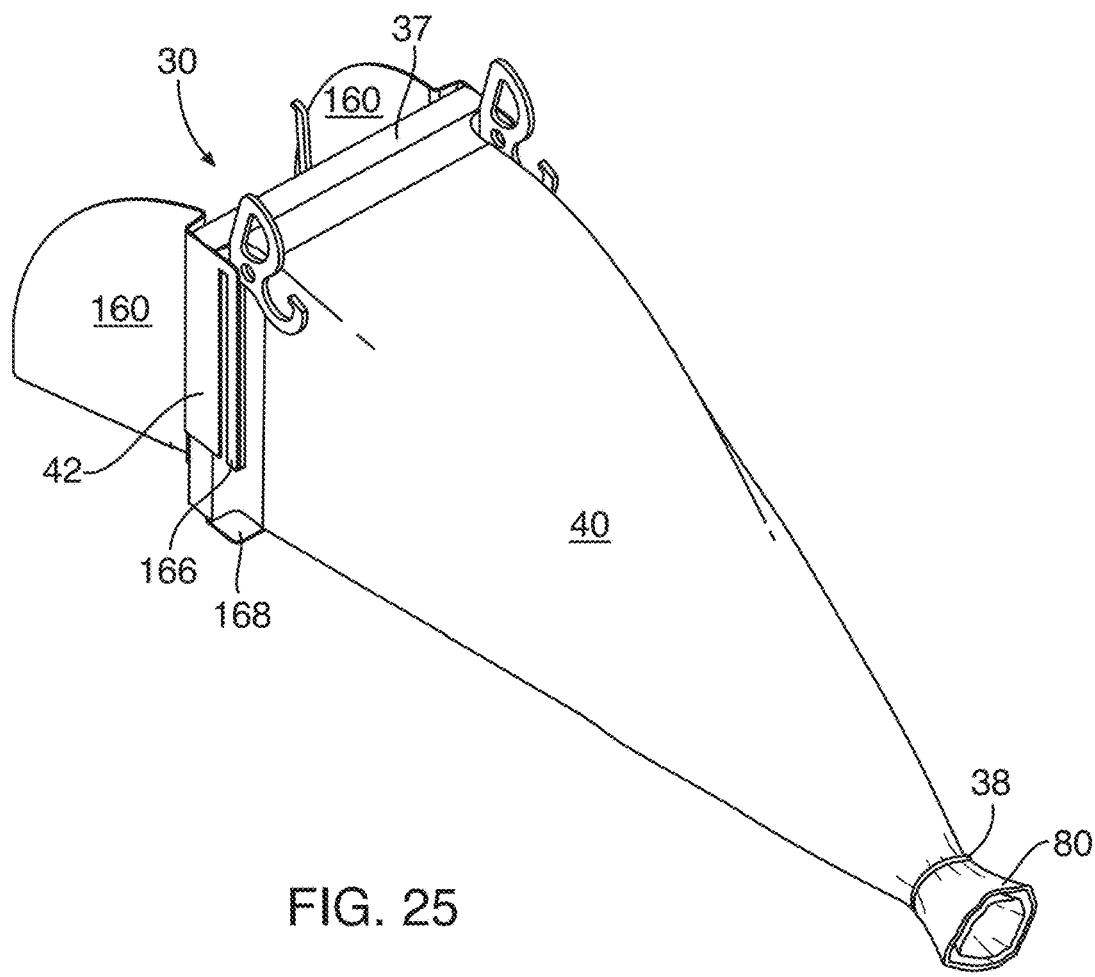
FIG. 25 is an upper, rear, perspective view thereof.
Figure 26:
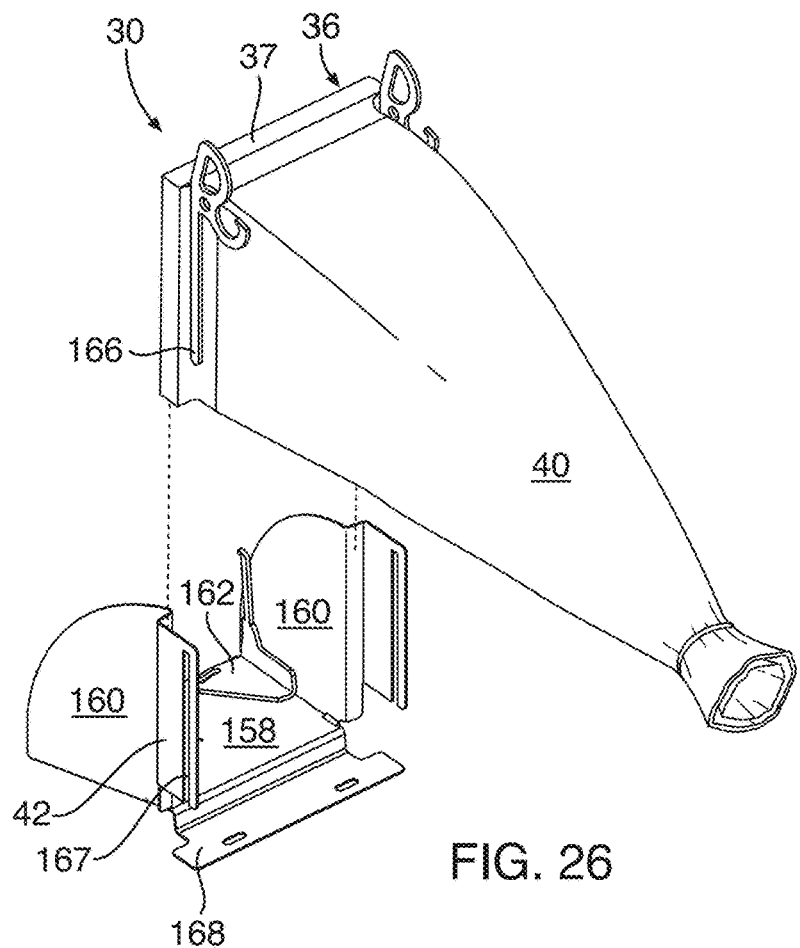
FIG. 26 is an upper, rear, exploded, perspective view thereof.
Figure 27:
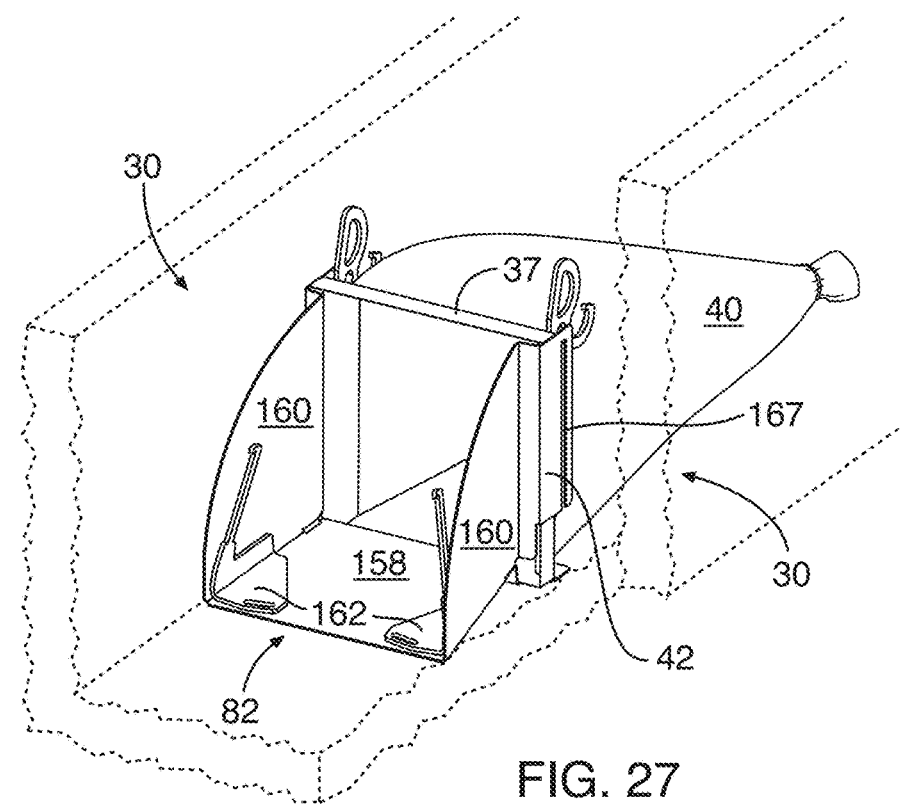
FIG. 27 is an upper, frontal, perspective view of the capture and filter system of FIG. 24, illustrating its installation in an open channel.

The wings 51a, 51b are an optional feature for those catch basins 12 having a curb inlet 14b immediately adjacent or actually continuous therewith. The configuration of a hanger 34 to receive the supports 33 is as described hereinabove. Nevertheless, other methods of binding or otherwise fixing the hanger 34 to the supports 33 that may be used. Referring to FIG. 21, a funnel 32 may be configured to be universally adjustable. Rather than the frame 31 being continuous and formed of a single piece of sheet metal, plastic, flexible sheet materials, or the like, it may be formed of interlocking and adjustable components 153a through 153c.

For example, in the illustrated embodiment, four corners 153a or corner pieces 153a may be spaced apart on, or otherwise may be engaged with, adjustable sides 153b and ends 153c. Apertures 153d passing through each of the pieces 153a through 153c admit fasteners therethrough in order to adjust the relative positions thereof.

For example, the sides 153b and ends 153c may have multiples holes admitting of numerous positions by which to match (align with) corresponding apertures 153d in the corners 153a. Thus, a single set of corners 153a may be used in conjunction with a set of sides 153b and ends 153c to accommodate numerous different sizes of grates 20 and their underlying catch basins 12.

Meanwhile, supports 33 acting as connectors 33 between the funnel 32 and the hanger 34 positioned therebelow, may drop through the apertures 35, and stopped in place by heads thereon, or pins, as inserted into the supports 33 below the hanger 34.

Referring to FIGS. 24 through 27, a filter system 30 may be configured as a channel 82 oriented system 30. In the illustrated embodiment, the funnel 32 may be comprised of a floor 158 or ramp 158 connected to direct water from a channel 82 into the filter bag 40. The floor 158 may connect to wings 160. Typically, the wings 160 are pivotable to open up sufficiently to substantiate occlude or cover the channel 82.

Thus, the floor 158 or ramp 158 is deployed to capture substantially all water running along the channel 82, while preventing depositing of entrained solid pollution in front of the filter 30. The wings 160 are deployed against outer boundaries of the channel 82, the adjusters 162 may be fixed to stabilize the floor 158 and wings 160 with respect to one another. One will notice on the back or downstream edges of the wings 160 a registration surface 164. In the illustrated embodiment, this is shown as forming a right angle. It may actually be a slot (C-shaped like channel iron in cross section). It thus encloses the rim 37 of the bag 40 and its interior, rectangular hoop 36 not visible, although present as described hereinabove. In the illustrated embodiment, pins 166 may insert into slots or to engage slots 167 in the wings 160, thereby holding the rim 37 in place.

Accordingly, an anchor portion 168 or anchor 168 may be fastened to the bottom of the channel 82 in order to secure the funnel 32 therein. The anchor 168 may take various shapes, and may be positioned to hold the wings 160 against sides of a channel 82 instead. However, bypassing underneath by water is the commonly expected problem.

In practice, the adjusters 162 may be secured by some suitable fastener to fix to the floor 158 and the wings 160. Each adjuster 162 may pertain to a single side of the channel 82. Meanwhile, the floor 158 and adjusters 162 may be integrated into a particular shape, may be molded of a polymer or fabricated from a sheet material and secured in the channel 82 and to the bag filter 40 by its rim 37.

Figure 28:
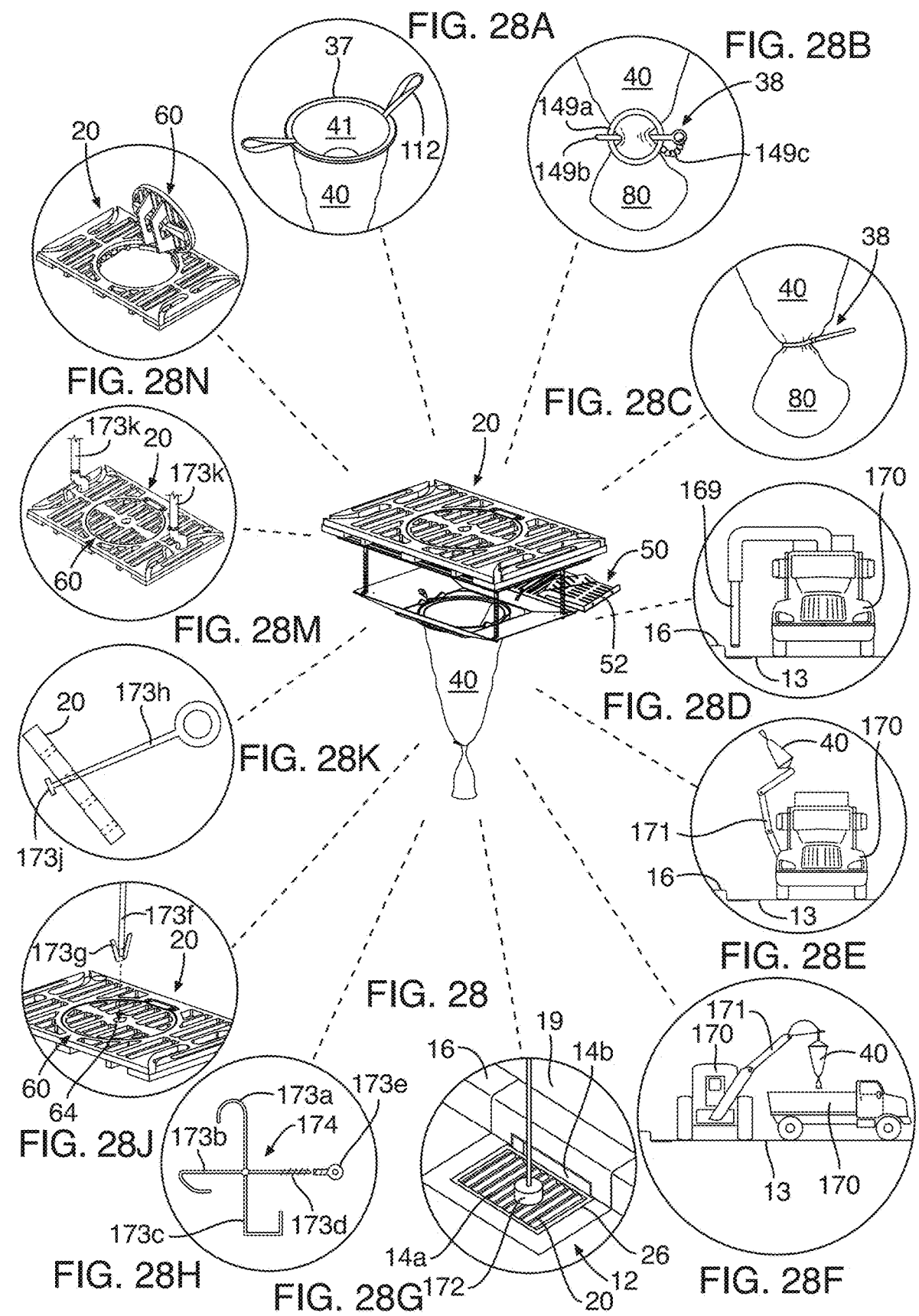
FIG. 28 (including image insets labeled as FIGS. 28A through 28H, 28J, 28K, 28M, and 28N) is a series of perspective and elevation views of various alternative embodiments of access, and facilities therefore, to maintain, clean, and otherwise service a storm drain filter system in accordance with the invention.
Figure 29:
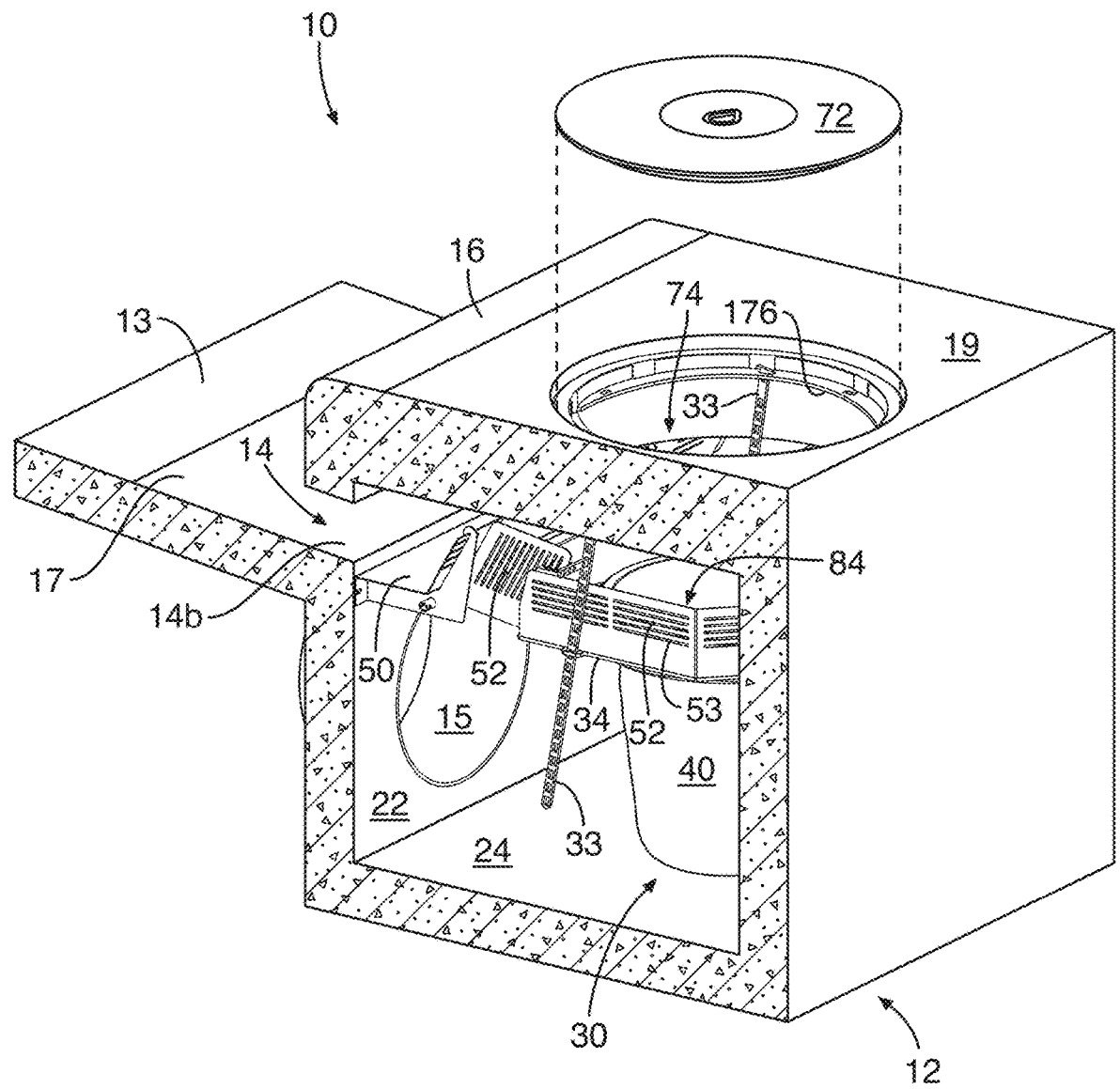
FIG. 29 is a partially cut away, upper, perspective view, partially exploded, of one embodiment of a curb-inlet-type of storm water filter system in accordance with the invention, this is typically installed under a sidewalk.
Figure 30:
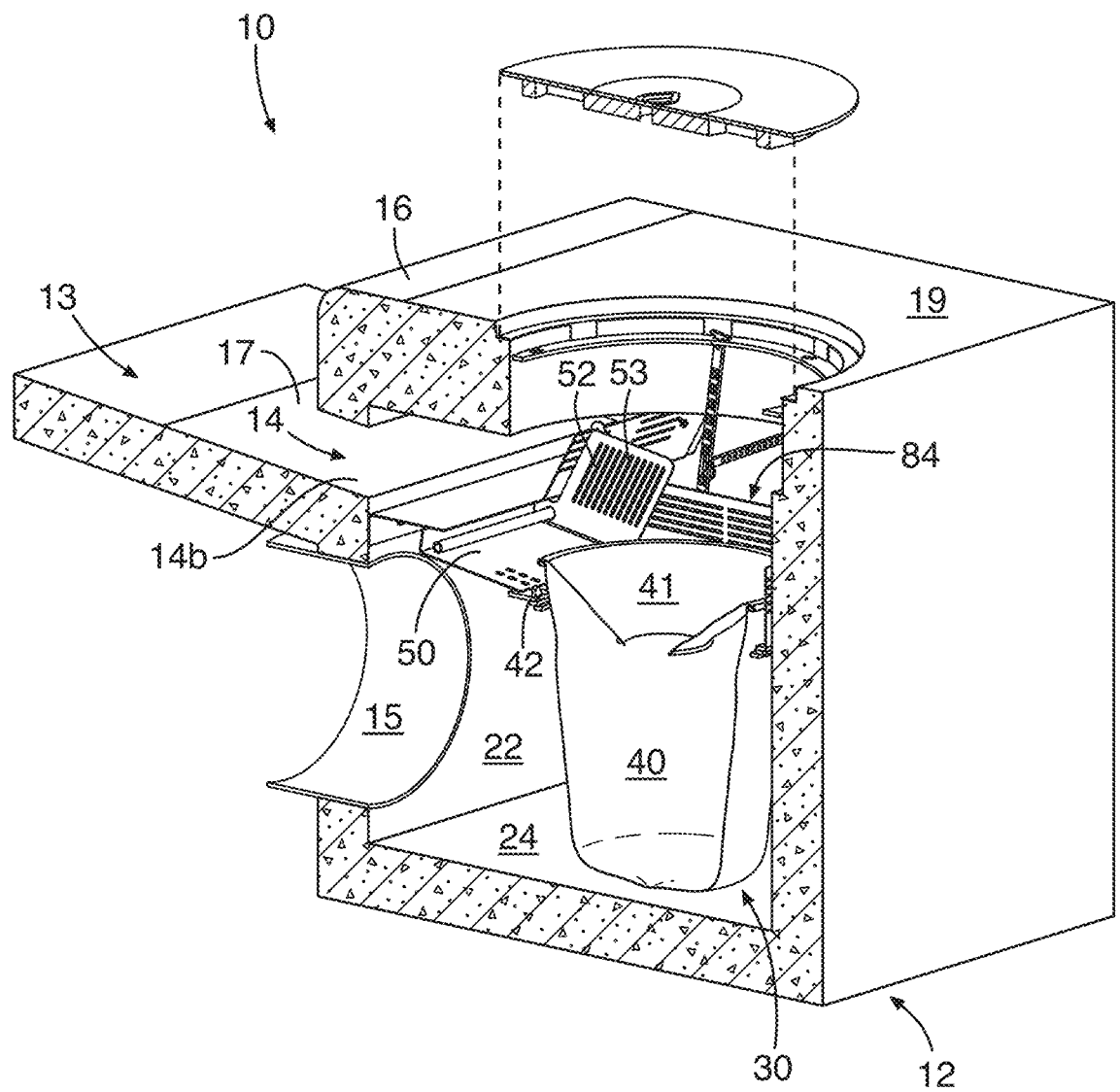
FIG. 30 is a cut away, upper, perspective view thereof illustrating additional details.
Figure 31:
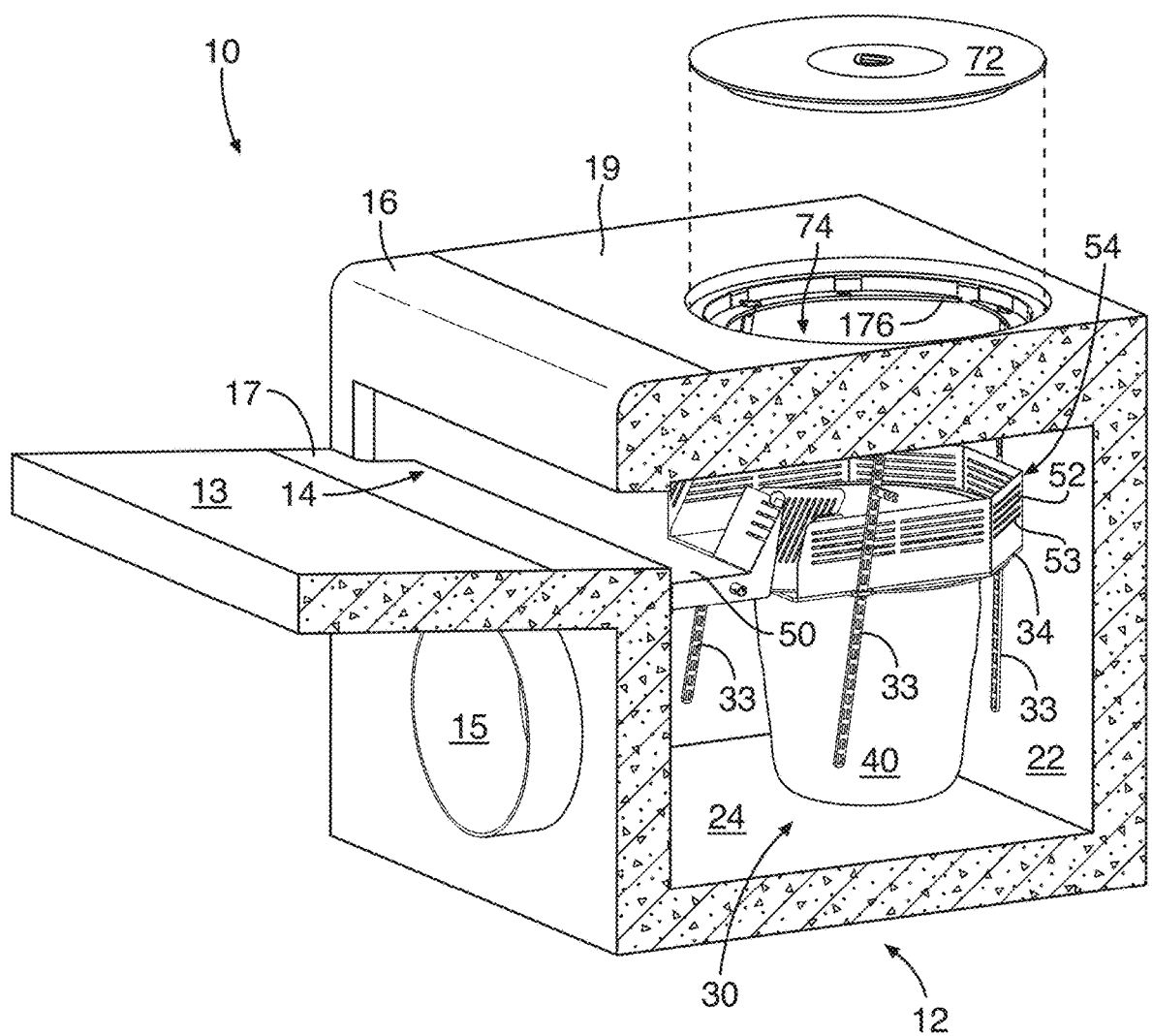
FIG. 31 is a cut away, upper, perspective view thereof from the gutter side of a curb inlet.
Figure 32:
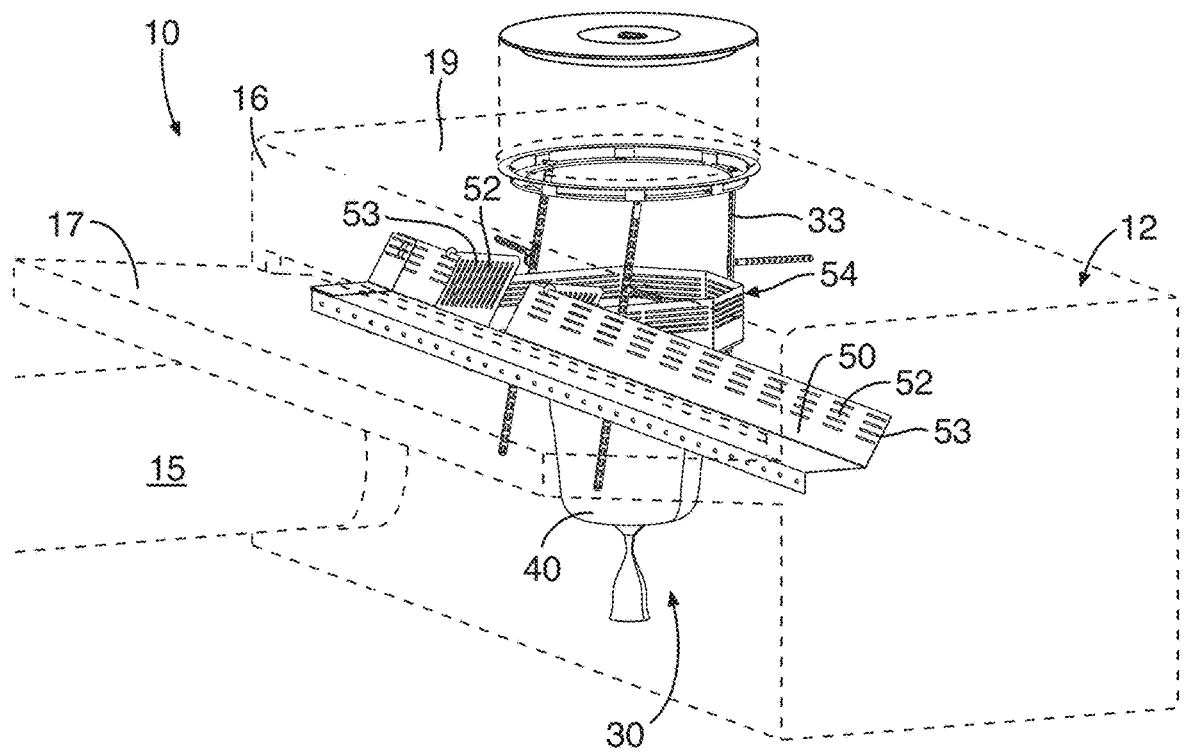
FIG. 32 is an upper, perspective view of the filter system of FIGS. 29 through 31, this view illustrating certain diverter and backsplash structures, with the infrastructure of curb, gutter, sidewalk, catch basin, and drain pipe shown in broken lines.
Figure 33:
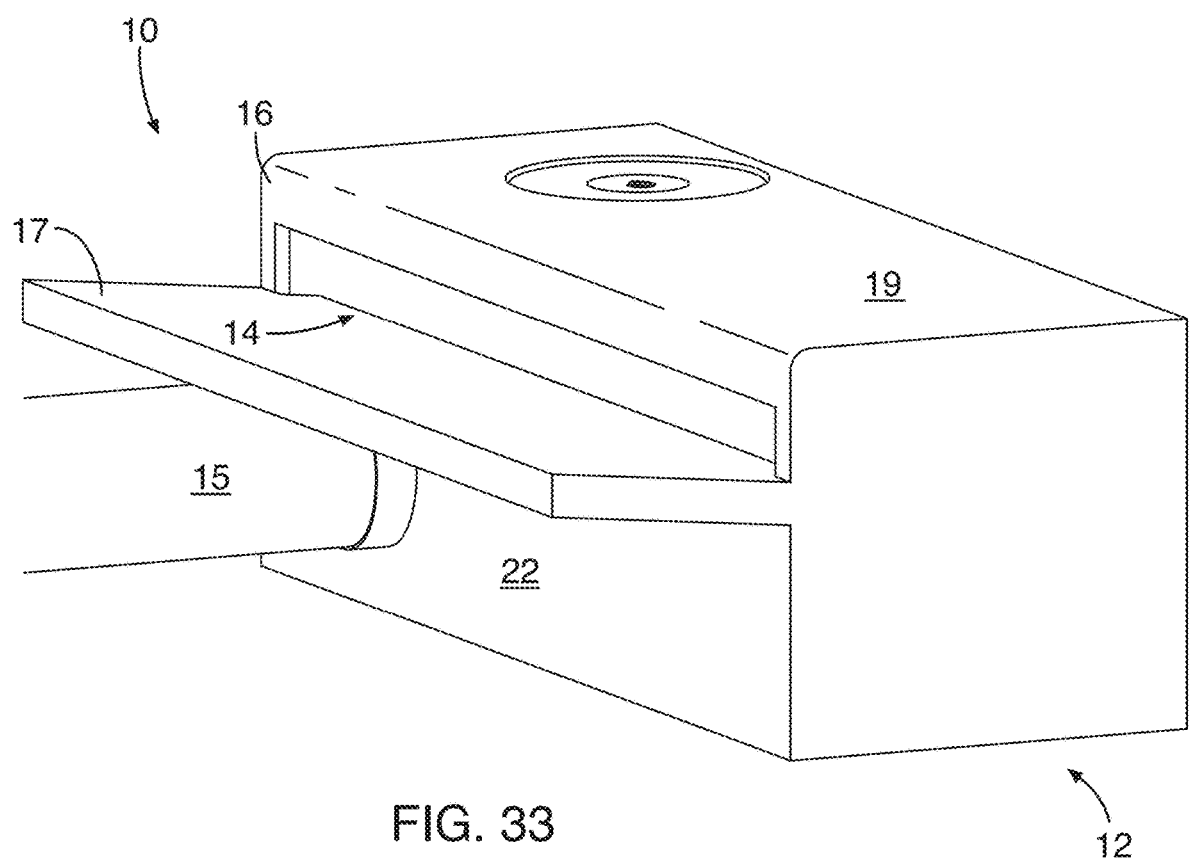
FIG. 33 is an upper, frontal, perspective view of the infrastructure environment illustrating curb, gutter, sidewalk, manhole cover, and drain pipe for an installation as illustrated in FIGS. 29 through 32.

Referring to FIG. 28, which includes inset images identified as FIGS. 28A through 28N, various additional options, components, and subsystems access and service as necessary for a system 10 in accordance with the invention.

Referring to FIG. 28A, the familiar filter bag 40 is illustrated with the lifting straps 112 attached thereto. As discussed hereinabove, various versions of lifting straps 112 are discussed hereinabove, and provide a simple, straightforward, and durable mechanism for removing the bag 40 by its rim 37 directly from its seat 42 in the hanger 34.

Referring to FIG. 28B, the closure 38 as described hereinabove may provide access out the bottom end of the filter bag 40. By removing the pin 149b from the ring 149a, the tail 80 of the bag 40 may be released to become simply an opening for dumping the content of the bag 40. Thus, access need not be exclusively through the rim 37 of the bag 40.

In fact, in this type of a configuration, removal of the ring 149a and pin 149b to free the bag 40 to its full diameter permits passage of a siphon, a vacuum line, a sprayer hose, or the like through the bag 40. In certain alternative methods, the bag 40 may be turned inside out and sprayed from within its inside-out shape. This provides back flushing from the outside to the inside. This may dislodge all sizes of pollution. That includes debris, all pollutants, and all fines except for chemically bound materials. Chemically bound materials may need to be removed from the bag 40 by a chemical wash, elevated temperatures, extraction by reacting with some other solvent, reacting with preferential chemical that will remove them from activated carbon or other absorbants or adsorbants in the constitution of the bag 40.

Referring to FIG. 28C, the closure 38 may be of any particular type. Various types may be easier to open than others. For example, if a zip tie is used as a closure 38, than it must be cut to free up, and therefore must be replaced upon reuse. This may provide no problem. Nevertheless, the selection of this type closure 38 may be made to more readily open the closure 38, clean the bag 40, and again engage the closure 38. Rolling up the tail 80, or other mechanism may be preferable. The bag 40 may be used for only one use. This would apply for situations using forest products or combustible fiber products, for a non-woven inner layer 134, or for any layer for collecting fines. An outer layer 136 may be removed, to be reused, while an inner layer 136 is extracted and thrown away in a landfill, consumed in an incinerator, or embedded as a recycled form of "sandbag" in an earthen structure.

Referring to FIG. 28D, one method of access is to drop vacuum line 169 through an access 60 to remove the contents of a bag 40. This may be done as part of evacuating out the entire catch basin 12. For example, the bag 40 may be opened at the closure 38, and pressurized flush may be administered by a wand containing spray heads being passed down through the interior of the bag 40. Accordingly, at the same time, the vacuum line 169 may be passed down to empty out solids from the bag 40, and to retrieve any wash residue or other contents that have dropped to the floor 24 of the catch basin 12.

Referring to FIG. 28E, a disposal truck 170 may access the grate 20 by opening or removing it and then retrieving the bag 40 using an articulated arm 171. Thus, any service truck 170 may have the proper equipment 169, 171, of any necessary configuration to access the contents of the bag 40 in order to collect them and transport them to another location. In various types, and equipage for, trucks 170 or vehicles 170 may be employed in order to transport contents or the bag 40 away from a catch basin 12 to be serviced by replacement, emptying, washing, recycling, re-purposing, or the like.

Referring to FIG. 28F, one vehicle 170 may operate as a lifter. Another vehicle 170 operates as a transporter carrying the bags 40 after collection to a particular location for servicing or other disposition together at some central location rather than being serviced immediately onsite.

Referring to FIG. 28G, an alternative method of accessing the filter system 30 within a catch basin 12 is by a strong electromagnet 172 suspended from an articulated arm 171 on a vehicle 170. In this embodiment, the electromagnet 172 may be placed on a grate 20 and energized to attract it, permitting the articulated arm 171 to lift the grate 20 away from the catch basin 12 to be replaced in the same process, reversed, after servicing the system 30.

Referring to FIG. 28H, various specialized tools 173a through 173d may be connected on a multi tool 174. In the illustrated embodiment, the multi tool 174 may be connected by its center to any attachment scheme to be suspended from an articulated arm 171 on a service truck 170 or other vehicle 170. In the illustrated embodiment, the tool 173a is a hook of a particular shape, such as might access the lift point 70 on the grate 20. Similarly, grates 20 having a different shape of beam 56 may instead require a different shape of hook 173b.

Likewise, alternative shapes such as the tool 173c may be required. By having a single multi tool 174, access to various objects may be available. For example, the shape of the tool 173c may best fit under the lift point 70 of a grate 20. Meanwhile, the hook 173a may serve to connect to the filter bag 40. Meanwhile, the tool 173d may be threaded in order to engage a threaded and cooperative attachment 173e on the grate 20 or some other location.

Referring to FIG. 28J, in one embodiment, a tool 173f may include a barb 173g that will pass through the keyhole 64 or keyway 64. In this instance, the keyway 64 may be directly in the grate 20, or in the smaller access grate 60. In either event, the barbs 173g may pass through the keyhole 64 then spring open to engage the grate 20 or access grate 60. Retraction of the barbs 173g may permit extraction of the tool 173f after replacement after the grate 20 or access grate 60 to their appropriate places.

In another alternative embodiment, a grate 20 may simply be accessed by a tool 173h in which a key portion 173j passes through a keyhole 64, to then be rotated to engage the grate 20 or access grate 60 for removal. In this embodiment, various contemplated configurations may be used to provide additional benefits. For example, a tool 173h may include a spring, or a scale to read out the weight. Similarly, the multi tool 174 may include a hook with a scale as one of the individual tools 173.

One should note that each use of a reference numeral with a trailing letter is simply an instance of a category of items identified by the reference numeral itself. Accordingly, it is proper to speak of the tools 173 as a group, while identifying individual instances of tools 173 by their designated trailing letters such as 173a, 174f, and so forth consistent throughout this disclosure.

Referring to FIG. 28M, tools 173k may be hooks 173k for engaging the lift point 70 through the access ports 68 as described hereinabove. In this instance, the entire grate 20 with or without the access grate 60 (in other words, whether a new type of grate or a conventional grate) may be accessed by the hooks 173k to lift the grate 20 to access the interior of the catch basin 12, and specifically the filter system 30 for service.

Referring to FIG. 28N, the access grate 60 as described hereinabove. Thus, the various options illustrated in FIG. 28 provide numerous ways to get access to the filter system 30, to pass through the funnel 32 to access the filter bag 40, and provide services to refurbish, recycle, replace, or otherwise deal with the collected pollution.

Referring to FIGS. 29 through 33, a catch basin 12 may be serviced in a somewhat different manner than described hereinabove. For example, in certain environments, a manhole cover 72 and the associated manhole 74 may be installed in a sidewalk 19. Such a system 10 may service a gutter 17 along a street 13 bounded by a curb 16. In the illustrated embodiment, the manhole cover 72 need not be a grate 20.

Nevertheless, it may be provided with a lock 62 in accordance with the invention or of some other type. Notable in this illustrated embodiment are the presence of a diverter 50 configured to collect along a rather extensive length of curbing 16, and the inlet 14 passing thereunder toward the catch basin 12.

In this embodiment, a filter system 30 may be installed that requires a diverter 50 fitted by a combination of a deck 51a and wings 51b substantially more extensive than in a conventional street type grate 20. In this particular embodiment, the inlet 14 into the interior of the catch basin 12 must move the water a substantial distance to access filter bag 40.

In this instance, because the manhole cover 72 and its associated manhole 74 are offset away from the inlet 14, the filter system 30 may be suspended from the periphery 176 defining the diameter and circumference of the manhole 74. Accordingly, the supports 33 may pass directly from a perimeter 176 of securement in the manhole 74, down to support a funnel 32, a hanger 34, both, or simply one thereof.

For example, since the significance of the diverter 50 is essential to this configuration, in order to handle the offset and still be able to access directly to the filter bag 40 upon opening the manhole cover 72, the deck 51*a* may be extensive, and may tend to direct all of the flow through a particular opening, passing the water toward the filter bag 40 with the backsplash 84 may be preferred.

In the illustrated embodiment, the other accoutrements of louvers 52 and apertures 53, providing cascading of overflow toward the filter hanger 34 or hanger 34 will still operate as described hereinabove.

Figure 34:
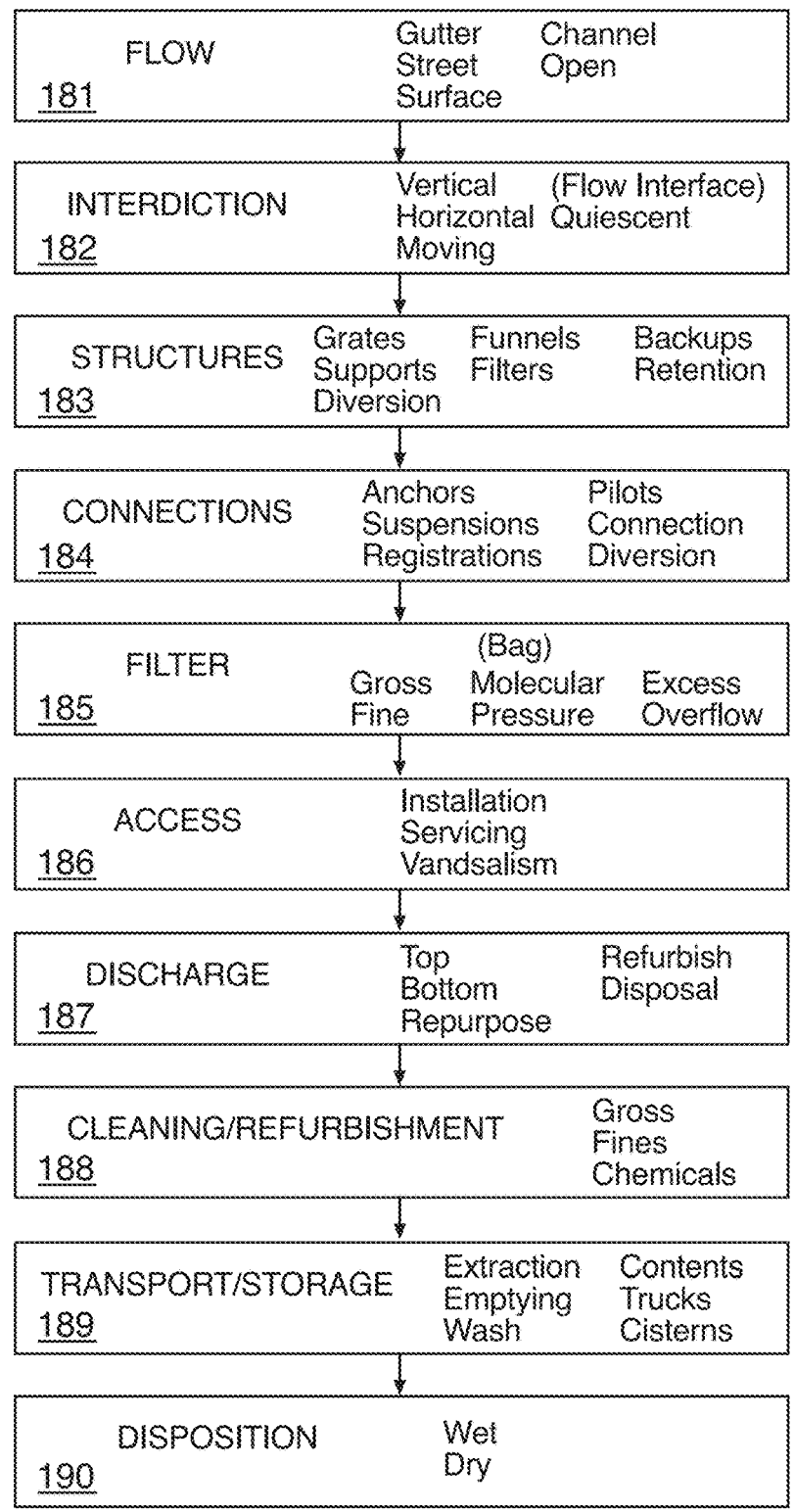
FIG. 34 is a schematic block diagram illustrating the individual process steps and subsystems, wherein each block may represent both a physical subsystem of an overall storm water drain and filter system, as well as representing the components for that particular step of such a method.

Referring to FIG. 34, a process 180 or method 180 in accordance with the invention may also be interpreted as specific components in subsystems. Thus, each schematic block diagram should be interpreted to represent not only the hardware component of the subsystem, but also a similarly named system in deploying, implementing, operating, and servicing an apparatus in accordance with the invention.

The process 180 or method 180 includes the steps of flow 181, interdiction 182, structures 183 for interdiction and transition, connections 184 and connecting 184, filters 185 and filtering 185, access 186, discharge 187, cleaning 188, or refurbishment 188, or both 188, transport 189 include a storage 190 or disposition 190.

Flow may be defined by both the physical environment guiding or directing a flow, and the flow of polluted water through such. For example, the flow 181 may involve a gutter 17, a curb 16, a street 13, open surface (e.g., parking lot), a channel 82, or the like.

Likewise, interdiction 182 may be vertical or horizontal. Interdiction 182 may involve moving water or may actually involve quiescent water. In other words, some interface 182 with the flow 181 represents interdiction 182. This may involve the use of grates 20, street inlets 14*a*, curb inlets 14*b*, or the like for interdicting the flow 181, and committing it to enter the catch basin 12.

The structures 183 may reach back to some of the structures required for interdiction 182, transitioning 183 or transitioning structures 183 trying to collect all water arriving at an inlet 14. This may apply to a street inlet 14*a* or curb inlet 14*b*, with their associated grates 20, and the like.

At this juncture, the process relies on the activities or the services of supports 33, a diversion 50, a funnel 32, a hanger 34, the filter 40 itself, backups of water through an overflow 39, or retention of pollutants by the filter 40, by the catch basin 12, or both.

Connection 184 may represent connecting, maintaining connections, and the physical hardware responsible for connections. To this end, the connections block 184 may represent various anchors anchoring to a street 13, a curb 16, a gutter 17, a sidewalk 19, a wall 22 of a catch basin 12 or a floor 24 thereof. Similarly, various connections may be made to a frame 26 of a ledge 27 under a grate 20 in a catch basin 12. Thus, various types of anchors may be involved including connection to the ground, to curbs 16, to gutters 17, to channels 82, and so forth.

Likewise, registrations such as between keys 46 and the seats 42 of hangers 34 may fit within this category. Similarly, pilots 46 or protrusions 46 as keys 46 extending from hoops 36 may represent registration and connection, as well as positioning. Thus, conduction of water through all handling including grates 20, funnels 30, hangers 34, filters 40, and intermediate diverters 50 may all be implicated with connections both mechanical and fluid. For example, connections may be made for mechanical support against gravity, against dynamic head pressures, and for conducting fluid with proper containment, including total containment where required.

A filter 185 or filtration 185 may involve filtering out gross materials such as debris, defined herein as materials that are effectively lighter in water in density, as opposed to fines that represent materials that have a density greater than that of water. Thus, debris may involve natural products such as leaves, stems, bark, branches, and the like, as well as non-naturally-occurring materials such as chunks of rubber worn from tires, paper, plastic, wrappers, and who knows what else that may be swept by runoff water toward a catch basin 12.

Accordingly, some of the considerations of the filtration include capturing gross materials, which will typically not be sediments (which would make it a rock), but limbs, leaves, and large particles of organic material or debris.

Meanwhile, sediments represent fines (although fines may also be formed of paint chips, comminuted particles of debris, and the like) which tend to settle more quickly, and require the smallest effective mesh sizes in filter media of the filter 40. Likewise, considerations must include molecular considerations such as heavy metals, dissolve solids, mixed chemicals or dissolved chemicals, and other pollutants that must be removed from a particular flow of water. Similarly, pressure is a consideration for the integrity of all filters 40, with excess content, pressure, or flow. Thus, overflow is a significant consideration in a filter 40.

Access 186 will typically impact installation, servicing, protection against vandalism, protection of workers and so forth. Accordingly, protection systems involve procedures and hardware associated with the system 10.

Discharge 187 is primarily directed to hardware and method steps for removing the content of a filter 40. This may be accomplished by removing the entire filter 40, or by removing content from the filter 40 through a top, through a bottom opening, by re-purposing the filter bag 40, by refurbishing such a bag filter 40 after cleaning, or simply disposal of the filter bag 40 and content together. Such operations as incineration may serve to clear chemicals, volatiles, organic material, and leave only a pure soil and ash material.

Cleaning 188 may involve primarily cleaning, refurbishment, recycling, re-purposing, or other treatment of the filter 40 itself. A system 10 may typically have to address, to remove or otherwise handle, gross (large) debris such as cigarette filters and cigarette butts, organic material, wrappers, packaging and other litter that may find its way to a catch basin 12, and the like. Similarly, cleaning 188 should typically address how to handle the fines captured within the filter media of a filter 40.

Accordingly, certain bag filters 40 may be recyclable, others may be refurbishable, and others may be completely cleanable in order to be immediately reinstalled. Cleaning 188 may be conducted onsite in certain embodiments of a process 180 in accordance with the invention, or may be done offsite after collection of filters 40, whether those filters 40 will be buried, burned, cleaned, recycled, refurbished, re-used, or any other disposition.

One priority in certain environments is the cleaning 188 of chemicals. This may be done as discussed hereinabove. It may be necessary to react or dissolve in a solvent certain chemicals captured in the filter 40. Burning or heating the filter 40 may denature chemicals or react them by oxidation and so forth. Similarly, certain materials may be cleaned simply by heating (activated carbon) or by leaching from an adsorbtion bead or filler, or an absorption medium.

Transport 189 may often involve storage in multiple movements of a filter 40, its content, or both. In transporting, extraction may be involved in removing contents from both the filter 14, catch basin 12, and any transporting vehicle 170. Similarly, emptying of both the filter 40 is a consideration, and of any transporting vehicle 170.

Washing and the additional water may require are considerations during transport 189 and storage. This may depend on what contents predominate or are present, or must be removed in order to meet local requirements may vary substantially from site to site.

Likewise, the configuration of trucks 170 or other vehicles 170 will depend on the mechanisms to process the grates 20, the filters 40, the contents of filters 40, and so forth. Another consideration is accommodating any other accoutrements such as lift arms 171, vacuum systems 169, and the like. Similarly, if collection is done, onsite but pollution is handled elsewhere, one may be required to collect filters 40, their contents, water from washing and the like.

Ultimately, disposition 190 may be disposition of wet materials, dry materials, or both. Again, processes of heating, drying, incinerating, washing, and the like may result in residues and must be kept in cisterns or capture locations in order to be further processed, or further moved to be buried, burned, recycled, further cleaned, or the like.

Figure 35:
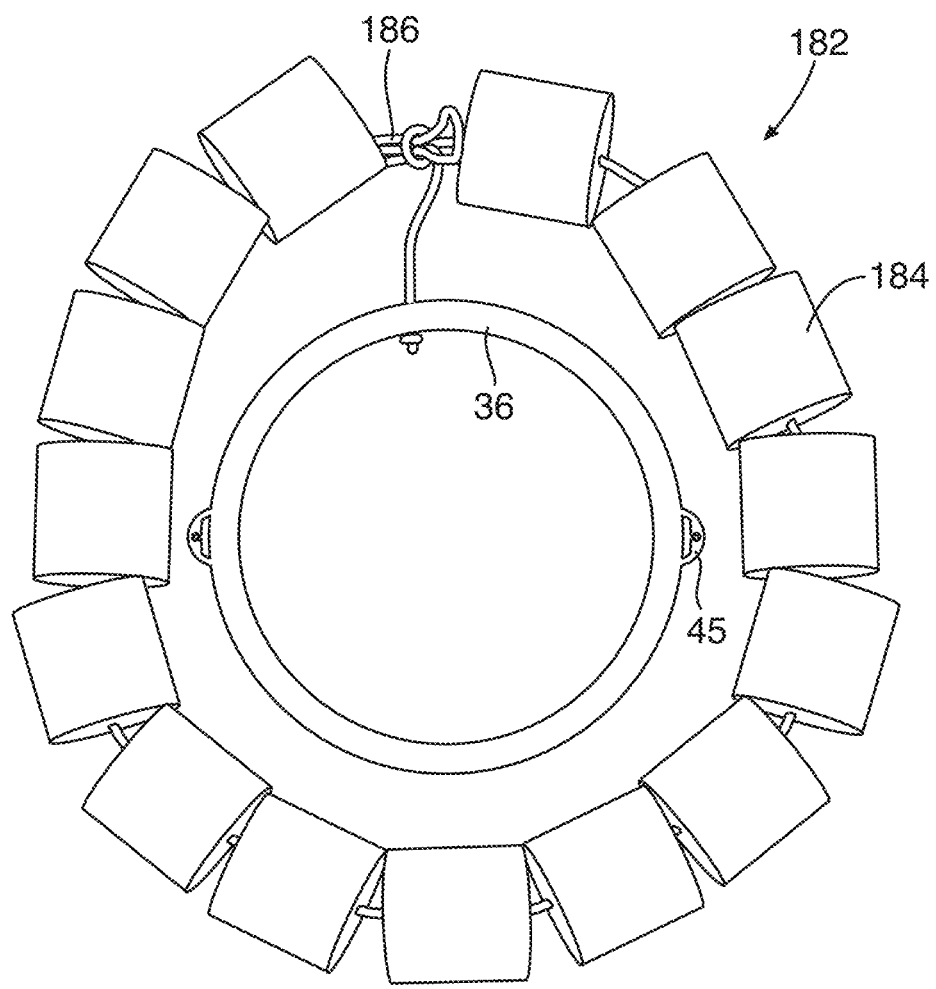
FIG. 35 is an upper, frontal, perspective view of a hoop in accordance with the invention, compared against a ring of chemically-absorbing materials for stripping contaminants at a molecular level from a flow

Referring to FIG. 35, one alternative embodiment for a chemical removal system involves a ring 192 having pads 194 therein. The ring 192 may be held together by a core 196 threaded through a number of pads 194. That is, an inside diameter of a physical object in a circular configuration smaller than the outer diameter, and forming turns along a circumference, may be complicated and expensive. In contrast, the pads 194 may be rolled or otherwise formed to have a center hole therethrough capable of receiving the core 196 threaded therethrough.

The core 196 may be metal, such as chain, a metal ring, wire rope, steel cable, cord, or the like. Similarly, the core 186 may be a line 196, such as a rope 196 or the like. The ring 192 or chemical treatment ring 192 may be placed immediately within the rim 37 of the bag 40.

In other embodiments, it may be placed outside an inner layer 134, and sealed by an impervious outer layer 136 to force all water therethrough after having passed through an inner layer 134 of filtration. Since water will not pass through an outer layer 136 that is impervious, it would pass down through the chemical treatment 182 before exiting the filter system 30.

In other embodiments, in order to prevent mechanically covering or fouling, the ring 192 may be surrounded by netting. Any gross filter with a comparatively large minimum mesh size may prevent covering up the pads 194 by debris that might otherwise block passage there through by the water containing chemicals therein.

The present invention may be embodied in other specific forms without departing from its purposes, functions, structures, or operational characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. An apparatus as a storm drain filtering system, the apparatus comprising:
   a structure capable of being positioned between a thoroughfare and a catch basin to capture water received as runoff from the thoroughfare;
   a funnel operably connected to suspend from the structure and redirect the water toward a filter;
   a hanger suspending, and spaced apart, from the funnel to provide an overflow therebetween capable of passing excess water backed up by the filter when in an overflow condition;
   a filter constituting a bag comprising a rim impassable through the hanger and suspending a filter portion of the bag therefrom, the bag being formed of a material, configured as a sheet, capable of filtering out pollution swept along with the water to pass through a thickness of the sheet;
   wherein the pollution comprises solids, constituting sediment and debris, the sediment having a density greater than that of water, and the debris having a density less than that of water; and
   a net, structured to be capable of resisting backflow, out of the filter, by a portion of the debris as particles larger than gaps in the net, the net being positioned within the rim and having an outer diameter corresponding to the rim and an inner diameter less than the outer diameter and positioned below the rim.

2. The apparatus of claim 1, wherein:
   the rim contains a hoop disposed therein, rigid and structurally strong enough to maintain a shape thereof incapable of passing through the hanger; and
   the bag comprises a flexible wall, capable of horizontal movement, permeable to the water, and impermeable to constituents of the pollution preselected for removal by the filter.

3. The apparatus of claim 2, wherein the flexible wall comprises at least one layer constituting a lattice comprising strands defining spaces between the strands, the lattice having a vertical dimension and a horizontal dimension, the horizontal dimension disposed to run circumferentially around the bag, and the lattice capable of changing the vertical and horizontal dimensions in response to forces in the vertical and horizontal directions.

4. The apparatus of claim 3, wherein the filter comprises a mat layer comprising a non-woven fabric treated to be capable of filter out at least one of:
   fines, constituting a portion of the solids having an effective diameter less than that of the spaces;
   hydrocarbons other than solids and mixed in with the water; and
   toxins dissolved in the water.

5. The apparatus of claim 4, comprising at least one scavenger comprising:
   a magnet disposed in the filter to attract a portion of the constituents of the pollution subject to magnetic attraction;
   a MYCELX material positioned to pass water therethrough to remove a portion of the constituents of the pollution dissolved or mixed in the water sufficiently to travel as liquids therewith, but being independent (unreacted therewith) at a molecular level.

6. The apparatus of claim 4, wherein:
   the filter is characterized by a surface area selected to operate as a first cross-sectional area to pass the water from inside the wall of the bag therethrough, at ambient conditions and at a rate of flow preselected therefor, into the catch basin; and
   the overflow is characterized by a second cross-sectional area selected to pass substantially all flow of the water greater than the rate of flow preselected.

7. The apparatus of claim 6, wherein the preselected flow rate is selected to capture all the solids of a preselected sized from the water at other than excess storm conditions, wherein excess storm conditions constitute a persistent flow of the water exceeding the preselected flow rate for the majority of the time of a storm.

8. The apparatus of claim 6, wherein:

the bag has a length from the rim at a first (upstream) end thereof to a closure at a second (downstream) end thereof;

the closure is selectively securable to close the bag, and removable to open the second end of the bag; and an interior of the bag exposes captured pollution retained in the bag to churning by the water passing into the bag.

9. The apparatus of claim 8, wherein:

the water flows through the filter in a radially outward direction from a position of lesser radius toward a position of greater radius, and therefrom from a position of correspondingly smaller cross-sectional area to a position of correspondingly greater cross-sectional area.

10. The apparatus of claim 9, wherein a configuration of the apparatus requires at least one of the conditions selected from:

the bag is constructed proximate the rim from a geotechnical fabric resistant to abrasion, and distant from the rim of a separate and distinct fabric permeable by the water and not by preselected constituents of the solids of the pollution;

the hoop is provide with a registration constituting a first fitting conformal to a corresponding second fitting in a seat of the hanger configured to receive the rim and hoop at a registered position;

the funnel comprises a diverter adjustable to fit a curb inlet, at a curb corresponding to and bounding the thoroughfare, and capable of diverting a portion of the water, that amount received by the curb inlet, toward and consolidating with another portion of the water received by a grate in the thoroughfare;

the funnel comprises a diverter comprising louvers shingled to preferentially cascade a portion of the water received through the curb inlet thereover, passing the water and any of the pollution contained therein downward and inward toward the filter;

the length of the bag is adjustable by application of the closure at an arbitrary distance from the rim;

the bag is capable of re-use by emptying a content of the bag and returning it to service in the hanger;

the funnel comprises a flexible membrane extending under a grate over the catch basin; and an outward flow of the water is driven through the wall of the bag principally by a dynamic head of the flow passing into the bag rather than quiescent head generated by a column of quiescent water.

11. A method for separating pollution from runoff comprising water flowing toward a storm drain corresponding to a thoroughfare, the method comprising:

providing an apparatus as a storm drain filtering system, the apparatus comprising a structure positionable between a thoroughfare and a catch basin associated therewith, an interdiction system comprising a funnel operably connected to suspend from the structure and redirect the water toward a filter, a transition system comprising a hanger suspending and spaced apart from the funnel, a filter as a bag extending from a rim at an upstream end thereof and a closure at a downstream end thereof to be capable of filtering out pollution in the water, and a cover as a net proximate the rim so structured as to resist backflow out of the filter by debris collected in the bag;

positioning the apparatus in the catch basin downstream from an inlet thereto and upstream of an outlet therefrom;

collecting in the bag pollutants constituting the pollution;

removing the bag while leaving the funnel and hanger emplaced within the catch basin;

disposing of the pollutants in the bag by one of cleaning out contents of the bag and disposing of the bag with the contents; and returning the filter to service by placing one of the bag and a replacement bag into the hanger.

12. The method of claim 11, comprising:

providing a grate over the catch basin having an access constituting a hatch in the grate selectively movable between a first (closed) position in the grate and a second (open) position at least partially removed from the grate.

13. The method of claim 12, wherein the hatch is connected to the grate by a hinge capable of exposing the bag by pivoting the hatch into the second position.

* * * * *